US012743537B1

(12) United States Patent
Reynard

(10) Patent No.: US 12,743,537 B1
(45) Date of Patent: Sep. 22, 2026

(54) SYSTEMS AND METHODS FOR AI-GATING CONTINUOUS AUTHORIZATION AND EXECUTION CONTROL

(71) Applicant: Michael Reynard, Santa Monica, CA (US)

(72) Inventor: Michael Reynard, Santa Monica, CA (US)

( * ) Notice: Subject to any disclaimer, the term of this patent is extended or adjusted under 35 U.S.C. 154(b) by 0 days.

(21) Appl. No.: 19/556,383

(22) Filed: Mar. 4, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS 4,584,639 A 4/1986 Hardy
5,229,764 A 7/1993 Matchett
7,627,891 B2 12/2009 Williams
7,904,956 B2 3/2011 Golan
10,530,761 B2 1/2020 Hockey
10,848,522 B2 11/2020 Prasad
11,093,632 B1 * 8/2021 Ton-That ............... G06N 20/00
12,231,426 B2 2/2025 Crabtree
12,346,820 B1 * 7/2025 Rahman ............... G06N 3/0895
2005/0097320 A1 5/2005 Golan
2006/0075462 A1 4/2006 Golan
2014/0181290 A1 * 6/2014 Wong ...................... H04L 63/10 709/224
2016/0224772 A1 8/2016 Moloain
2017/0076212 A1 * 3/2017 Shams .................... G06F 3/165
2023/0118418 A1 * 4/2023 Paczkowski ........... G06N 3/045 726/4
2024/0354586 A1 * 10/2024 Cummings ............ G06N 3/092
2025/0258938 A1 * 8/2025 Palladino ............ G06F 21/6227
2026/0053388 A1 2/2026 Housmann
2026/0057364 A1 2/2026 Helo
2026/0058996 A1 2/2026 Scimemi

FOREIGN PATENT DOCUMENTS

EP 4647945 A1 5/2024
WO WO-2023028332 A1 * 3/2023 ......... H04N 21/8456

* cited by examiner

*Primary Examiner* — Javier O Guzman
(74) *Attorney, Agent, or Firm* — Richard A Baker, Jr.

(57) ABSTRACT

A computerized system implements an AI-Gating authorization layer that functions as an execution interlock for digital actions. The AI-Gating authorization layer is configured to receive a requested digital action, and to determine, using a continuously evaluated and conditionally maintained authorization state, whether the requested action is permitted to execute, permitted to execute under modified constraints, or not permitted to execute. The system controls execution of actions in both pre-execution and mid-execution. The system includes components that receive action requests, acquire runtime context, evaluate authorization, assign execution permissions, mediate execution, and monitor outcomes. The system provides a graded and revocable execution permission state, which is continuously reassessed during execution, allowing for dynamic and adaptive control of action execution.

29 Claims, 15 Drawing Sheets

AI-GATING AUTHORIZATION SYSTEM

SYSTEMS AND METHODS FOR AI-GATING CONTINUOUS AUTHORIZATION AND EXECUTION CONTROL

FIELD OF INVENTIONS

This document discusses authorization techniques.

BACKGROUND

Modern computing, financial, and safety-critical systems increasingly rely on authenticated sessions, automated processes, and machine-generated actions to perform operations that may have significant operational, financial, or safety consequences. In many existing systems, authorization to perform such actions is determined at discrete points in time, such as during login, authentication, token issuance, or transaction approval. Once authorization is granted, execution authority often persists for the duration of a session, credential lifetime, or workflow, subject primarily to expiration or explicit revocation.

To mitigate misuse and fraud, many systems employ additional protective mechanisms, including multi-factor authentication, two-factor authentication, real-time transaction scoring, alert generation, and step-up verification workflows. These mechanisms evaluate specific events, such as login attempts or individual transactions, and may conditionally allow, challenge, or deny those events based on risk assessment or user confirmation. Such approaches have proven effective at reducing unauthorized access and detecting suspicious activity.

However, these existing mechanisms generally operate on an event-based authorization model, in which decisions are made at isolated moments and do not persist as a continuously governed execution state. After an event is approved or a challenge is satisfied, the system typically returns to a baseline authorization posture. Subsequent actions within the same session or workflow may be evaluated independently, without maintaining a cumulative or evolving assessment of execution authority across time.

As a result, systems may remain vulnerable to scenarios in which credentials are compromised after authentication, users are socially engineered into approving access or transactions, automation behaves unexpectedly, or execution context changes materially during an active session. In such cases, authentication and event-level approval may remain valid even as execution risk increases, and detection or remediation may occur only after high-consequence actions have already executed.

These limitations become more pronounced in environments that involve long-lived sessions, high degrees of automation, machine-to-machine interactions, or autonomous agents capable of generating or executing actions without continuous human oversight. In these environments, reliance on static authorization, login-based trust, or isolated transaction approval may be insufficient to prevent unsafe outcomes, particularly where actions are irreversible or have cascading effects.

Similarly, in medical, industrial, and other safety-critical domains, conventional control systems may rely on predefined thresholds, fixed rules, or one-time authorization decisions that do not adequately account for evolving conditions, uncertainty, or cumulative risk during execution. Once an action such as a therapeutic delivery, diagnostic operation, or system control command is initiated, existing systems may lack a mechanism to continuously reassess whether execution should proceed, be constrained, or be terminated as conditions change.

Accordingly, there exists a need for a technical control architecture that governs execution authority as a continuously validated state, rather than as a static or event-based decision. Such a system would complement existing authentication, alerting, and approval mechanisms by providing runtime oversight of action execution, enabling permission to be dynamically modified or revoked based on real-time context and uncertainty, and enforcing execution constraints directly on system resources. The disclosed invention addresses these and other technical limitations of conventional authorization and control models.

BRIEF SUMMARY

In one aspect, a system for controlling execution of actions in a computing environment, includes an action intake interface configured to receive an action request, a runtime context acquisition component configured to obtain dynamic context associated with an executing action and output a runtime context, the runtime context includes at least system state, execution behavior, and uncertainty indicators, an AI-Gating authorization engine configured to continuously evaluate whether execution of the action request is permitted based on the runtime context, where authorization is not determined solely at access time, a permission scope determination component of the AI-Gating authorization engine configured to assign a graded and revocable execution permission state defining how, to what extent, and under what constraints the action request may execute, an execution mediation module operatively coupled to computing resources and configured to enforce the graded and revocable execution permission state by directly mediating execution of the action request before execution and during execution, and a feedback and monitoring component configured to provide execution outcomes and updated runtime context to the AI-Gating authorization engine, where the graded and revocable execution permission state is continuously reassessed during execution independently of identity authentication.

The execution mediation module may enforce the graded and revocable execution permission state using non-binary execution controls including at least one of scope limitation, rate limitation, staged execution, checkpoint enforcement, sandboxed execution, or selective termination. The AI-Gating authorization engine may continuously update the graded and revocable execution permission state in response to changes in runtime context occurring during execution of the action request. The permission scope determination component may dynamically narrow execution authority to a minimum authority required for a current task context. The execution mediation module may perform mid-execution intervention. The feedback and monitoring component may detect execution drift by comparing observed execution behavior to expected execution behavior. The AI-Gating authorization engine may reduce execution authority as uncertainty increases. The system may also include a constraint enforcement component configured to impose non-negotiable execution limits based on system integrity requirements. The action request may be generated by an autonomous agent, and the execution of the action request may be governed by the graded and revocable execution permission state. The system may further include a human oversight interface configured to receive an escalation when the graded and revocable execution permission state exceeds a predefined uncertainty. The system may be deployed across distributed execution environments, and execution mediation is enforced by local mediation nodes operating under a centralized AI-Gating authorization engine. The system may further include an audit and logging component configured to record authorization decisions, execution mediation actions, and permission state transitions in a time-ordered record. The action request may correspond to a physical operation. The computing environment may include a cloud platform. The graded and revocable execution permission state may allow execution. The graded and revocable execution permission state may constrain execution. The graded and revocable execution permission state may terminate execution. The graded and revocable execution permission state may be reduced as uncertainty increases. The execution mediation module may maintain constrained execution while awaiting input from the human oversight interface.

The graded and revocable execution permission state may be portable across heterogeneous execution environments and synchronized to maintain consistent enforcement. The audit and logging component may support reconstruction of execution control decisions for compliance.

In one aspect, a method for controlling execution of actions in a computing environment, includes receiving an action request, obtaining runtime context associated with execution of the action request, the runtime context includes system state, execution behavior, and uncertainty indicators, continuously evaluating, using an AI-Gating authorization engine, whether execution of the action request is permitted based on the runtime context, where authorization is not determined solely at authentication time, determining execution authority, a graded and revocable execution permission state defining how, to what extent, and under what constraints the action request may execute, and mediating execution of the action request before execution and during execution in accordance with the graded and revocable execution permission state, including selectively allowing, constraining, throttling, pausing, or terminating execution, where execution authority is continuously reassessed independently of identity authentication eligibility.

The method may also include reducing execution authority as uncertainty associated with the runtime context increases. The mediating execution may include enforcing non-binary constraints selected from scope limitation, rate limitation, staged execution, checkpoint enforcement, sandboxed execution, or selective termination. The action request may be generated by an autonomous system, and mediating execution includes constraining autonomous behavior to a bounded task context. The action request may originate from a software process. The action request may originate from a human user. The action request may originate from an autonomous agent.

A non-transitory computer-readable medium storing instructions that, when executed by one or more processors, may cause the one or more processors to perform the method. Other technical features may be readily apparent to one skilled in the art from the following figures, descriptions, and claims.

Terms and Definitions

For clarity and consistency throughout this disclosure, the following terms are used in a broad, inclusive, and non-limiting manner and apply, unless otherwise indicated, across digital, physical, cyber-physical, and biological systems, including software systems, autonomous agents, machine-to-machine workflows, robotic systems, and AI-to-AI interactions. Subsequent usage of defined terms is intended to be consistent with the definitions set forth herein, even when such terms are referenced in explanatory or contextual language. Defined terms are intended to apply uniformly across embodiments unless explicitly stated otherwise Action "Action" refers to any operation capable of consuming system resources, modifying system state, or producing a consequential effect. Actions may include digital actions, physical actions, cyber-physical actions, or biological or therapeutic actions.

Action Request

"Action request" refers to a request to initiate, continue, modify, or complete an action, originating from a human user, process, device, application, service, workflow, or autonomous agent.

AI-Gating

"AI-Gating" refers to a continuous supervisory execution control mechanism that dynamically governs whether an action may begin, continue, escalate, or terminate, and determines the scope, speed, duration, and constraints under which the action may proceed. AI-Gating evaluates runtime context, uncertainty, and predefined constraints to grant, modulate, restrict, or revoke execution authority during execution. Systems, processes, or environments governed by this mechanism may be described as "AI-Gated." In this usage, "AI-Gating" denotes the operative control architecture, while "AI-Gated" denotes a system or state subject to that control.

Application Programming Interface (API)

"Application Programming Interface" or "API" refers to a defined interface that enables one software component, service, device, or autonomous agent to request, invoke, or control functions, data access, or operations of another component through structured calls, messages, or protocols, wherein such requests may initiate or influence execution of actions within a computing, physical, or cyber-physical system.

Authorization State

"Authorization state" refers to a defined level or condition of permission under which an action may execute, including full, reduced, constrained, suspended, or terminated states.

Autonomous Agent

"Autonomous agent" refers to a software, hardware, or hybrid system capable of initiating or executing actions without continuous human direction, including AI agents, robotic systems, and automated workflows.

Checkpointing

"Checkpointing" refers to the introduction of defined execution boundaries at which continuation of an action is conditional upon reevaluation of authorization, context, or constraints.

Constraint

"Constraint" refers to a non-negotiable rule or boundary that limits execution regardless of optimization objectives or model confidence. Constraints enforce fail-secure behavior and may prohibit irreversible or unsafe actions.

Context

"Context" refers to information relevant to authorization and execution decisions, including system state, behavioral patterns, historical activity, environmental conditions, identity attributes, operational signals, and external inputs.

Continuous Authorization

"Continuous authorization" refers to repeated or ongoing evaluation of permission during execution, such that authorization is not fixed at initiation and may be dynamically adjusted, restricted, reinstated, or revoked as conditions evolve.

Digital Action

"Digital action" refers to a command, function call, API request, script invocation, configuration change, privilege escalation attempt, data transfer, data export, service-to-service call, workflow step, or any instruction capable of consuming computing resources or modifying digital system state.

Execution

"Execution" refers to the process by which an action is carried out over time, including initiation, continuation, modification, suspension, or termination of the action. Execution may include physical actuation governed by a cyber-physical control loop, including modulation of force, velocity, trajectory, timing, energy delivery, or spatial envelope.

Execution Mediation

"Execution mediation" refers to technical control over how an action executes, including throttling, rate limiting, sandboxing, privilege narrowing, checkpointing, staged execution, pausing, or termination.

Fail-Secure

"Fail-secure" refers to system behavior in which increased risk or uncertainty results in reduced execution authority, constrained operation, or suspension of execution rather than expanded capability.

Human Oversight

"Human oversight" refers to governance, policy definition, escalation review, or post-execution evaluation performed by human operators, without requiring real-time manual approval of each execution step.

Permission

"Permission" refers to authorization to execute an action. Permission may be graded, conditional, time-limited, revocable, constrained, or subject to continuous reevaluation during execution.

Permission Scope

"Permission scope" refers to the set of boundaries and constraints applied to execution of an action, including one or more limits on duration, rate, intensity, resource usage, privilege level, accessible environment, sequencing, execution pathway, or allowable outcomes.

Policy Engine

"Policy engine" refers to a system that evaluates predefined policies or rules to permit or deny access or actions prior to execution, without mediating execution behavior during runtime.

Rules Engine

"Rules engine" refers to a system that applies static or condition-based logic to determine authorization or compliance outcomes, without interposing on or modifying execution once initiated.

Runtime Context

"Runtime context" refers to contextual information observed or derived during execution of an action, as opposed to static or pre-execution information.

Uncertainty

"Uncertainty" refers to ambiguity, variance, lack of confidence, or reduced reliability associated with context, predictions, models, signals, or anticipated outcomes. Increased uncertainty may result in reduced or constrained permission.

Uncertainty Indicator

"Uncertainty indicator" refers to a quantitative or qualitative signal reflecting uncertainty in system understanding, prediction confidence, data completeness, or environmental stability.

Zero Trust

"Zero Trust" refers to a security model in which access decisions are not based on implicit trust derived from identity, location, or session initiation, and instead require verification. Zero Trust does not inherently provide continuous execution mediation or graded authority control unless explicitly combined with such mechanisms.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In one embodiment, a computerized system implements an AI-Gating authorization layer that functions as an execution interlock for digital actions. The AI-Gating authorization layer is configured to receive a requested digital action originating from a user, process, service, application programming interface (API), automation workflow, or autonomous agent, and to determine, using a continuously evaluated and conditionally maintained authorization state, whether the requested action is permitted to execute, permitted to execute under modified constraints, or not permitted to execute.

In one embodiment, the AI-Gating continuous authorization system 102 comprises: (i) an action intake interface 1202 configured to receive an action request; (ii) a contextual signal ingestion subsystem configured to acquire runtime context comprising identity attributes, behavioral signals, system state signals, and environmental signals; (iii) an AI-Gating authorization engine 108 configured to generate a permission decision and an associated permission scope; and (iv) an execution mediation subsystem 122 configured to enforce the permission scope by controlling execution of the action request. The permission scope may specify one or more execution controls comprising, by way of example, privilege narrowing, rate limiting, staged execution, sandboxing, checkpointing, partial execution, monitoring intensification, or termination.

In one embodiment, the AI-Gating decision engine performs continuous authorization in which permission is not a single-time event. Rather, authorization is repeatedly evaluated during and/or across execution intervals, and permission may be dynamically modified or revoked when contextual risk changes or uncertainty increases. In one embodiment, the system further includes a constraint enforcement module configured to apply non-negotiable safety constraints that override or bound AI-Gating outputs, thereby ensuring fail-secure behavior independent of model confidence.

In one embodiment, the system generates an auditable record of permission decisions, applied constraints, and enforcement actions, including explanatory features or rationales suitable for compliance review and forensic reconstruction.

Figure 1:
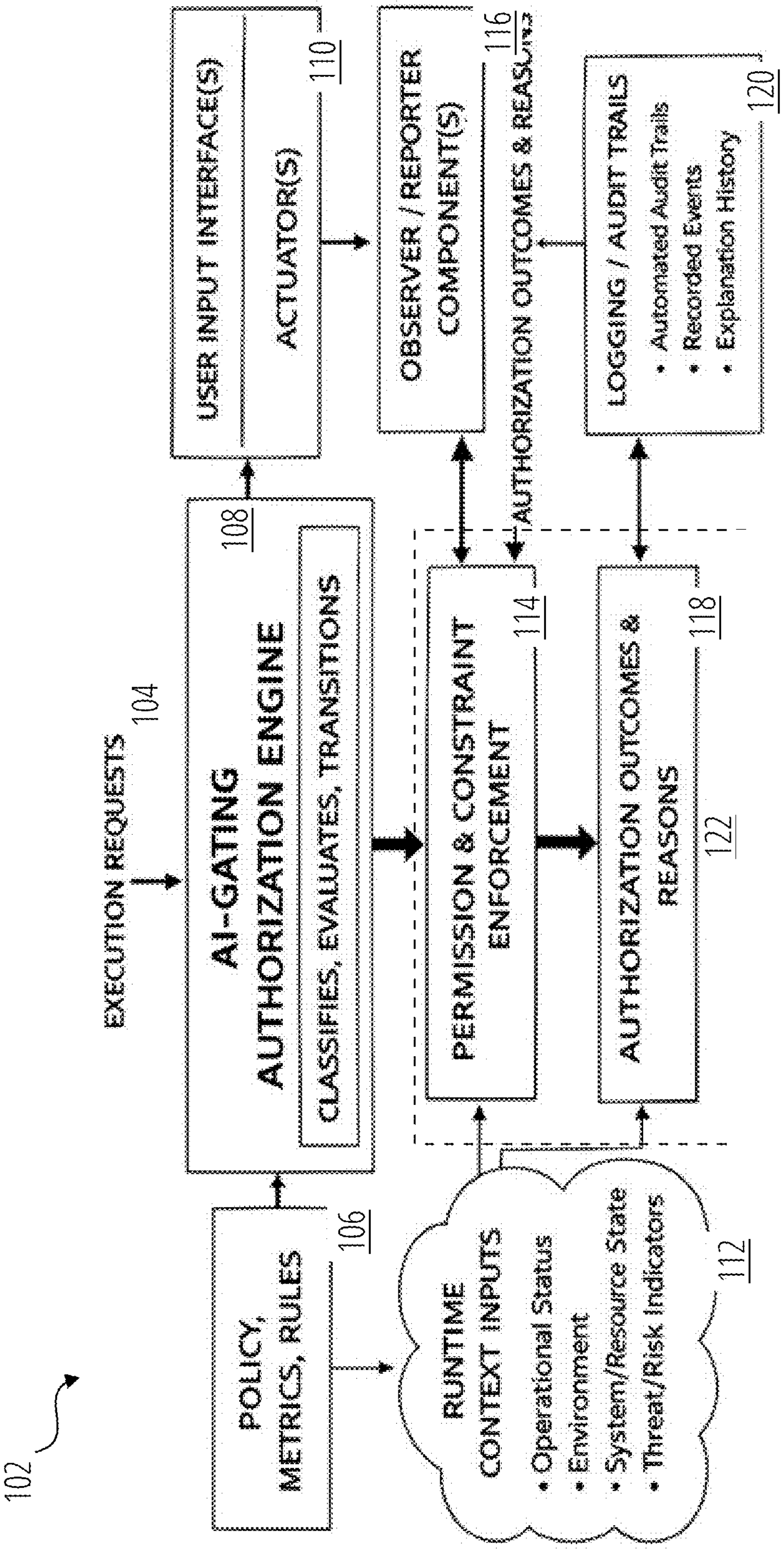
FIG. 1 illustrates a block diagram of an AI-Gating execution control plane interposed between action origination and action execution, showing continuous authorization, execution mediation, and closed-loop feedback based on runtime context.

FIG. 1 illustrates an exemplary embodiment of an AI-Gated continuous authorization system 102. Execution requests (action requests 104) originating within an action execution environment are provided to an AI-Gating authorization engine 108. The AI-Gating authorization engine 108 is configured to classify, evaluate, and transition permission states associated with the execution requests 104.

The AI-Gating authorization engine 108 receives governance inputs from policy, metrics, and rules 106. The policy, metrics, and rules 106 define operational constraints, performance criteria, compliance requirements, safety limits, and risk thresholds applicable to execution decisions.

The AI-Gating authorization engine 108 also receives contextual inputs from the runtime context 112. The runtime context 112 reflects environmental and operational conditions, including system state, execution behavior, confidence indicators, anomaly signals, and uncertainty measurements associated with the execution requests 104.

Based on the policy, metrics, and rules 106 and the runtime context 112, the AI-Gating authorization engine 108 generates a graded and revocable permission and constraint enforcement state 114. The permission and constraint enforcement 114 defines dynamic authorization boundaries that determine whether, and under what constraints, execution may proceed.

Authorization outcomes and reasons 118 are produced in association with the permission and constraint enforcement 114. The authorization outcomes and reasons 118 may include approval decisions, denial decisions, authority gradations, constraint specifications, confidence levels, and explanatory rationale supporting the AI-Gated determination.

The runtime context 112 may include operational status indicators, environmental inputs, system and resource state information, execution telemetry, behavioral deviations, anomaly indicators, threat or risk metrics, and uncertainty assessments reflecting real-time execution conditions.

The runtime context 112 may be dynamically updated as execution proceeds, thereby allowing the AI-Gating authorization engine 108 to reassess authorization states as environmental and system conditions evolve.

Policy, metrics, and rules 106 define governance parameters and evaluation criteria applied by the AI-Gating authorization engine 108. These parameters may include predefined permission levels, safety baselines, risk tolerances, escalation thresholds, and compliance rules.

The AI-Gating authorization engine 108 integrates the policy, metrics, and rules 106 with the runtime context 112 to determine the graded and revocable permission and constraint enforcement state 114 applicable to the execution requests 104. The runtime context 112 further informs the generation of authorization outcomes and reasons 118 by providing contextual justification for each authorization decision.

The AI-Gating authorization engine 108 interfaces with a user input interface 110. The user input interface 110 may include operator controls, administrative inputs, actuator commands, or supervisory overrides. Inputs received through the user input interface 110 may modify evaluation parameters, request review of authorization decisions, or provide additional contextual information.

Observer/reporter components 116 receive information from the permission and constraint enforcement state 114 and from the user input interface 110. The observer/reporter components 116 may monitor authorization states, detect deviations, generate notifications, and provide reporting functionality regarding execution status and authorization decisions.

An execution mediation subsystem 122 enforces the graded and revocable authorization boundaries established by the permission and constraint enforcement 114. The execution mediation subsystem 122 may allow execution, constrain execution parameters, delay execution, stage execution, suspend execution, or terminate execution of actions associated with the execution requests 104 based on the current authorization state.

Automated audit trails, recorded events, authorization outcomes and reasons 118, and state transition information may be transmitted to logging and audit trails 120. The logging and audit trails 120 store historical authorization records, constraint applications, override events, and explanatory history to support traceability, accountability, compliance verification, and post-execution review.

Through interaction among the AI-Gating authorization engine 108, the permission and constraint enforcement 114, the execution mediation subsystem 122, the observer/reporter components 116, the user input interface 110, and the logging and audit trails 120, the AI-Gating continuous authorization system 102 provides adaptive, graded, and revocable execution control responsive to runtime context 112 and policy, metrics, and rules 106.

Figure 2:
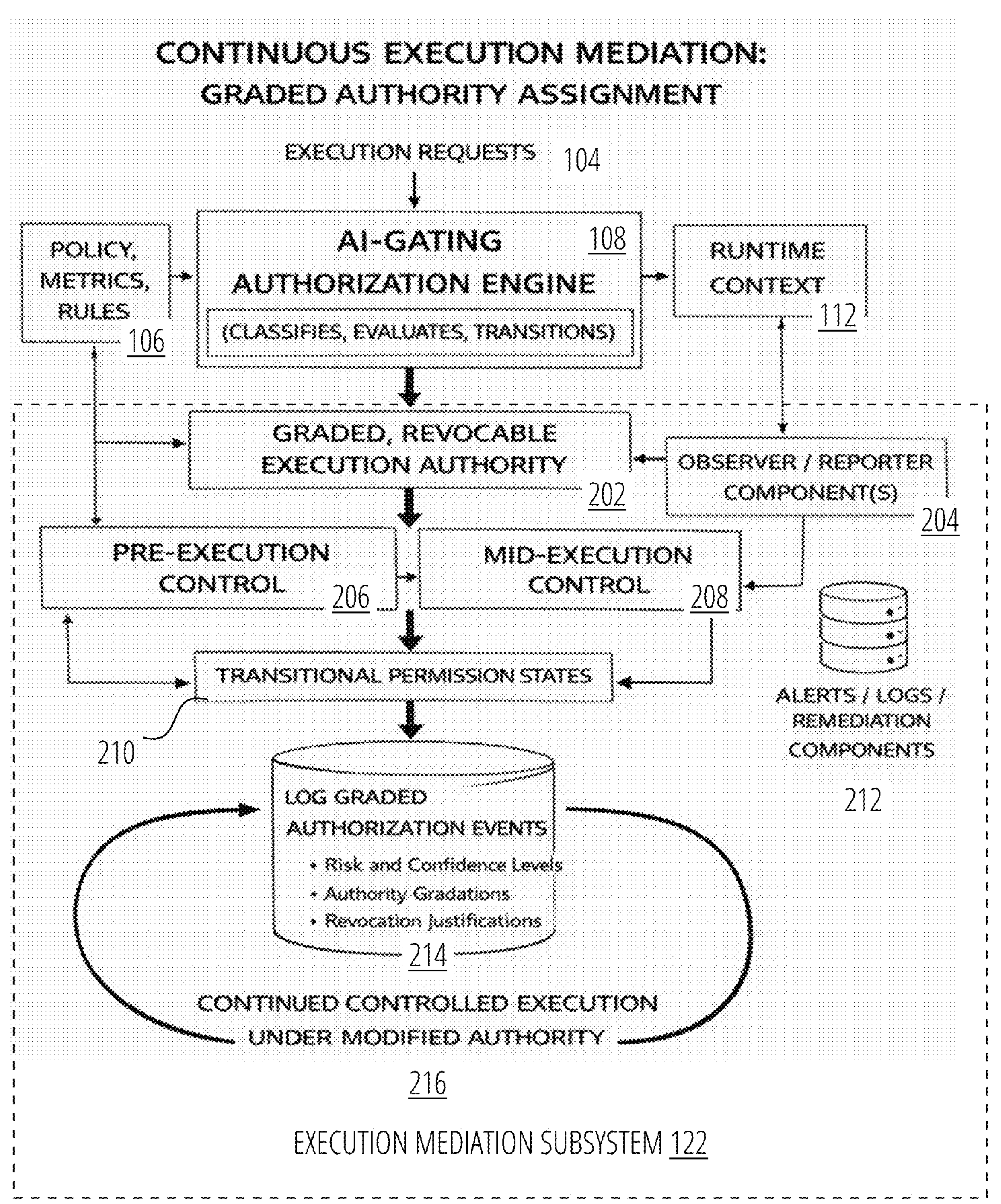
FIG. 2 illustrates a continuous authorization state machine in which execution permissions are dynamically assigned, modified, or revoked using graded permission states and revocation pathways during execution.

FIG. 2 illustrates an exemplary authorization flow in which AI-Gated permission is evaluated prior to execution and continuously evaluated and conditionally maintained during execution, thereby enabling dynamic mid-execution constraint, modification, suspension, or termination of actions as runtime conditions evolve.

The elements of FIG. 2 illustrate an exemplary embodiment of AI-Gated authorization applied both before and during execution of an action. An action request 104 is evaluated by an AI-Gating authorization engine 108 in view of policy, metrics, and rules 106 and runtime context 112. The AI-Gating authorization engine 108 determines an initial graded, revocable execution authority 202 that defines the authorization state under which the requested action may proceed.

The graded, revocable execution authority 202 is applied to a pre-execution control 206 gate. The pre-execution control 206 determines whether execution may begin and establishes any initial constraints, scope limitations, temporal restrictions, or operational boundaries associated with the execution request 104.

If execution is permitted by the pre-execution control 206, the action proceeds under continued controlled execution under modified authority 216. The continued controlled execution under modified authority 216 represents ongoing execution that remains subject to real-time reassessment of permission conditions and authority grades.

During execution, a mid-execution control 208 authorization evaluation reassesses the graded, revocable execution authority 202 in view of updated runtime context 112, observed execution behavior, confidence levels, and evolving risk conditions. The mid-execution control 208 may adjust authority grades, impose additional constraints, narrow execution scope, delay operations, suspend execution, or terminate execution as necessary.

The runtime context 112 provides contextual state information to the observer/reporter components 204. The observer/reporter components 204 monitor authorization states, execution behavior, and environmental signals, and may generate notifications, alerts, supervisory updates, or reporting outputs associated with execution decisions.

The runtime context 112 may include system state indicators, performance telemetry, anomaly detection signals, behavioral deviations, threat indicators, and uncertainty metrics that influence authorization reassessment by the AI-Gating authorization engine 108.

The action requests 104 are processed by the AI-Gating authorization engine 108, which evaluates each request in accordance with policy, metrics, and rules 106. The AI-Gating authorization engine 108 may dynamically update the runtime context 112 as environmental conditions and execution behavior evolve.

The AI-Gating authorization engine 108 communicates authorization determinations to the execution mediation subsystem 122. The execution mediation subsystem 122 applies the graded, revocable execution authority 202 to the controlled action environment, thereby enforcing the authorization state determined by the AI-Gating authorization engine 108.

The graded, revocable execution authority 202 defines the operative authority grade applied by both the pre-execution control 206 and the mid-execution control 208. Changes in authority state, including escalations, reductions, revocations, and constraint applications, may be recorded in alerts/logs/remediation components 212. The alerts/logs/remediation components 212 may store authorization decisions, risk assessments, remediation steps, override events, and explanatory rationale associated with execution control outcomes.

The pre-execution control 206 and the mid-execution control 208 provide inputs to transitional permission states 210. The transitional permission states 210 represent intermediate or evolving authorization states reflecting graded authority adjustments over time.

Information associated with transitional permission states 210, including risk scores, confidence levels, authority gradations, constraint conditions, revocation justifications, and execution state transitions, may be recorded in log graded authorization events 214. The log graded authorization events 214 provides persistent storage of graded authorization decisions, authority modifications, and associated explanatory data for auditability and post-event analysis.

The entire process remains subject to continuous reassessment through continued controlled execution under modified authority 216, which reflects ongoing monitoring, adaptive constraint application, and real-time authority revision as governed by the AI-Gating authorization engine 108 and enforced by the execution mediation subsystem 122.

Figure 3:
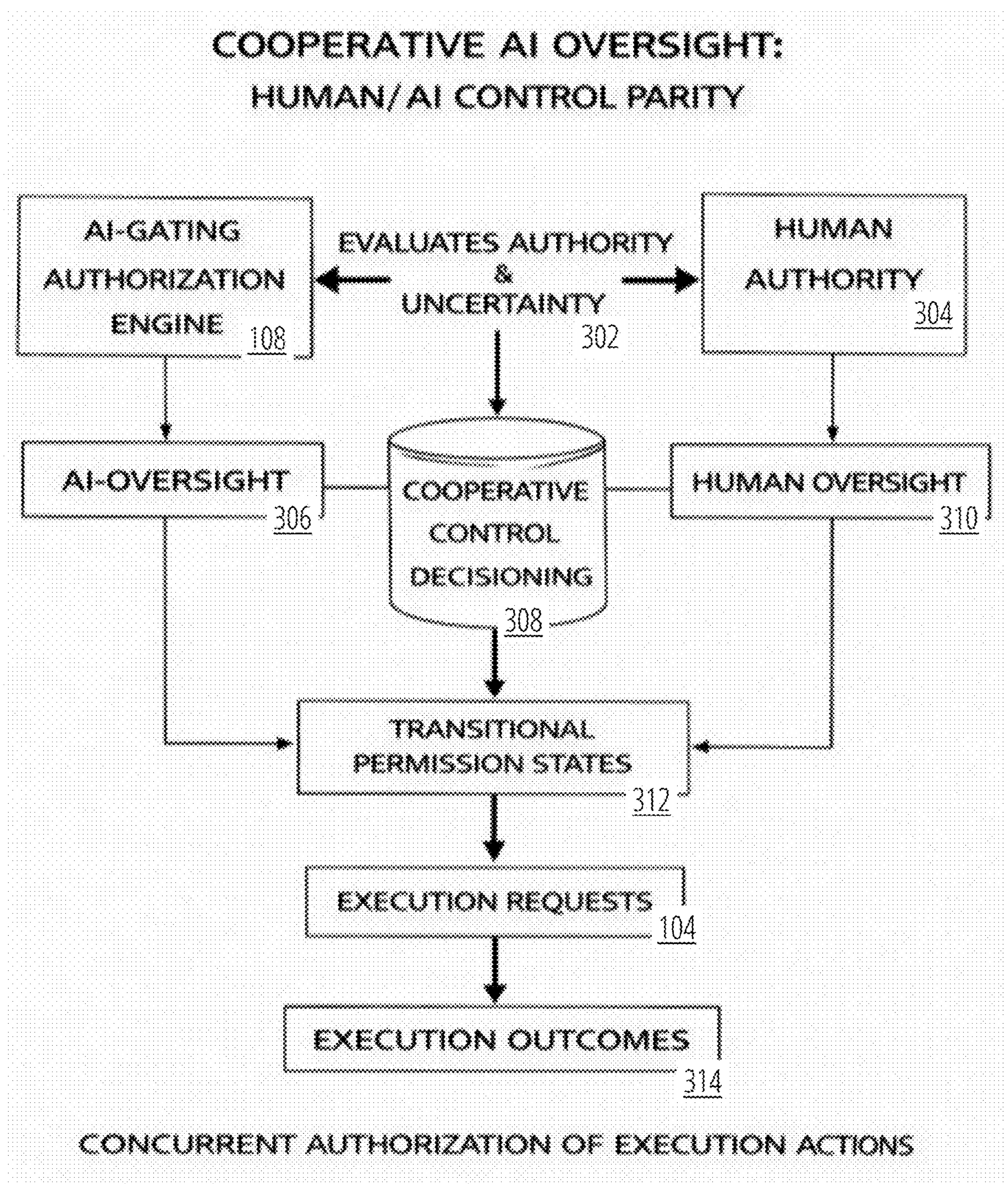
FIG. 3 illustrates execution mediation pathways enabled by AI-Gating, including allowing, constraining, throttling, sandboxing, pausing, or terminating execution based on evolving risk and context.

FIG. 3 illustrates an exemplary oversight architecture in which AI-Gated continuous authorization operates autonomously within predefined authority bounds and selectively escalates execution control decisions to human oversight when uncertainty or risk exceeds established thresholds.

The elements of FIG. 3 illustrate an embodiment in which an AI-Gating authorization engine 108 performs authority and uncertainty evaluation 302 in coordination with supervisory mechanisms. The authority and uncertainty evaluation 302 assesses predictive confidence, contextual volatility, and operational risk.

When authority and uncertainty evaluation 302 determines that risk levels remain within acceptable bounds, the AI-Gating authorization engine 108 may autonomously maintain execution authority. When uncertainty or risk exceeds threshold conditions, human authority 304 may be invoked.

AI-oversight 306 represents automated supervisory analytics that assist in evaluating execution conditions and may provide additional signals to cooperative control decisioning 308. Human oversight 310 represents human review, approval, modification, or override authority.

Cooperative control decisioning 308 integrates outputs from authority and uncertainty evaluation 302, human authority 304, and AI-oversight 306 to determine transitional permission states 312.

Transitional permission states 312 govern execution of action requests 104, resulting in execution outcomes 314.

Execution outcomes 314 reflect continued execution, constrained execution, suspension, or termination depending on the cooperative decision.

In this manner, FIG. 3 demonstrates scalable autonomous governance by the AI-Gating authorization engine 108, while preserving escalation pathways through human authority 304 and human oversight 310 when elevated uncertainty or risk conditions are identified by authority and uncertainty evaluation 302.

Human Oversight and Escalation Mechanisms

In addition to autonomous operation within predefined bounds, the AI-Gating continuous authorization system 102 incorporates a human oversight interface 304, 310 that enables cooperative governance when execution risk or uncertainty exceeds configurable thresholds.

As illustrated in FIG. 3, the AI-Gating authorization engine 108 continuously evaluates authority and uncertainty and routes high-consequence or ambiguous decisions to a cooperative control decisioning module. When the graded and revocable execution permission state approaches or surpasses a predefined uncertainty limit, the AI-Gating continuous authorization system 102 automatically escalates the pending decision to human authority 304 while simultaneously directing the execution mediation subsystem 122 to maintain the action in a constrained safe state. This constrained execution may include rate throttling, sandboxed operation, checkpoint pausing, or privilege narrowing sufficient to prevent irreversible effects, yet still permits essential low-risk portions of the workflow to continue under tight bounds until human input is received.

The escalation pathway is designed to preserve operational continuity rather than force an abrupt termination. Upon escalation, the human oversight 310 interface presents the operator with a concise, explainable summary that includes the current runtime context, the AI-Gating engine's uncertainty decomposition (epistemic versus aleatoric components), the proposed permission scope, and the rationale for the escalation.

The human reviewer may then approve the original scope, modify constraints, impose additional safeguards, or direct full termination. Any human-provided corrective labels or modified permission states are logged in the authorization events record and fed back into the federated training loop as supervised signals, thereby improving future model calibration for similar uncertainty patterns without requiring re-authentication of the underlying user or agent.

This cooperative parity model is particularly valuable in safety-critical domains such as cyber-physical system 508 and photonic therapeutic delivery. For example, during a neuromodulation session, if sensor drift or unexpected physiological variance elevates uncertainty beyond the calibrated threshold, the AI-Gating continuous authorization system 102 escalates to the clinician while holding laser fluence at a minimal safe level.

The clinician can review real-time telemetry and either resume full therapy or adjust parameters, all without interrupting the authenticated session or requiring the patient to be removed from the apparatus. In autonomous agent workflows, the same mechanism prevents unbounded propagation of uncertain actions by keeping the agent in a bounded task context pending human review.

The human oversight 310 interface is intentionally non-blocking for routine operations, allowing the AI-Gating authorization engine 108 to handle the vast majority of decisions at machine speed while reserving human attention for only those situations where model confidence is insufficient or irreversible consequences are possible.

All escalation events, human responses, and resulting permission state transitions are captured in the time-ordered audit log with full explainability metadata, supporting compliance, forensic reconstruction, and continuous improvement of the hybrid engine. By combining autonomous runtime gating with selective, context-aware human escalation, the AI-Gating continuous authorization system 102 achieves both scalable performance and accountable governance across heterogeneous execution environments.

Figure 4:
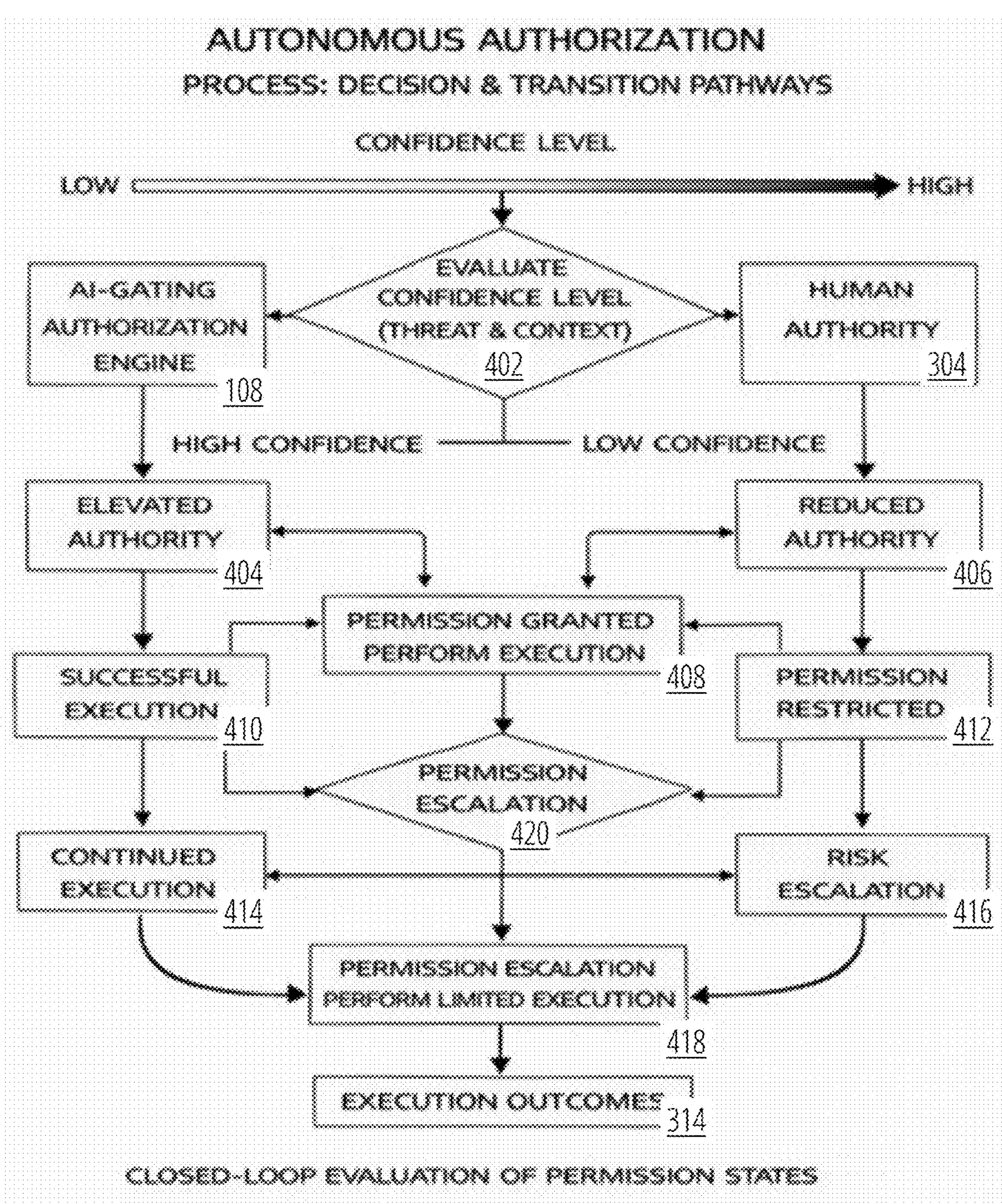
FIG. 4 illustrates categories of signal ingestion and example feature representations used by the AI-Gating authorization engine, including identity signals, behavioral signals, system state signals, and environmental or contextual signals.

FIG. 4 illustrates an embodiment in which AI-Gated continuous authorization governs actions generated by autonomous agents, artificial intelligence systems, or machine-driven workflows through confidence-based authority modulation. The architecture demonstrates how execution authority is dynamically expanded, constrained, escalated, or revoked in response to real-time evaluation of contextual risk and operational certainty.

An AI-Gating authorization engine 108 evaluates a confidence level (threat & context) 402 associated with an autonomous action or operational state. The confidence level 402 represents a quantified assessment of operational safety, contextual stability, behavioral compliance, anomaly likelihood, and risk exposure derived from runtime conditions.

When the confidence level 402 indicates high certainty and acceptable risk, the AI-Gating authorization engine 108 may assign elevated authority 404. Elevated authority 404 represents an authorization state in which expanded execution privileges are permitted. Under elevated authority 404, permission granted, perform execution 408 enables the autonomous system to carry out the requested action within approved parameters. If execution proceeds without deviation, successful execution 410 confirms compliance with expected behavior, and continued execution 414 permits ongoing operation under the maintained authority state.

Permission escalation 420 represents structured expansion of execution scope when sustained confidence conditions justify broader operational latitude. Permission escalation 420 may increase temporal scope, functional capability, operational throughput, or system interaction privileges, reflecting trust reinforcement based on validated performance.

Conversely, if the confidence level 402 reflects increased uncertainty, contextual instability, anomaly detection, or elevated threat conditions, the AI-Gating authorization engine 108 may assign reduced authority 406. Reduced authority 406 represents a narrowed authorization state in which execution privileges are restricted. Under reduced authority 406, permission restricted 412 constrains the scope, speed, access level, or operational capacity of the action. In more severe conditions, risk escalation 416 may trigger additional protective measures, including supervisory review, authority contraction, or protective containment.

Permission escalation-perform limited execution 418 represents a constrained transitional state in which execution may proceed only within tightly bounded parameters. This state allows partial continuation of operations while mitigating identified risk factors and preserving system stability.

All authority pathways, whether elevated authority 404 or reduced authority 406, ultimately result in execution outcomes 314. Execution outcomes 314 reflect the operative state of the action following evaluation by the AI-Gating authorization engine 108, including full execution, constrained execution, staged execution, or termination.

FIG. 4 therefore illustrates a graded, revocable, confidence-responsive authority framework in which the AI-Gating authorization engine 108 dynamically modulates execution authority based on continuous evaluation of the confidence level (threat & context) 402. The transitions among elevated authority 404, reduced authority 406, permission granted 408, permission restricted 412, risk escalation 416, permission escalation 420, and permission escalation—perform limited execution 418 collectively define a structured and adaptive authorization hierarchy. The resulting execution outcomes 314 reflect a continuously managed balance between autonomous operational efficiency and risk-sensitive control, enabling safe, scalable deployment of machine-driven or AI-generated actions.

Figure 5:
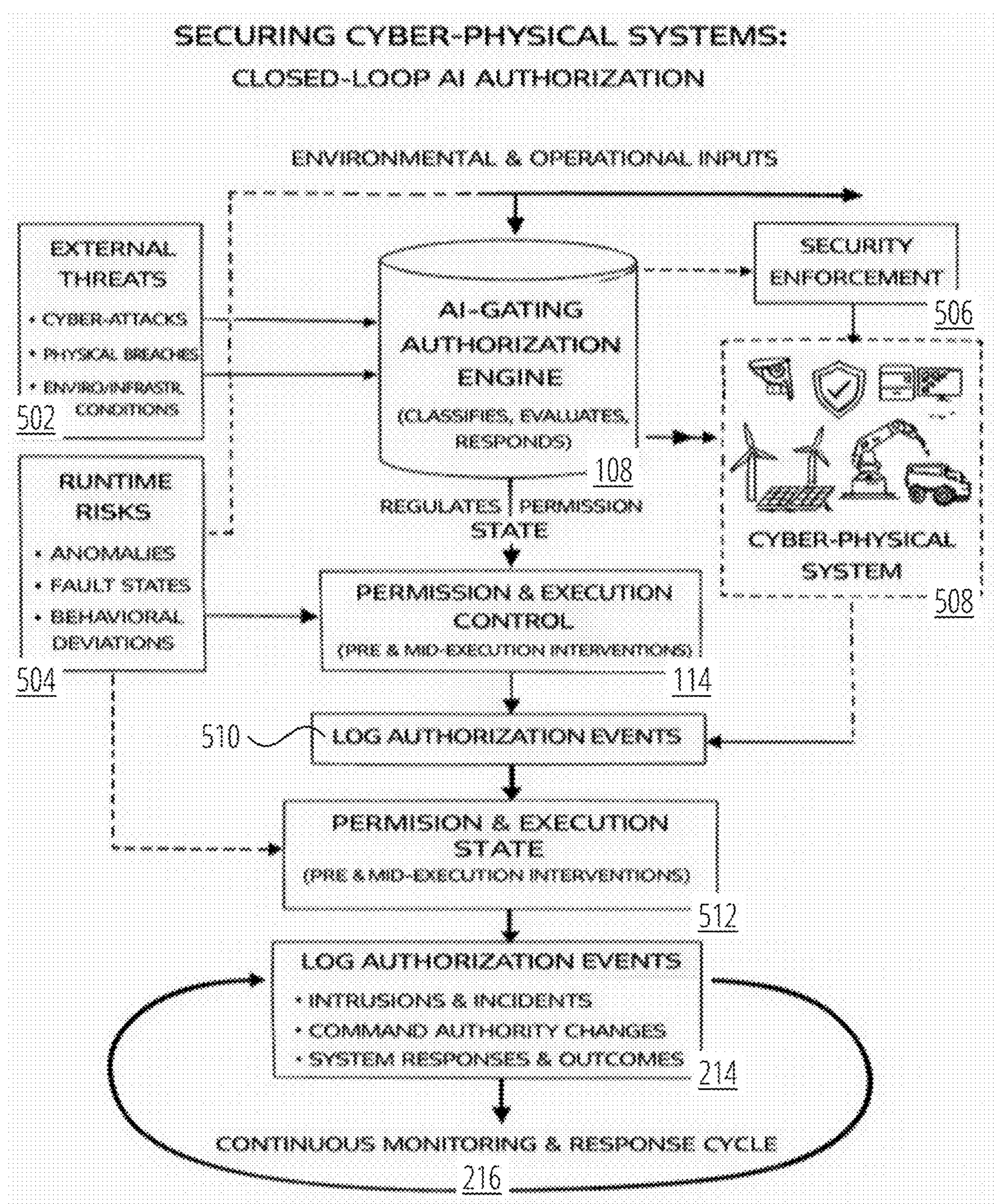
FIG. 5 illustrates a fail-secure constraint overlay that bounds AI-mediated execution, enforces non-negotiable safety constraints, and prevents irreversible or unsafe actions even under elevated uncertainty.

FIG. 5 illustrates an embodiment in which closed-loop AI-Gated authorization secures a cyber-physical system 508 through continuous threat assessment, authority modulation, and enforcement. In this architecture, the AI-Gating authorization engine 108 functions as the central decision-making component responsible for evaluating environmental and operational risk conditions and translating those evaluations into enforceable execution controls.

External threats 502 represent inputs originating outside the cyber-physical system, including network-based attacks, malicious command injections, adversarial interference, policy violations, or other hostile conditions. Runtime risks 504 represent dynamically emerging internal risk conditions such as anomalous behavior, performance deviations, unsafe command sequences, or uncertainty in system state.

Both external threats 502 and runtime risks 504 are provided to the AI-Gating authorization engine 108 for classification, contextual evaluation, and risk scoring. The AI-Gating authorization engine 108 analyzes these inputs in real time to determine appropriate authorization responses.

Based on evaluation of external threats 502 and runtime risks 504, the AI-Gating authorization engine 108 produces outputs directed to a permission and execution control component 114. The permission and execution control 114 represents the operative authorization state that defines allowable execution boundaries, including scope limitations, privilege levels, timing constraints, and safety restrictions.

In certain embodiments, execution authority governed by the AI-Gating authorization engine 108 extends to physical actuation within a cyber-physical control loop. Execution mediation may therefore include dynamic modulation of actuation parameters such as force magnitude, velocity, acceleration, trajectory, spatial envelope, timing, energy delivery, or duration of operation. Rather than granting fixed authority at session initiation, the AI-Gating continuous authorization system 102 continuously reassesses whether such physical actuation may begin, continue, escalate, or terminate based on evolving runtime context and associated uncertainty. In this manner, execution authority functions as a dynamically governed control variable within the physical actuation loop itself.

The permission and execution control 114 interfaces with an execution mediation subsystem 122. The execution mediation subsystem 122 enforces the graded and revocable authority determined by the AI-Gating authorization engine 108. Enforcement may include allowing execution, constraining operational parameters, delaying commands, modifying execution conditions, isolating subsystems, or terminating execution altogether.

Thus, the AI-Gating authorization engine 108 performs evaluation, while the execution mediation subsystem 122 performs enforcement under the direction of permission and execution control 114.

Security enforcement 506 represents the applied protective actions implemented against the cyber-physical system 508. The cyber-physical system 508 may include autonomous vehicles, robotics platforms, industrial machinery, medical systems, infrastructure control systems, or other integrated computational-physical environments.

Security enforcement 506 may include command filtering, authority reduction, sandboxing, rate limiting, isolation of compromised components, or invocation of failsafe states. These actions protect the cyber-physical system 508 from unsafe or malicious behavior while preserving safe operation where possible.

Log authorization events 510 records authorization decisions, enforcement actions, constraint applications, state transitions, overrides, and system responses. The log authorization events 510 provides traceability and accountability for decisions made by the AI-Gating authorization engine 108 and enforced by the execution mediation subsystem 122.

Permission and execution state 512 represents the current operative authorization condition governing the cyber-physical system 508. The permission and execution state 512 reflects the graded authority level presently active, including elevated authority, reduced authority, constrained execution, or failsafe conditions.

Log graded authorization events 214 records graded authority transitions over time, including escalation events, de-escalation events, revocations, and constraint modifications. The log graded authorization events 214 preserves historical state changes, confidence levels, risk assessments, and explanatory rationale associated with each authorization decision.

Continuous monitoring and response cycle 216 represents the iterative reassessment process by which the AI-Gating authorization engine 108 continually reevaluates external threats 502 and runtime risks 504 affecting the cyber-physical system 508. Through the continuous monitoring and response cycle 216, authorization decisions are dynamically updated, enforcement actions are revised, and the permission and execution state 512 is adapted in real time.

Accordingly, FIG. 5 demonstrates a closed-loop security architecture in which detection (external threats 502 and runtime risks 504), evaluation (AI-Gating authorization engine 108), authorization determination (permission and execution control 114), enforcement (execution mediation subsystem 122 and security enforcement 506), state reflection (permission and execution state 512), and auditability (log authorization events 510 and log graded authorization events 214) operate continuously under the continuous monitoring and response cycle 216 to safeguard the cyber-physical system 508.

Figure 6:
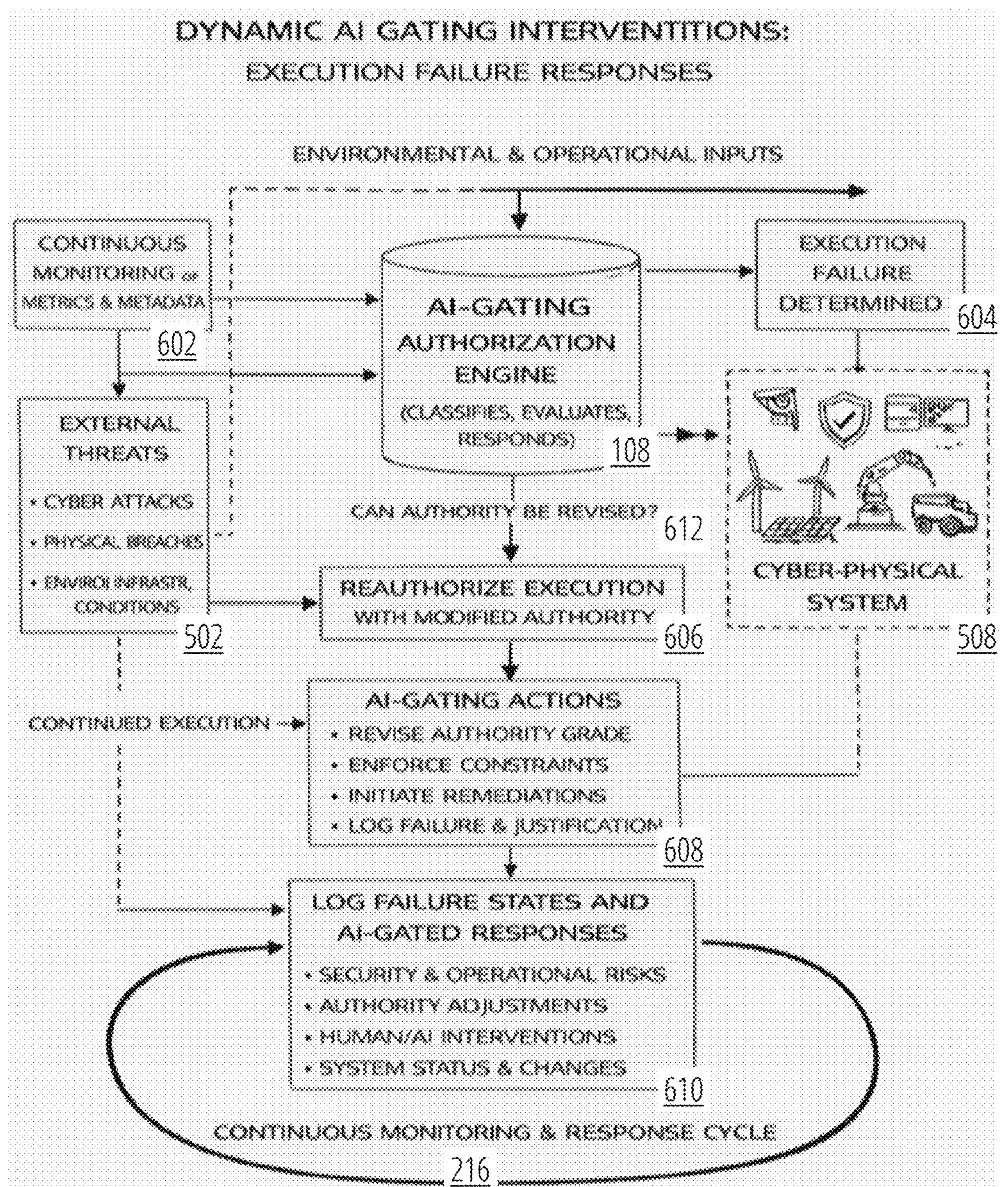
FIG. 6 illustrates an embodiment in which AI-Gating governs autonomous agents and machine-to-machine or API-based interactions by mediating execution authority for non-human actors.

FIG. 6 illustrates an embodiment in which AI-Gated continuous authorization governs dynamic intervention in response to execution failure conditions within a cyber-physical system. The architecture reflects a closed-loop failure response model in which detection, reassessment, authority revision, remediation, and logging operate in a coordinated and adaptive manner.

Continuous monitoring of metrics and metadata 602 represents real-time acquisition and evaluation of system telemetry, behavioral indicators, command traces, environmental inputs, performance data, and anomaly signals associated with a cyber-physical system 508. Continuous monitoring of metrics and metadata 602 may include sensor streams, communication integrity checks, runtime diagnostics, and operational state signals.

External threats 502 may also be detected during monitoring and provided as inputs to the AI-Gating authorization engine 108. The AI-Gating authorization engine 108 evaluates both continuous monitoring of metrics and metadata 602 and external threats 502 to determine whether system behavior remains within authorized operational boundaries.

When monitored conditions indicate a deviation, anomaly, or unsafe behavior, execution failure determined 604 represents a state in which an execution failure, instability, policy violation, or unsafe condition has been detected. Execution failure determined 604 may be triggered by threshold breaches, abnormal command sequences, performance degradation, integrity violations, or confidence collapse.

Upon detecting execution failure determined 604, the AI-Gating authorization engine 108 initiates reassessment of execution authority. The decision point can authority be revised 612 evaluates whether execution may continue under modified conditions or whether authority must be revoked entirely.

The can authority be revised 612 determination considers contextual risk severity, system recoverability, integrity status, and confidence metrics derived from continuous monitoring of metrics and metadata 602 and external threats 502.

If can authority be revised 612 indicates that execution may proceed under constrained conditions, reauthorize execution with modified authority 606 is applied. Reauthorize execution with modified authority 606 represents an adaptive authority adjustment in which privileges are reduced, constraints are imposed, operational scope is narrowed, or execution speed and throughput are limited.

AI-Gating actions 608 represent the specific remedial or protective measures implemented following authority reassessment. AI-Gating actions 608 may include isolating affected subsystems, throttling command rates, applying sandbox constraints, invoking staged recovery, triggering containment routines, or escalating supervisory alerts.

The cyber-physical system 508 continues operation under the revised authority defined by reauthorize execution with modified authority 606 and enforced through AI-Gating actions 608.

Log failure states and AI-Gated responses 610 stores records of detected execution failures, authority reassessment outcomes, implemented constraints, responsive system actions, and the explanatory rationale supporting each AI-Gated decision. Log failure states and AI-Gated responses 610 preserves forensic and compliance records associated with failure detection and mitigation.

Continuous monitoring and response cycle 216 represents the iterative and persistent reassessment process by which continuous monitoring of metrics and metadata 602 and external threats 502 continue to be evaluated after remediation. Through the continuous monitoring and response cycle 216, the AI-Gating authorization engine 108 may further revise authority, restore privileges if risk subsides, or escalate intervention if instability persists.

Accordingly, FIG. 6 demonstrates a structured failure-handling architecture in which detection (execution failure determined 604), authority reassessment (can authority be revised 612), adaptive mitigation (reauthorize execution with modified authority 606 and AI-Gating actions 608), enforcement against the cyber-physical system 508, logging (log failure states and AI-Gated responses 610), and iterative reassessment (continuous monitoring and response cycle 216) collectively ensure resilient, graded, and revocable control under adverse or unstable conditions.

Runtime Risk Detection and Fail-Safe Interventions in Cyber-Physical Environments In cyber-physical systems (CPS) 508, where computational decisions directly influence physical processes, such as industrial control (e.g., wind turbines, robotic arms), energy distribution, transportation actuators, or photonic therapeutic delivery devices, the AI-Gating continuous authorization system 102 provides a closed-loop supervisory layer that detects runtime risks in real time and enforces fail-secure interventions to prevent harm.

As depicted in FIG. 5, external threats 502 (cyber-attacks, physical breaches, environmental/infrastructural conditions) and internal runtime risks (anomalies, fault states, behavioral deviations) feed into the AI-Gating authorization engine 108, which classifies, evaluates, and responds by regulating the permission and execution state. This regulation manifests through pre-execution gating 114 that blocks unsafe initiation and mid-execution interventions that modulate ongoing actions before irreversible physical effects occur.

Runtime risk detection operates continuously via the observer/reporter components and runtime context acquisition 112, which ingest multi-modal signals: sensor telemetry (e.g., vibration, temperature, physiological metrics in medical embodiments), behavioral patterns of autonomous agents or workflows, system state vectors (resource utilization, latency spikes), and environmental indicators (noise, drift, out-of-distribution inputs).

The AI-Gating authorization engine 108 decomposes these into quantitative uncertainty indicators, separating aleatoric uncertainty (inherent stochasticity, such as sensor noise in a wind turbine's anemometer) from epistemic uncertainty (model ignorance, such as novel fault signatures or adversarial perturbations). When combined uncertainty exceeds calibrated thresholds, or when specific risk signatures (e.g., command-response anomalies, intrusion patterns, or behavioral drift from expected trajectories) are detected, the AI-Gating authorization engine 108 triggers authority contraction as a first-class control action.

Fail-secure interventions prioritize containment over termination to maintain partial operability where possible. Upon risk escalation, the execution mediation subsystem 122 applies non-binary constraints: rate throttling (slowing actuation to safe limits), privilege narrowing (restricting access to subsets of resources or actuators), staged/checkpoint enforcement (pausing at safe boundaries for re-evaluation), sandboxed execution (isolating effects to virtual or buffered pathways), or selective termination of high-risk sub-actions while allowing low-risk continuations.

For example, in a photonic therapeutic system delivering light-based neuromodulation, elevated uncertainty from physiological variance or sensor drift prompts the AI-Gating authorization engine 108 to reduce fluence rate, enforce intermediate checkpoints (e.g., pause after each pulse sequence), and hold the AI-Gating continuous authorization system 102 in a minimal safe state (low-intensity monitoring mode) pending re-authorization or human escalation. This prevents over-delivery or unintended tissue damage without requiring full session abort.

The fail-secure constraint overlay, encoded in the symbolic rule layer, imposes non-negotiable hard limits that supersede probabilistic neural outputs, ensuring irreversible actions (e.g., exceeding maximum photonic dosage caps, irreversible data exports, or actuator commands that could cause mechanical failure) are prohibited even under high model confidence.

As shown in FIG. 6, when execution failure is determined 604, the AI-Gating authorization engine 108 assesses whether authority can be revised 612, reauthorizes with modified constraints (e.g., revised authority grade, enforced remediations), logs failure states and justifications 608, and loops back into continuous monitoring 216. All interventions, including authority adjustments, human/AI escalations, and system status changes, are recorded in the authorization events log 214, 510 with timestamps, rationales, and uncertainty decompositions, enabling forensic reconstruction, compliance auditing, and post-incident analysis.

This closed-loop approach shifts CPS security from reactive detection (after harm occurs) to proactive governance: runtime risks become actionable signals that dynamically narrow execution authority to the minimum safe envelope required for the current context. By treating uncertainty as a direct modulator of permission scope, the system achieves bounded autonomy for autonomous agents, fail-operational behavior in non-catastrophic scenarios, and guaranteed containment in high-consequence domains, all while preserving auditable traceability across heterogeneous environments.

Figure 7:
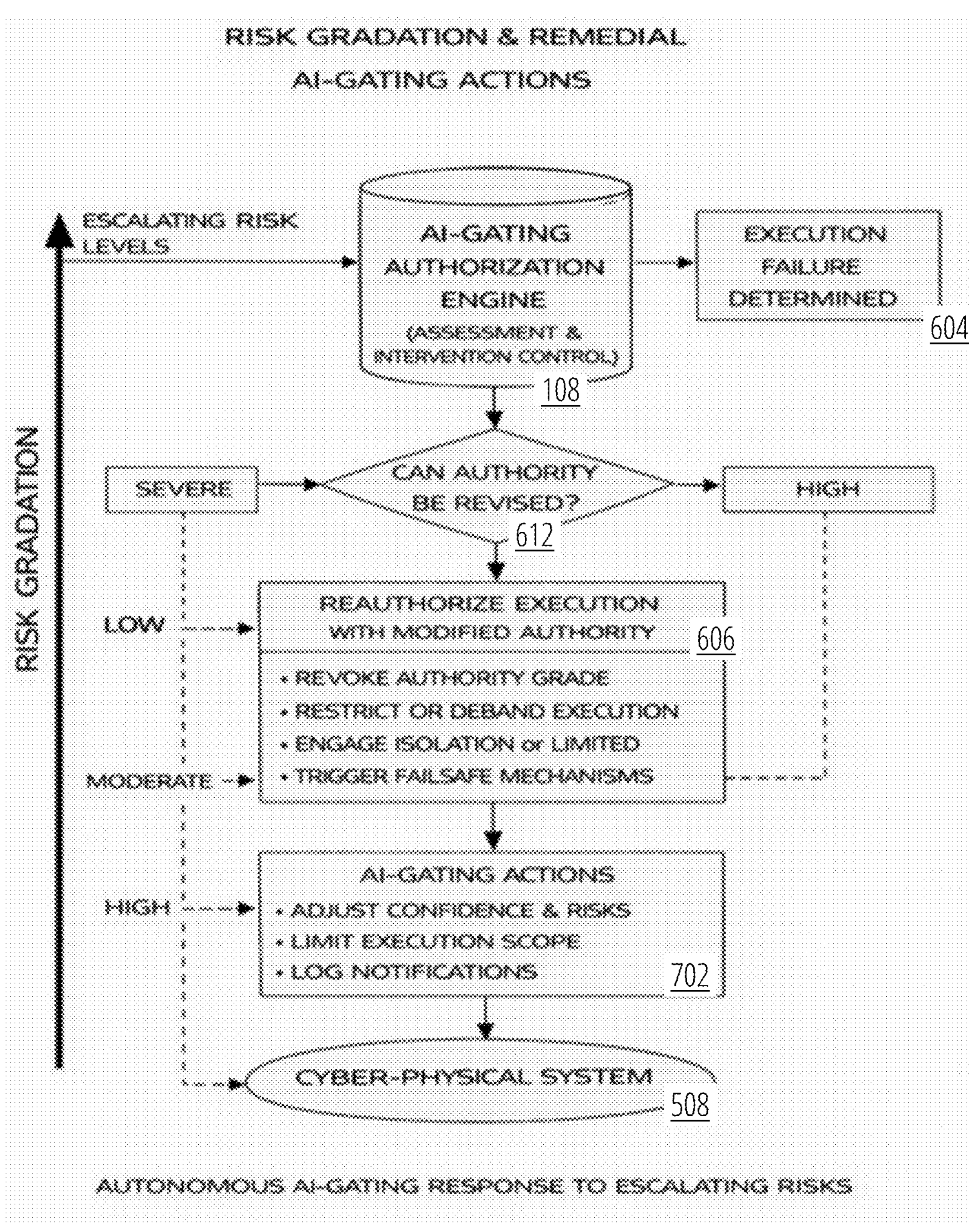
FIG. 7 illustrates auditability and logging mechanisms associated with AI-Gated execution control, including recording of authorization decisions, permission state transitions, and execution mediation events.

FIG. 7 illustrates an embodiment in which AI-Gated continuous authorization performs graded risk evaluation and adaptive remedial intervention following detection of instability or failure within a controlled environment. FIG. 7 demonstrates how authority is reassessed, revised, and enforced in response to escalating risk conditions affecting a cyber-physical system 508.

An AI-Gating authorization engine 108 functions as the central evaluation and control authority. The AI-Gating authorization engine 108 continuously evaluates operational stability, contextual integrity, and behavioral compliance associated with the cyber-physical system 508.

Execution failure determined 604 represents detection of an execution anomaly, policy violation, instability, or unsafe operational state. Execution failure determined 604 may arise from performance deviations, abnormal command patterns, integrity compromise, or contextual risk escalation.

Upon detecting execution failure determined 604, the AI-Gating authorization engine 108 initiates authority reassessment through the decision node can authority be revised 612. The can authority be revised 612 determination evaluates whether the cyber-physical system 508 can safely continue operation under reduced or modified authority conditions, or whether execution must be further restricted.

The can authority be revised 612 analysis considers risk severity, recoverability potential, system confidence levels, operational dependencies, and safety thresholds.

If can authority be revised 612 indicates that partial recovery is feasible, reauthorize execution with modified authority 606 is invoked. Reauthorize execution with modified authority 606 represents a downgraded or constrained authority state in which operational scope, privilege level, command bandwidth, or execution autonomy is reduced.

The reauthorize execution with modified authority 606 state may include revoking authority grade, restricting execution privileges, limiting functional scope, reducing command throughput, or imposing sandbox boundaries around specific subsystems of the cyber-physical system 508.

AI-Gating Actions 702 represent specific remedial or protective interventions applied following authority revision. AI-Gating Actions 702 may include adjusting confidence thresholds, recalibrating risk parameters, applying constraint enforcement, initiating subsystem isolation, enforcing rate limits, or triggering failsafe modes.

The cyber-physical system 508 operates subject to the authority conditions determined by reauthorize execution with modified authority 606 and the protective measures implemented through AI-Gating Actions 702. If instability persists or risk continues to escalate, further contraction of authority or complete suspension may occur in subsequent evaluation cycles.

Accordingly, FIG. 7 illustrates a structured risk gradation framework in which detection (execution failure determined 604), authority reassessment (can authority be revised 612), authority contraction (reauthorize execution with modified authority 606), and remedial enforcement (AI-Gating Actions 702) collectively provide adaptive, graded, and revocable governance of the cyber-physical system 508 under elevated risk conditions.

Figure 8:
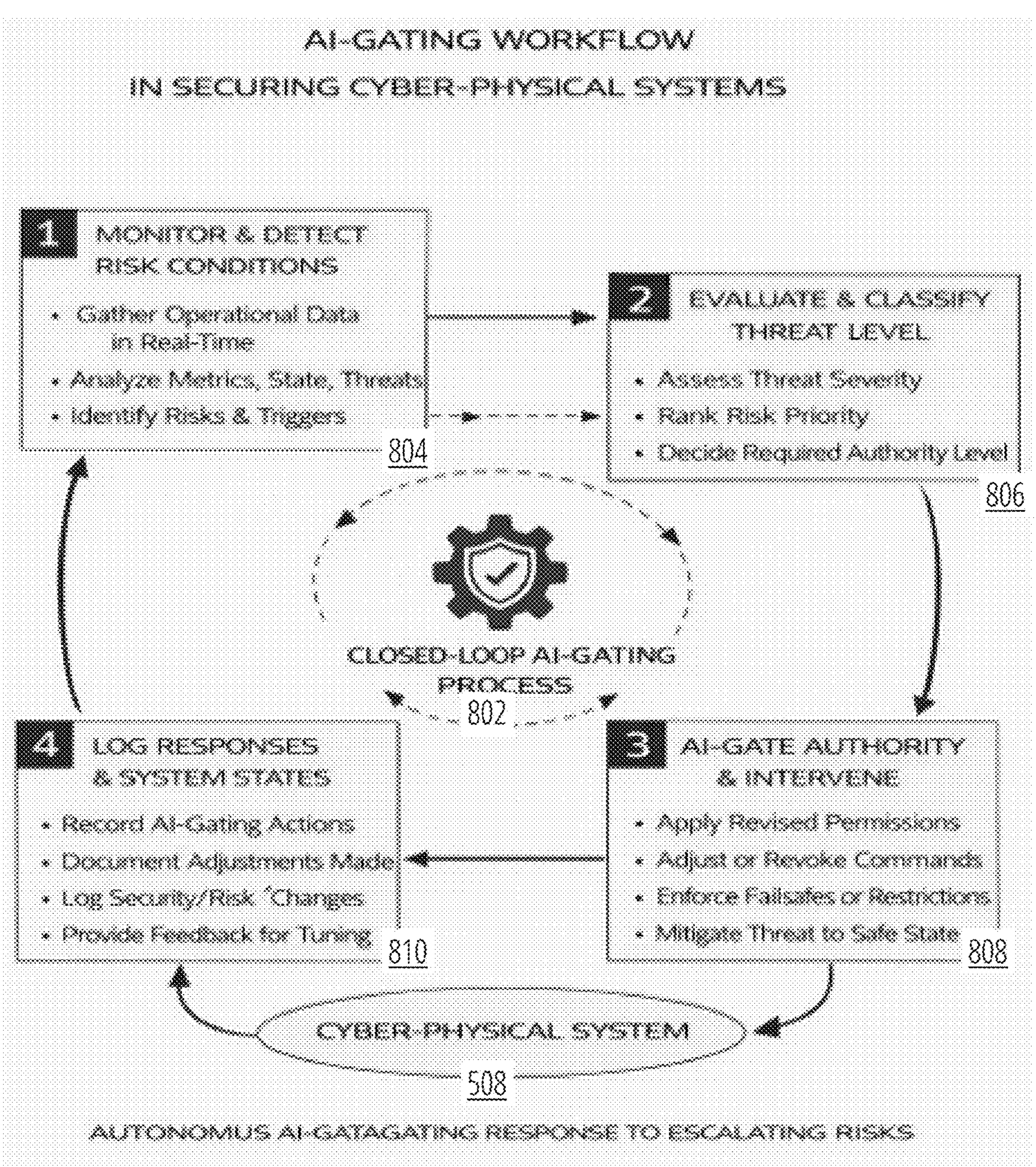
FIG. 8 illustrates policy handling and uncertainty-aware authorization logic, including adaptive adjustment of execution authority in response to confidence levels, risk thresholds, and contextual ambiguity.

FIG. 8 illustrates an embodiment of a closed-loop AI-Gating process 802 governing dynamic risk evaluation and intervention within a cyber-physical system 508. The closed-loop AI-Gating process 802 represents an iterative authorization cycle in which risk detection, threat classification, authority modulation, and response logging operate continuously to maintain system integrity and operational safety.

The cyber-physical system 508 may represent any integrated computational-physical environment subject to autonomous or semi-autonomous control, including robotics platforms, industrial control systems, medical systems, infrastructure networks, or distributed machine-driven environments.

Within the closed-loop AI-Gating process 802, monitor and detect risk conditions 804 represents continuous acquisition and evaluation of system telemetry, behavioral indicators, anomaly signals, environmental inputs, and operational metadata associated with the cyber-physical system 508. Monitor and detect risk conditions 804 may include real-time performance diagnostics, integrity verification, anomaly detection algorithms, and contextual state monitoring.

Following detection, evaluate and classify threat level 806 assesses the severity, likelihood, and potential impact of identified risks. Evaluate and classify threat level 806 may assign graded risk scores, categorize threat types, determine confidence levels, and identify whether conditions remain within authorized operational thresholds. This evaluation informs subsequent authority decisions within the closed-loop AI-Gating process 802.

Based on the classification performed by evaluate and classify threat level 806, AI-Gating authority and intervene 808 applies graded, revocable execution authority adjustments. AI-Gating authority and intervene 808 may include reducing authority scope, restricting operational privileges, throttling command throughput, isolating subsystems, imposing sandbox constraints, or invoking staged failsafe conditions affecting the cyber-physical system 508.

Log responses and system states 810 records authorization decisions, authority transitions, constraint applications, detected risk classifications, and system behavioral outcomes. Log responses and system states 810 provides persistent auditability, traceability, and compliance documentation associated with the closed-loop AI-Gating process 802.

The closed-loop AI-Gating process 802 is continuous and iterative. After intervention through AI-Gating authority and intervene 808 and logging through log responses and system states 810, the process returns to monitor and detect risk conditions 804 to reassess the cyber-physical system 508 under updated operational conditions. Through this structured cycle, FIG. 8 illustrates an adaptive authorization architecture in which detection (804), classification (806), authority modulation (808), logging (810), and reassessment (802) collectively provide resilient, graded, and continuously adaptive governance of the cyber-physical system 508.

Figure 9:
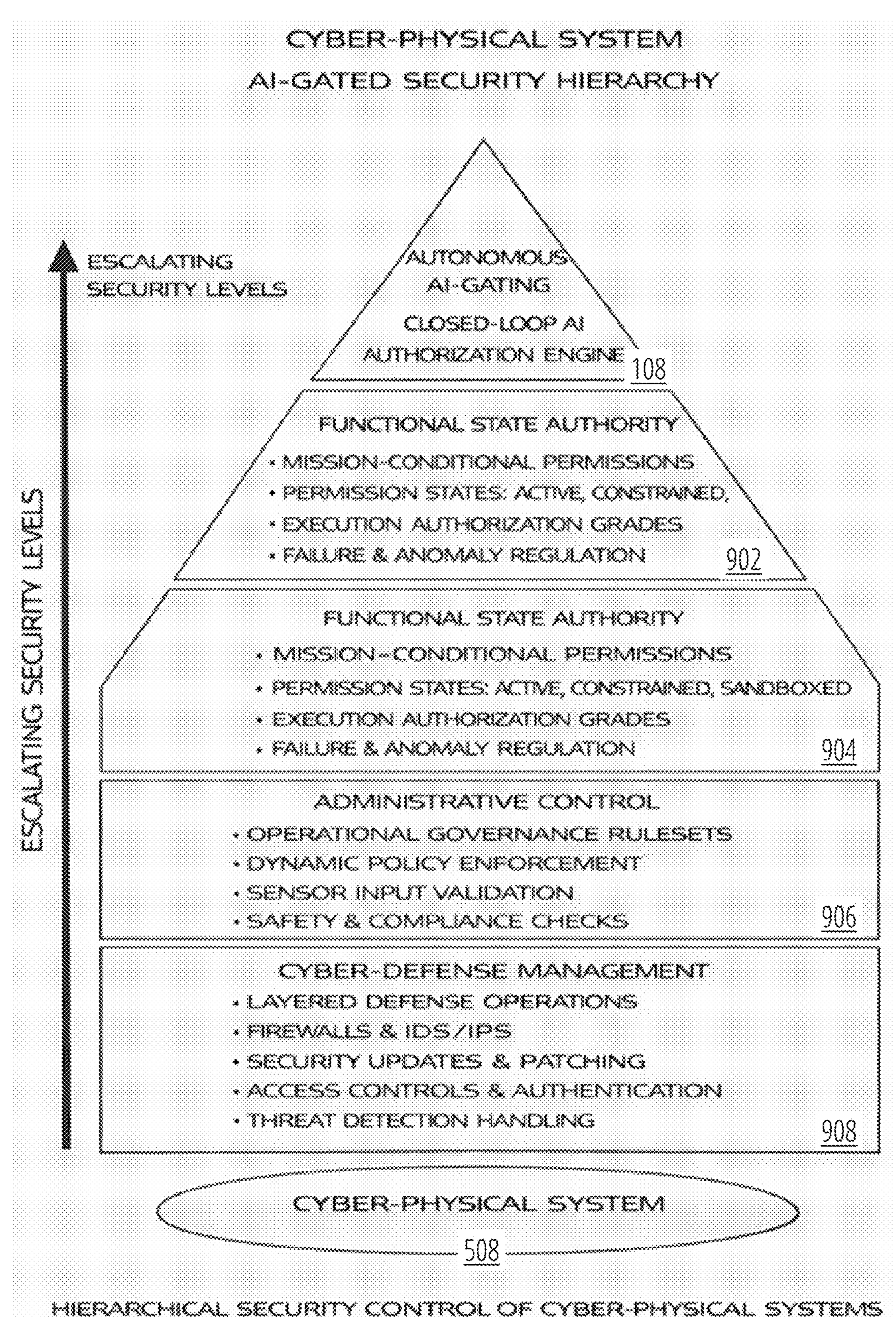
FIG. 9 illustrates representative use-case instantiations of AI-Gated execution control across one or more application domains, demonstrating portability of the control paradigm.

FIG. 9 illustrates an embodiment of a hierarchical AI-Gated security architecture in which authority, governance, and cyber-defense layers are organized in a structured control stack to protect and regulate a cyber-physical system 508. The architecture demonstrates how graded, revocable authorization is integrated across functional, administrative, and cyber-defense domains under the supervision of an AI-Gating authorization engine 108.

The AI-Gating authorization engine 108 operates as a top-level closed-loop authorization authority responsible for evaluating contextual risk, operational integrity, behavioral compliance, and threat conditions affecting the cyber-physical system 508. The AI-Gating authorization engine 108 dynamically modulates permission states and execution authority across multiple layers of the hierarchy.

Functional state authority 902 represents a mission-conditional authority layer that governs operational permissions tied to the functional state of the cyber-physical system 508. Functional state authority 902 may define whether the system is operating in an active state, a constrained state, a degraded state, or a limited capability mode. This layer regulates execution privileges based on current mission objectives, environmental conditions, and performance thresholds.

Functional state authority 904 represents an additional or parallel functional authority layer that may operate at a subsystem or domain-specific level within the cyber-physical system 508. Functional state authority 904 may enforce narrower scope permissions, sandboxing rules, compartmentalized authority boundaries, or conditional operational allowances. Together, functional state authority 902 and functional state authority 904 provide graded and context-sensitive control over system capabilities.

Administrative control 906 represents governance rules, operational policies, compliance constraints, and safety parameters that define overarching system boundaries. Administrative control 906 may include dynamic policy enforcement, regulatory compliance checks, operator-defined authority limits, safety interlocks, and procedural controls. Administrative control 906 ensures that even if functional authority is elevated, execution remains bounded by administrative and compliance requirements.

Cyber-defense management 908 represents layered defensive mechanisms that protect the cyber-physical system 508 from malicious interference and security compromise. Cyber-defense management 908 may include firewalls, intrusion detection systems, authentication and access control mechanisms, encryption controls, patch management systems, and threat detection analytics. Cyber-defense management 908 operates in coordination with the AI-Gating authorization engine 108 to ensure that authority modulation reflects both operational and security conditions.

The cyber-physical system 508 resides beneath and is governed by the hierarchical structure composed of AI-Gating authorization engine 108, functional state authority 902, functional state authority 904, administrative control 906, and cyber-defense management 908. Authority decisions made by the AI-Gating authorization engine 108 propagate downward through functional state authority 902 and functional state authority 904 while remaining constrained by administrative control 906 and reinforced by cyber-defense management 908.

Accordingly, FIG. 9 illustrates a layered authorization model in which the AI-Gating authorization engine 108 integrates contextual evaluation with multi-layer governance. Functional state authority 902 and 904 regulate mission and subsystem permissions; administrative control 906 enforces policy and compliance; cyber-defense management 908 ensures protective integrity; and the cyber-physical system 508 operates within the dynamically modulated, graded, and revocable authority structure established by the hierarchy.

Figure 10:
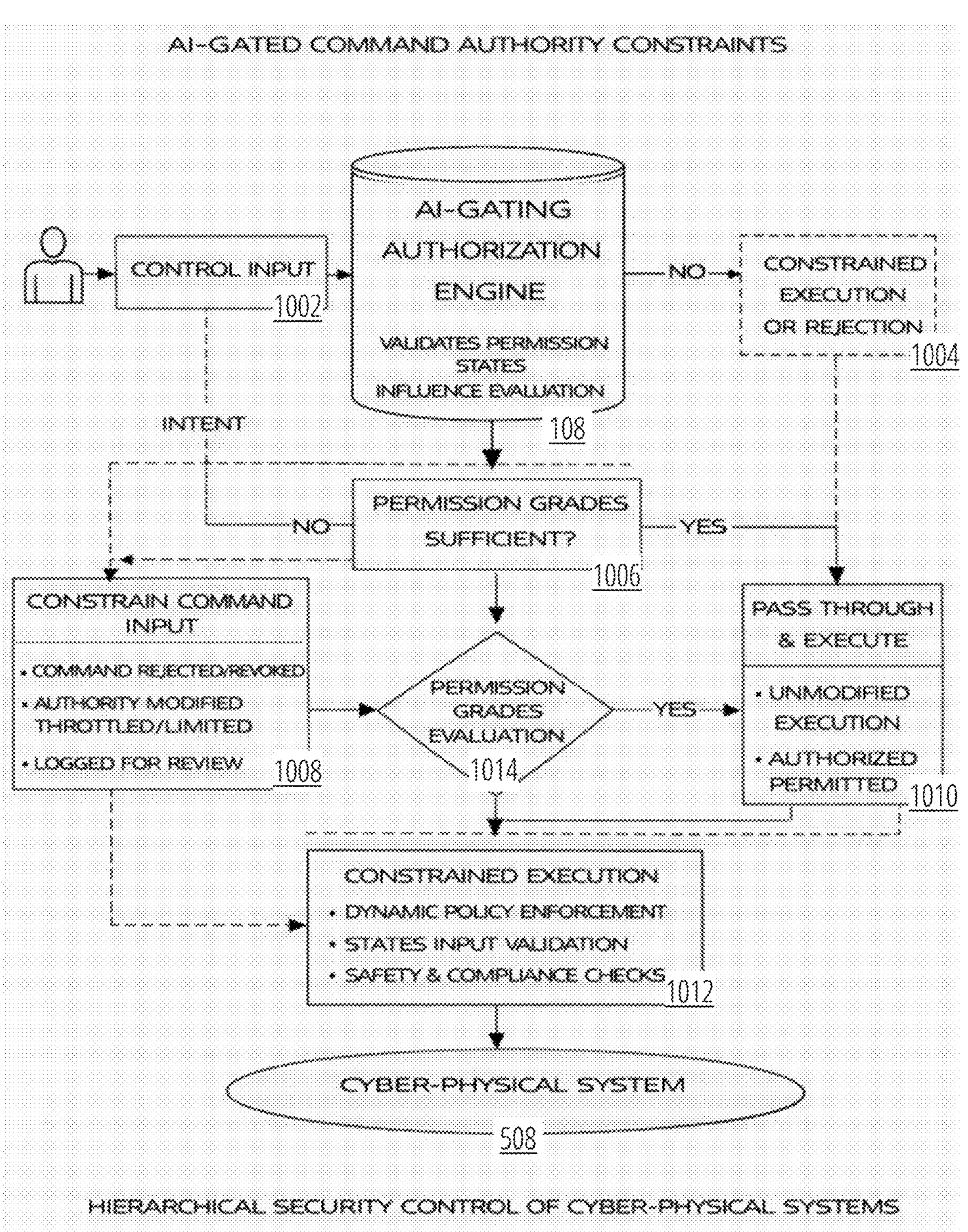
FIG. 10 illustrates escalation and reporting interfaces associated with AI-Gated execution control, including graded escalation, notification pathways, and interfaces with external reporting or oversight systems.

FIG. 10 illustrates an embodiment in which AI-Gated continuous authorization governs command authority constraints applied to a cyber-physical system 508. The figure demonstrates how command inputs are evaluated, graded, constrained, or rejected through structured authority evaluation and mediation.

Control input 1002 represents an incoming command, instruction, or operational request originating from a human operator, supervisory controller, automated subsystem, or external interface. The control input 1002 is submitted for authorization prior to execution affecting the cyber-physical system 508.

The control input 1002 is evaluated by an AI-Gating authorization engine 108. The AI-Gating authorization engine 108 analyzes contextual information, risk indicators, behavioral compliance metrics, operational constraints, and system state conditions to determine whether execution may proceed and under what authority level.

Permission grades are sufficient? 1006 represents a decision node evaluating whether the current authority grade associated with the control input 1002 meets required thresholds for execution. The permission grades are sufficient? 1006 evaluation considers operational context, authority assignments, and risk tolerance parameters.

If permission grades are sufficient? 1006 indicates that authority thresholds are satisfied, execution may proceed along an authorized path.

When authorized, pass through and execute 1010 represents execution of the control input 1002 under approved authority conditions. Pass through and execute 1010 may occur during an authorized period in which permission grades remain stable and within acceptable risk thresholds.

Constrain command input 1008 represents a mechanism for modifying or limiting authority even after initial evaluation. Constrain command input 1008 may include override directives, authority modification signals, throttling commands, privilege reduction instructions, sandbox restrictions, or supervisory adjustments.

Permission grades evaluation 1014 represents a subsequent or parallel authority reassessment stage that may incorporate constrain command input 1008 and updated contextual information. Permission grades evaluation 1014 determines whether additional constraints should be imposed or whether authority should be revised.

If permission grades evaluation 1014 determines that execution should be limited rather than fully allowed, constrained execution 1012 represents execution under dynamic policy enforcement and authority restriction. Constrained execution 1012 may include reduced scope, limited command range, rate limiting, compartmentalized execution, checkpoint enforcement, or safety interlock activation affecting the cyber-physical system 508.

The AI-Gating authorization engine 108 therefore governs transitions among constrained execution or rejection 1004, pass through and execute 1010, and constrained execution 1012 based on evaluations performed at permission grades are sufficient? 1006 and permission grades evaluation 1014, incorporating any constrain command input 1008.

Accordingly, FIG. 10 illustrates a structured, graded command authorization framework in which control input 1002 is continuously evaluated, modulated, and enforced by the AI-Gating authorization engine 108 to ensure that the cyber-physical system 508 operates only within dynamically validated authority boundaries.

Figure 11:
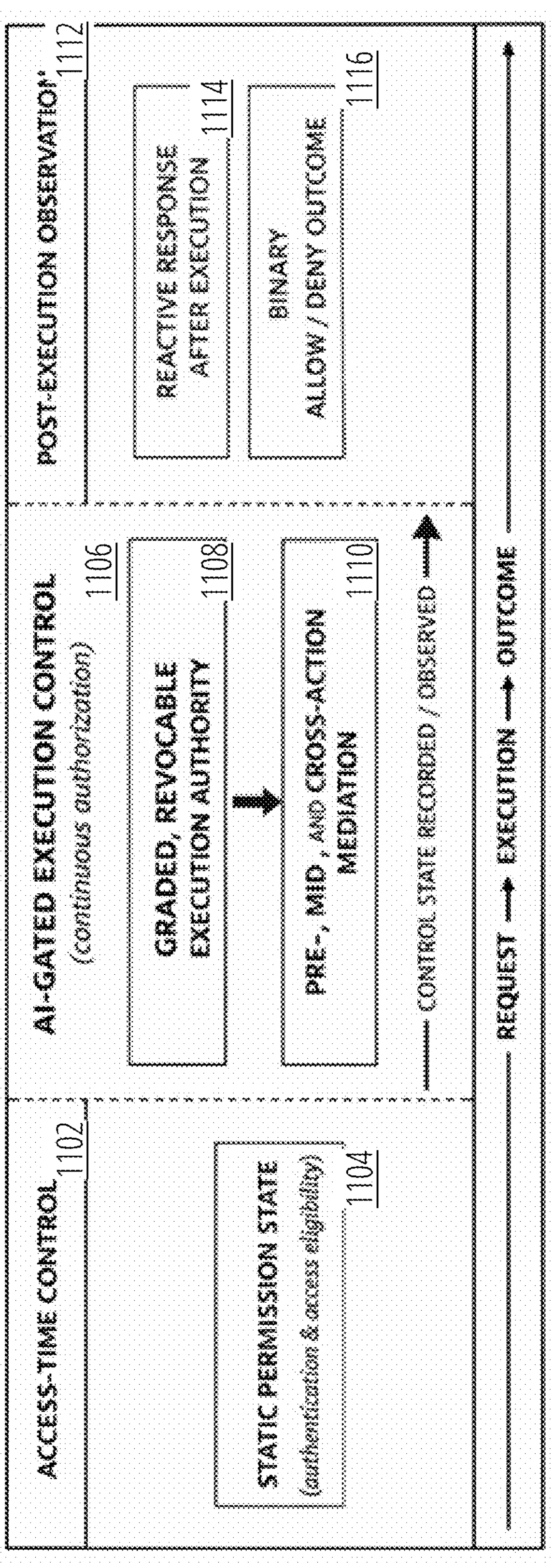
FIG. 11 illustrates a comparative control model contrasting access-time control, post-execution observation, and AI-Gated execution control within an action lifecycle.

FIG. 11 illustrates a comparative control model highlighting the distinction between traditional access-time authorization and AI-Gated continuous execution control. FIG. 11 demonstrates how static permission decisions differ fundamentally from graded, revocable authority applied dynamically throughout an action lifecycle.

Access-time control 1102 represents conventional authorization performed at the time of authentication or initial access request. Access-time control 1102 typically evaluates identity credentials, role assignments, and predefined policies to determine whether access is permitted.

Access-time control 1102 produces a static permission state 1104. The static permission state 1104 reflects a fixed authorization condition that remains in effect after access is granted, unless manually changed or externally revoked. This static permission state 1104 typically results in a binary allow/deny outcome 1116.

Binary allow/deny outcome 1116 represents a simplified authorization decision in which execution is either fully permitted or fully denied without mid-execution adaptation. Once execution begins under binary allow/deny outcome 1116, subsequent behavioral changes or contextual drift may not automatically trigger authority reassessment.

In contrast, AI-Gated execution control 1106 represents a dynamic, context-aware authorization framework that continuously evaluates authority throughout the lifecycle of an action. AI-Gated execution control 1106 incorporates real-time contextual inputs, behavioral monitoring, uncertainty analysis, and risk scoring to adapt permission states during execution.

Under AI-Gated execution control 1106, graded, revocable execution authority 1108 replaces static permission assignment. Graded, revocable execution authority 1108 defines multiple authority levels rather than a binary state. Authority levels may expand, contract, or be revoked depending on operational context, confidence metrics, and detected risk.

Pre-, mid-, cross-action mediation 1110 represents execution control applied before execution begins, during execution, and across sequential or related actions. Pre-, mid-, cross-action mediation 1110 enables intervention at any stage of the action lifecycle, including throttling, constraining, sandboxing, pausing, or terminating execution.

Post-execution observation 1112 represents monitoring and analysis performed after completion of an action. Post-execution observation 1112 may include audit logging, anomaly review, behavioral analysis, and performance assessment. However, post-execution observation 1112 does not inherently alter authority during execution.

Reactive response after execution 1114 represents corrective or remedial actions taken after execution has occurred, such as alerts, forensic investigation, rollback procedures, or system recovery operations.

FIG. 11 therefore illustrates the architectural distinction between access-time control 1102 producing a static permission state 1104 and binary allow/deny outcome 1116, versus AI-Gated execution control 1106 employing graded, revocable execution authority 1108 and pre-, mid-, cross-action mediation 1110 to enable continuous, adaptive, and context-responsive governance. Post-execution observation 1112 and reactive response after execution 1114 remain available in both models, but AI-Gated execution control 1106 uniquely provides mid-execution adaptability and graded authority modulation.

Figure 12:
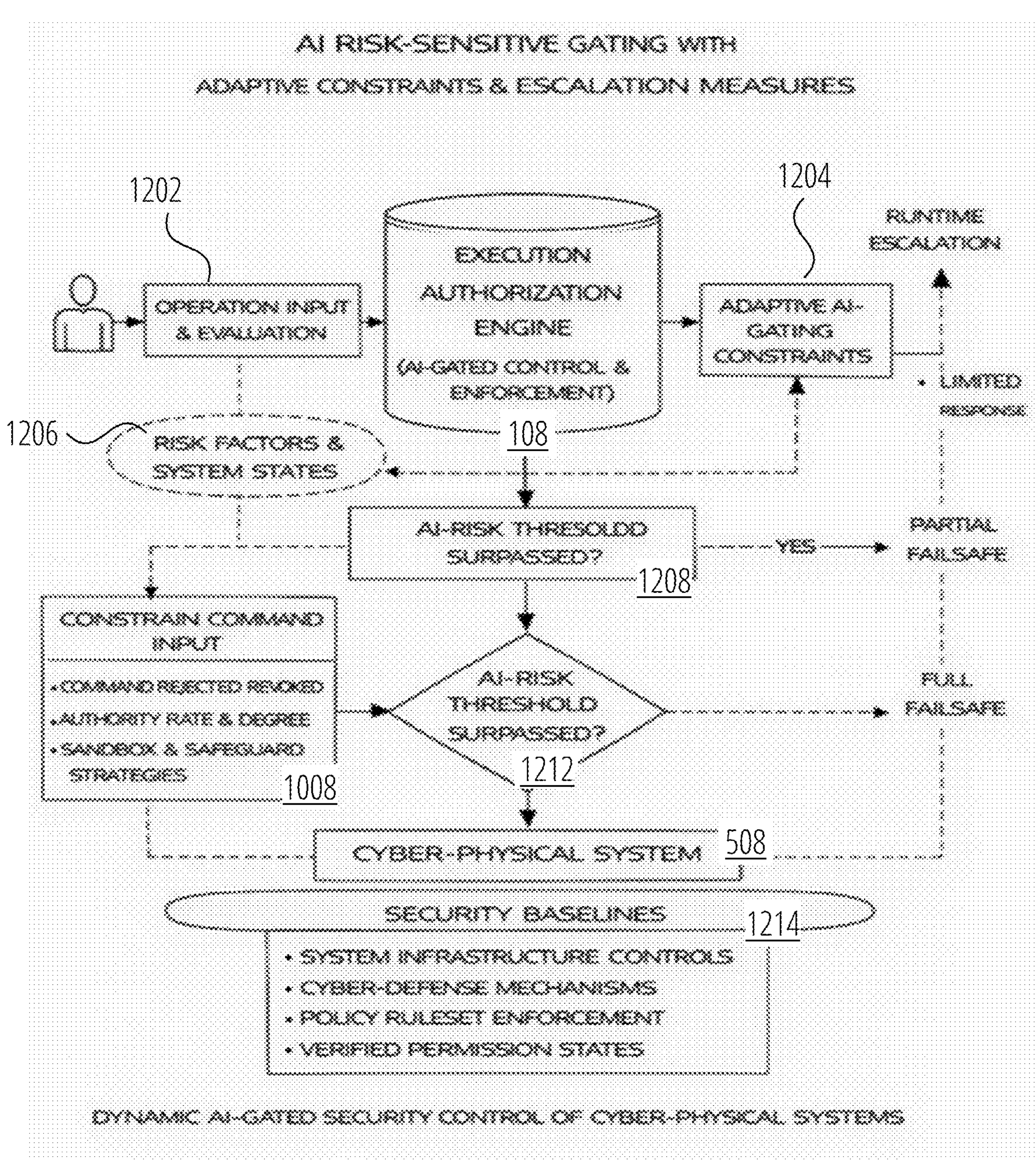
FIG. 12 illustrates an AI-Gated bounded-autonomy control loop for autonomous and cyber-physical systems, showing risk-sensitive execution authority, adaptive constraints, and fail-safe behavior under increasing uncertainty.

FIG. 12 illustrates an embodiment of AI risk-sensitive gating in which adaptive constraints and escalation logic are applied to govern execution affecting a cyber-physical system 508. The architecture demonstrates how risk thresholds dynamically influence authority contraction, constraint enforcement, and failsafe activation.

Operation input and evaluation 1202 represents the initial stage at which a command, action request, or operational directive is submitted for authorization. Operation input and evaluation 1202 may include command parsing, contextual tagging, identity association, and initial risk scoring.

Risk factors and system states 1206 represent contextual and environmental inputs associated with the cyber-physical system 508. Risk factors and system states 1206 may include telemetry signals, anomaly indicators, threat intelligence, behavioral deviations, performance metrics, system integrity measurements, and confidence scores. These inputs provide the dynamic context necessary for risk-sensitive authorization decisions.

The operation input and evaluation 1202 and risk factors and system states 1206 are provided to an execution authorization engine 108. The execution authorization engine 108 functions as an AI-Gating execution control plane responsible for determining permissible authority states and enforcement conditions based on evaluated risk and system context.

AI-Risk threshold surpassed? 1208 represents a decision node evaluating whether detected risk factors exceed a predefined escalation threshold. If AI-Risk threshold surpassed? 1208 is not satisfied, execution may proceed within established authority bounds under continued monitoring.

If AI-Risk threshold surpassed? 1208 is satisfied, adaptive constraints and gating constraints 1204 are applied. Adaptive constraints and gating constraints 1204 represent dynamically imposed limitations such as reduced authority scope, rate limiting, sandbox enforcement, privilege contraction, subsystem isolation, or staged restriction of operational capacity.

In certain embodiments, the AI-Gating continuous authorization system 102 further includes non-negotiable integrity constraints that operate independently of predictive confidence outputs generated by the AI-Gating authorization engine 108. Such constraints may define maximum permissible force thresholds, velocity limits, spatial boundaries, safety envelopes, energy exposure limits, structural tolerances, or other deterministic safeguards associated with safe system operation. When predefined safety thresholds are approached or exceeded, a permission and constraint enforcement 114 component may override AI-derived permission outputs and transition the graded and revocable execution permission state to a minimal safe-state envelope. This override mechanism ensures that deterministic safety boundaries remain enforceable even in the presence of high-confidence model predictions.

Constrain command input 1008 may be generated in response to adaptive constraints and gating constraints 1204. Constrain command input 1008 represents directive signals used to implement authority reductions, enforce safety interlocks, restrict functionality, or limit command throughput affecting the cyber-physical system 508.

AI-Risk threshold surpassed? 1212 represents a further escalation decision node evaluating whether risk has exceeded a critical threshold requiring partial or full failsafe intervention. AI-Risk threshold surpassed? 1212 may reflect persistent instability, severe anomaly detection, adversarial compromise indicators, or failure of prior mitigation attempts.

If AI-Risk threshold surpassed? 1212 is satisfied, the execution authorization engine 108 may initiate limited response, partial failsafe, or full failsafe actions to protect the cyber-physical system 508.

Security baselines 1214 represent foundational safeguards that remain active irrespective of adaptive gating conditions. Security baselines 1214 may include hardened infrastructure controls, authentication mechanisms, cryptographic protections, verified permission states, immutable safety rules, regulatory compliance constraints, and operational invariants.

Security baselines 1214 ensure that even under dynamic authority modulation through adaptive constraints and gating constraints 1204, and even when AI-Risk threshold surpassed? 1208 or AI-Risk threshold surpassed? 1212 are triggered, the cyber-physical system 508 remains bounded by non-negotiable safety and compliance controls.

Accordingly, FIG. 12 illustrates a layered risk-sensitive control model in which detection (risk factors and system states 1206), evaluation (operation input and evaluation 1202), threshold analysis (AI-Risk threshold surpassed? 1208) and AI-Risk threshold surpassed? 1212), adaptive constraint enforcement (adaptive constraints and gating constraints 1204 and constrain command input 1008), and foundational safeguards (security baselines 1214) collectively provide graded, revocable, and safety-aware governance of the cyber-physical system 508 under the supervision of the execution authorization engine 108.

Figure 13:
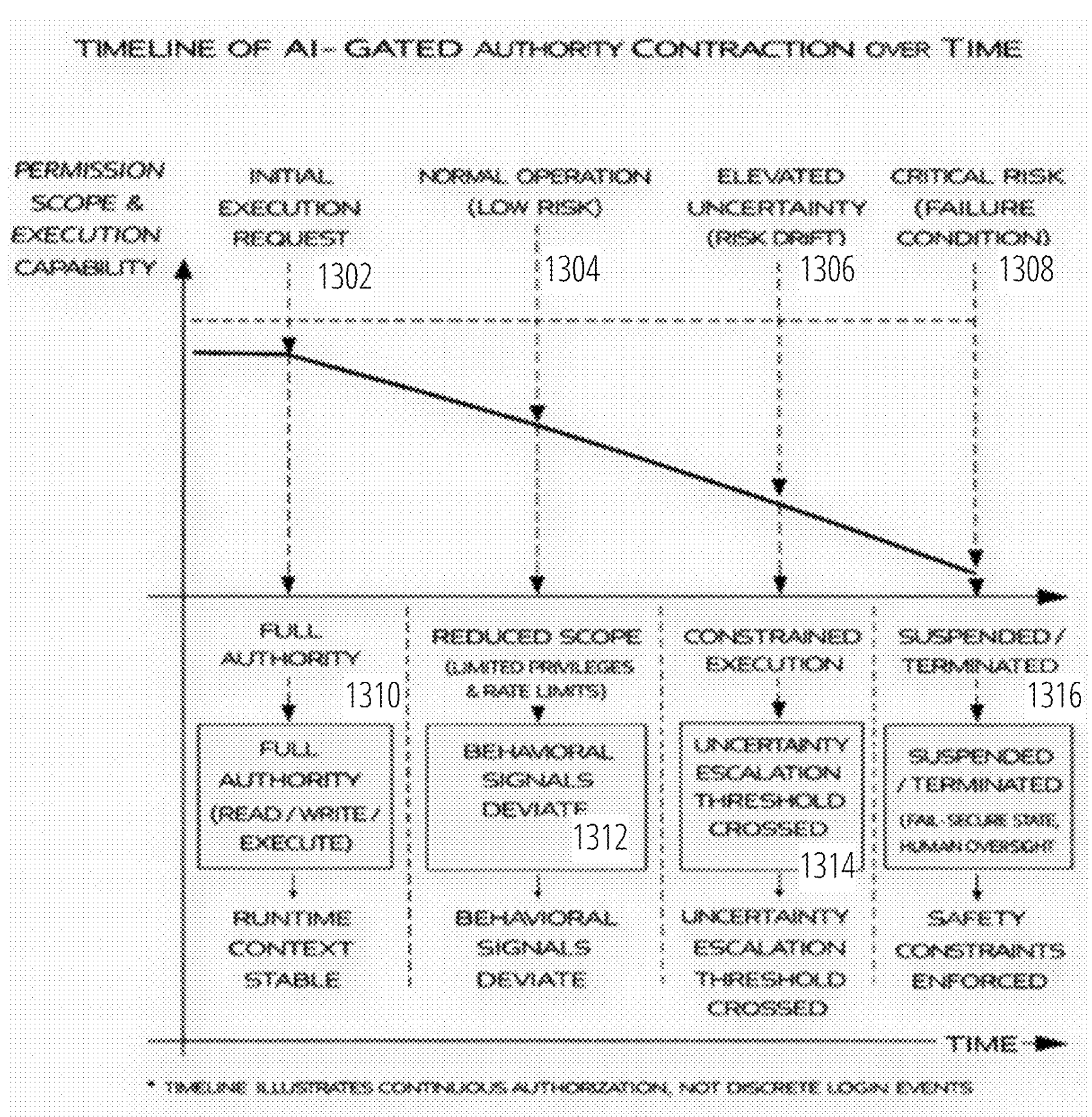
FIG. 13 illustrates a timeline of AI-Gated execution authority contraction over time, showing progressive reduction of permission scope and execution capability in response to increasing uncertainty, risk drift, or failure conditions during runtime.

FIG. 13 illustrates a temporal authority modulation model in which AI-Gated continuous authorization progressively contracts or adjusts execution authority in response to increasing uncertainty or risk conditions. The figure depicts how permission scope transitions over time as operational confidence decreases or risk escalates.

Initial execution request 1302 represents the initiation of an action or command submitted to the system under an initial authority state. The initial execution request 1302 may originate from a human operator, autonomous agent, supervisory system, or machine-to-machine interaction.

Following the initial execution request 1302, the system may enter normal operation (low risk) 1304. Normal operation (low risk) 1304 represents a stable execution state in which behavioral metrics, contextual signals, and performance telemetry remain within acceptable bounds. During normal operation (low risk) 1304, the system may operate under full authority conditions.

As runtime conditions evolve, elevated uncertainty (risk drift) 1306 may occur. Elevated uncertainty (risk drift) 1306 represents gradual degradation of confidence, emergence of anomalous signals, environmental instability, performance variability, or contextual ambiguity. Elevated uncertainty (risk drift) 1306 does not necessarily indicate failure but signals increased caution and potential need for authority contraction.

If risk conditions continue to worsen or exceed defined safety thresholds, critical risk (failure condition) 1308 may be reached. Critical risk (failure condition) 1308 represents a high-severity state in which operational integrity, safety compliance, or system stability is compromised or imminently threatened.

Full authority 1310 represents the highest operational permission state. Under full authority 1310, execution may proceed without significant restriction, subject only to baseline safeguards and ongoing monitoring.

In distributed embodiments, execution mediation may be enforced locally within edge or platform-level control nodes while supervisory authorization logic operates in centralized or federated layers. Local mediation components may interpose directly within physical control loops to enforce velocity, force, trajectory, or energy constraints under latency-sensitive conditions, while updated graded and revocable execution permission states are synchronized across heterogeneous execution environments. This architecture enables real-time physical execution governance without sacrificing centralized supervisory consistency.

When elevated uncertainty (risk drift) 1306 is detected, authority may transition to reduced scope 1312. Reduced scope 1312 represents a narrowed authority state in which execution privileges are partially restricted. Reduced scope 1312 may include limited functionality, constrained access privileges, reduced throughput, or restricted subsystem interaction.

If risk conditions continue to escalate toward critical risk (failure condition) 1308, authority may transition to constrained execution 1314. Constrained execution 1314 represents a significantly limited operational state in which execution may be sandboxed, rate-limited, checkpointed, or subject to strict supervisory control. Constrained execution 1314 is designed to preserve operational continuity where feasible while minimizing exposure to risk.

If critical risk (failure condition) 1308 persists or cannot be mitigated, authority transitions to suspended/terminated 1316. Suspended/terminated 1316 represents a fail-secure condition in which execution is paused, halted, or fully terminated to protect system integrity and safety.

Accordingly, FIG. 13 illustrates a graded temporal authority contraction model in which execution evolves from full authority 1310 during normal operation (low risk) 1304, to reduced scope 1312 during elevated uncertainty (risk drift) 1306, to constrained execution 1314 under escalating instability, and ultimately to suspended/terminated 1316 upon critical risk (failure condition) 1308. This progression provides structured, adaptive, and revocable governance over the lifecycle of the initial execution request 1302.

Figure 14:
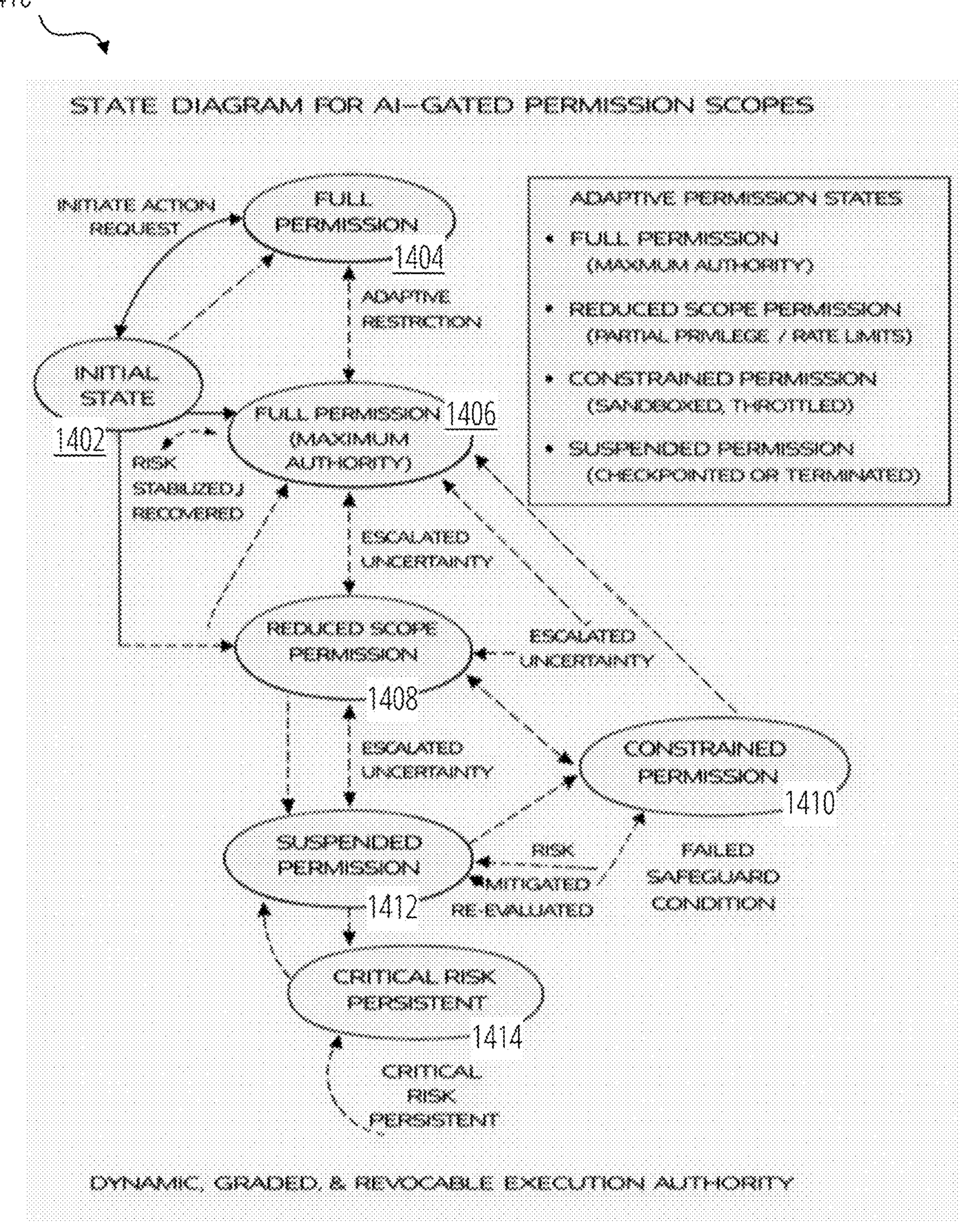
FIG. 14 illustrates a formal state diagram for AI-Gated permission scopes, showing graded and revocable execution authority states and transitions driven by runtime risk, uncertainty, and safeguard evaluation . . .

FIG. 14 illustrates a state diagram 1416 defining discrete, graded, and revocable permission states within an AI-Gated continuous authorization framework. The state diagram 1416 represents transitions among authority levels based on runtime context, uncertainty evaluation, risk conditions, and safety thresholds.

Initial state 1402 represents the starting condition of an action lifecycle prior to authority assignment. The initial state 1402 corresponds to receipt of an action request or operational trigger that has not yet been granted execution privileges.

From the initial state 1402, the system may transition to full permission 1404. Full permission 1404 represents an authorization state in which execution is permitted under normal operating conditions subject to ongoing monitoring and adaptive restriction. Full permission 1404 may include standard operational privileges bounded by policy and security baselines.

Full permission (maximum authority) 1406 represents an elevated authority state in which execution privileges are expanded beyond baseline permissions. Full permission (maximum authority) 1406 may include extended functional scope, broader subsystem interaction, increased throughput capacity, or expanded command latitude. This state is typically granted when runtime confidence is high and risk conditions are minimal.

Reduced scope permission 1408 represents a narrowed authority state in which execution privileges are partially contracted. Reduced scope permission 1408 may involve limited operational capabilities, reduced command ranges, constrained subsystem access, or restricted execution timing. Reduced scope permission 1408 may be triggered by detection of elevated uncertainty or moderate risk conditions.

Constrained permission 1410 represents a further restricted authority state. Under constrained permission 1410, execution may be sandboxed, rate-limited, checkpointed, isolated, or otherwise tightly bounded to mitigate risk exposure. Constrained permission 1410 may be applied when runtime evaluation indicates increasing instability or degradation of confidence.

Suspended permission 1412 represents a state in which execution is paused, halted, or placed in a safe-hold condition. Suspended permission 1412 may be triggered when risk exceeds acceptable thresholds or when system integrity cannot be assured under constrained permission 1410.

Critical risk persistent 1414 represents a condition in which high-severity risk remains unresolved across evaluation cycles. Critical risk persistent 1414 may prevent transition back to higher authority states until mitigation, validation, or supervisory intervention occurs.

The state diagram 1416 therefore defines structured transitions among initial state 1402, full permission 1404, full permission (maximum authority) 1406, reduced scope permission 1408, constrained permission 1410, and suspended permission 1412, with critical risk persistent 1414 representing a sustained high-risk condition influencing state retention or transition.

Accordingly, FIG. 14 illustrates a formally defined permission-state machine in which authority is graded, dynamically adjustable, and revocable in response to evolving runtime conditions. The state diagram 1416 provides a structured and deterministic framework for authority modulation, ensuring that execution privileges expand, contract, or terminate in accordance with evaluated risk and contextual confidence.

Figure 15:
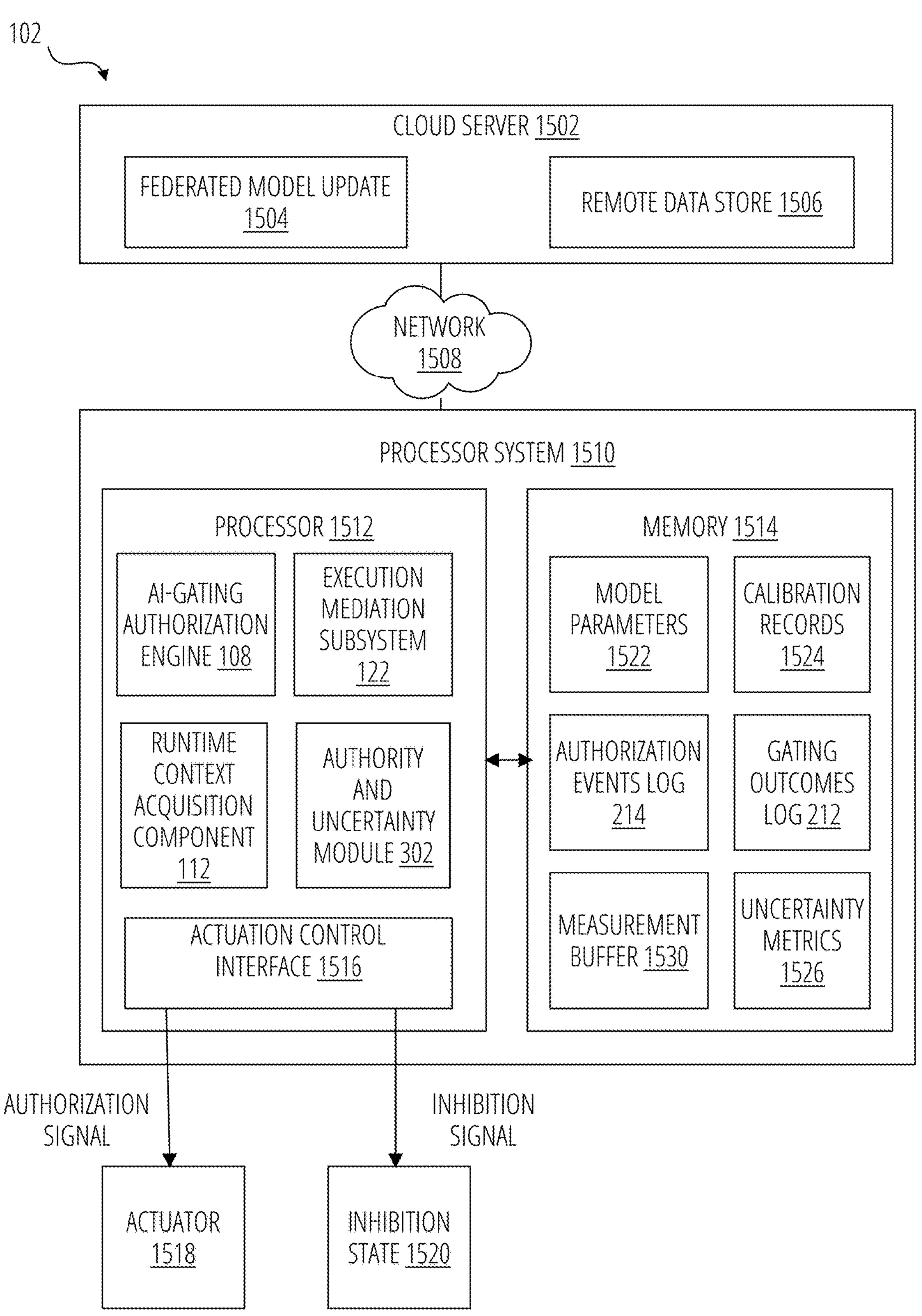
FIG. 15 is a block diagram illustrating an AI-Gated continuous authorization system in which a processor executes an AI-Gating authorization engine, evaluates uncertainty and calibration criteria, and selectively authorizes or inhibits actuation of a physical actuator.

Referring to FIG. 15, the AI-Gating continuous authorization system 102 is illustrated. The AI-Gating continuous authorization system 102 includes a processor system 1510 configured to control actuation based on model-derived inference, uncertainty evaluation, and gating criteria.

The processor system 1510 includes a processor 1512 operatively coupled to memory 1514 and to an actuation control interface 1516. The processor 1512 executes a plurality of computational modules including the AI-Gating authorization engine 108, the execution mediation subsystem 122, the runtime context 112, and the authority and uncertainty module 302.

Upon determination of a permissible actuation condition, the AI-Gating authorization engine 108 outputs a control determination to the actuation control interface 1516. The actuation control interface 1516 functions as an enforcement layer that converts the control determination into a physical control action. When gating criteria are satisfied, the actuation control interface 1516 issues an authorization signal to an actuator 1518, placing the actuator 1518 in an authorized state. The actuator 1518 (Authorized State) may comprise a pump actuator, dosing mechanism, fluidic regulator, electrical stimulator, or other physical device configured to modulate an experimental or therapeutic condition in the cyber-physical system 508.

If gating criteria are not satisfied, the AI-Gating authorization engine 108 communicates an inhibitory determination to the actuation control interface 1516. The actuation control interface 1516 then issues an inhibition signal that results in an inhibition state 1520. In the inhibition state 1520 (Actuation Blocked), actuation of the actuator 1518 is prevented, delayed, modified, or otherwise restricted in accordance with safety or uncertainty constraints.

The memory 1514 stores system data and operational records. Memory 1514 may include model parameters 1522 used by the AI-Gating authorization engine 108, calibration records 1524 associated with sensor or model validation procedures, uncertainty metrics 1526 computed by the authority and uncertainty module 302, gating outcomes log 1528 recording authorization and inhibition decisions, a measurement buffer 1530 storing synchronized measurement data, and any other data logged in the alerts/logs/remediation components 212. The memory 1514 thus provides traceability, reproducibility, and auditability of gating decisions and actuator control events.

The processor system 1510 may communicate with a cloud server 1502 via a network 1508. The network 1508 may comprise a wired or wireless communication infrastructure enabling data exchange between the processor system 1510 and the cloud server 1502. The cloud server 1502 may include a federated model update 1504 configured to aggregate model refinements across distributed instances of processor system 1510 while preserving gating logic integrity. The cloud server 1502 may further include a remote data store 1506 configured to maintain archived datasets, model snapshots, calibration artifacts, or longitudinal performance records.

Communication with the cloud server 1502 over the network 1508 enables distributed model refinement through the federated model update 1504 and storage of data within the remote data store 1506.

Accordingly, actuation of the actuator 1518 occurs only when predictive inference satisfies predefined calibration, uncertainty, and safety criteria, thereby implementing an AI-Gated authorization and inhibition control architecture.

Cyber-Physical Actuation Control and Non-Negotiable Integrity Constraints

In certain embodiments, the AI-Gating continuous authorization system 102 extends execution authority directly into physical actuation domains within cyber-physical control loops. Rather than treating physical operations as simple downstream consequences of a digital permission grant, the AI-Gating continuous authorization system 102 governs actuation itself as a continuously mediated process. Execution mediation therefore includes dynamic, real-time modulation of physical parameters such as force magnitude, velocity, acceleration, trajectory, spatial envelope, timing, energy delivery (e.g., laser fluence, electrical current, hydraulic pressure), or duration of operation.

For example, in a robotic surgical system, the AI-Gating authorization engine 108 may permit initial tool positioning at full authority but, upon detecting sensor drift or unexpected tissue resistance (elevated uncertainty), progressively reduce maximum allowable velocity from 50 mm/s to 5 mm/s, constrain force output to <2 N, and narrow the spatial envelope to a 3 mm radius around the planned trajectory, all while the underlying authenticated session remains active. Similarly, in an industrial robotic arm or autonomous vehicle, the AI-Gating continuous authorization system 102 can throttle acceleration profiles, enforce safe torque limits, or pause energy delivery to actuators mid-motion without requiring full system shutdown or re-authentication.

These physical actuation controls operate as an integral part of the graded and revocable execution permission state. The permission scope determination component assigns not only digital privileges but also time-varying physical parameter bounds that are enforced directly by the execution mediation module within the control loop (e.g., at the PLC, motion controller, or actuator firmware level). Mid-execution intervention is therefore native to physical workflows: the AI-Gating continuous authorization system 102 can instantaneously reduce authority, insert checkpoints (e.g., "confirm clearance before next 10 mm advance"), or transition to a minimal safe-state envelope while preserving operational continuity for low-risk sub-tasks.

To guarantee fail-secure behavior even under high model confidence, the AI-Gating continuous authorization system 102 further comprises a constraint enforcement component that applies non-negotiable integrity constraints independent of AI-derived permission outputs or uncertainty scores. These deterministic safeguards may include hard maximum permissible force thresholds, velocity limits, spatial boundaries, energy exposure limits, structural load tolerances, or collision-avoidance envelopes derived from safety standards, mechanical specifications, or regulatory requirements (e.g., ISO 10218 for robotics or IEC 61508 for functional safety).

When any predefined integrity threshold is approached or exceeded, regardless of the AI-Gating engine's confidence level, the constraint enforcement component automatically overrides the graded permission state and forces transition to the minimal safe-state envelope. This override is non-bypassable and operates at a lower architectural layer than the AI inference path, ensuring that safety boundaries remain enforceable even if the AI model is temporarily miscalibrated, attacked, or operating outside its training distribution.

In distributed or edge-heavy cyber-physical deployments, physical execution mediation may be performed locally within latency-sensitive control nodes (e.g., embedded motion controllers or edge gateways) while the supervisory AI-Gating authorization engine 108 and uncertainty evaluation continue to operate in a centralized or federated cloud layer. Local nodes enforce the most recent synchronized permission scope and integrity constraints in real time; updated graded states and constraint sets are periodically or event-driven synchronized across heterogeneous environments to maintain global consistency without compromising sub-millisecond actuation response.

All physical actuation decisions, parameter modulations, constraint overrides, and state transitions are captured in the time-ordered audit and logging component with full explanatory metadata (including the specific integrity constraint triggered, pre- and post-override parameter values, and uncertainty decomposition at the moment of intervention). This architecture thereby unifies digital, autonomous, and physical execution under a single continuous authorization paradigm while preserving deterministic safety guarantees required for medical, industrial, transportation, and other safety-critical domains.

1.0 Overview of the AI-Gated Continuous Closed-Loop Authorization System

The AI-Gating continuous authorization system 102 provides systems and methods for AI-Gated continuous authorization and execution control in which permission to perform actions is treated as a dynamic state that is continuously evaluated and conditionally maintained, rather than a static decision made at login, access, or initiation. The AI-Gating continuous authorization system 102 operates as a supervisory control plane that governs whether actions may begin, continue, escalate, or terminate by enforcing authorization decisions at runtime based on evolving context, uncertainty, and constraint conditions.

The AI-Gating continuous authorization system 102 integrates these functions through an AI-Assisted gating layer that mediates execution authority in real time. Authorization is not binary, session-bound, or persistent, but instead operates as a graded, conditional, and revocable state that is continuously reevaluated throughout the lifecycle of an action. AI-Gating thus functions as a continuous authorization control plane that governs whether high-consequence actions—digital, physical, or biological—may proceed, adapt, or terminate based on evolving context and uncertainty, even after initial access has been granted.

1.1 System Components and Architectural Roles

In one embodiment, the AI-Gating continuous authorization system 102 comprises an action intake interface 1202 configured to receive action request 104 from human users, software processes, services, APIs, autonomous agents, or machine-to-machine workflows. These action request 104 may represent commands, transactions, configuration changes, data access operations, code execution, infrastructure modifications, or other executable behaviors.

The AI-Gating continuous authorization system 102 further includes a runtime context 112 acquisition component that collects and updates contextual signals associated with each action. Such signals may include system state, execution history, behavioral patterns, timing, resource utilization, interaction sequences, environmental conditions, and uncertainty indicators.

An AI-Gating authorization engine 108 evaluates the action request 104 in light of the runtime context 112 to determine a permission decision and an associated permission scope. The permission scope defines how, to what extent, and under what constraints the action may execute. This AI-Gating authorization engine 108 may incorporate learned models, heuristic logic, or hybrid approaches, but is bounded by explicit constraint enforcement mechanisms as described herein.

An execution mediation subsystem 122 enforces the permission scope by directly influencing execution behavior. This execution mediation subsystem 122 interfaces with computing resources, services, or execution environments to apply constraints such as throttling, staging, sandboxing, scope limitation, pausing, delaying, or terminating execution.

1.2 Flow of Authority and Mediation of Authorization

Authority within the AI-Gating continuous authorization system 102 flows from eligibility to request actions, rather than from unconditional permission to execute actions. Authentication and access control mechanisms may establish identity and eligibility, but do not by themselves confer unrestricted execution authority.

When an action request is received, the AI-Gating continuous authorization system 102 evaluates whether execution authority should be granted under current conditions. Authority is granted conditionally, in the form of a permission scope that may be narrow, temporary, or partial. As execution proceeds, authority is continuously evaluated and conditionally maintained. If runtime context remains acceptable, permission may persist or expand. If risk or uncertainty increases, authority is narrowed or revoked.

This flow ensures that execution authority is continuously evaluated and conditionally maintained, rather than assumed after a single access decision. Execution mediation as described herein may be enforced at one or more system layers, including operating system level controls, application-level execution controls, and orchestration or workflow management layers, without limitation.

1.3 Mediation of Execution and Mid-Execution Intervention

Execution mediation is applied not only prior to execution but also during execution. The system monitors execution behavior and runtime context in parallel with action progression, allowing mid-execution intervention when conditions change.

In one embodiment, the AI-Gating continuous authorization system 102 may throttle execution rate, restrict execution to a subset of resources, enforce intermediate checkpoints, or pause execution pending further evaluation. In more severe cases, execution may be terminated prior to completion to prevent irreversible effects.

Mid-execution intervention enables the AI-Gating continuous authorization system 102 to contain risk before damage occurs, rather than relying on post-event detection or remediation.

1.4 Graded and Revocable Permission Model

Permissions in the AI-Gating continuous authorization system 102 are graded rather than binary. An action may be permitted to execute at reduced scope, limited rate, constrained duration, or under increased supervision. Permission scopes may expand or contract dynamically as execution proceeds.

Permissions are also revocable at any time. Revocation may occur even when authentication remains valid and access has not been rescinded. This separation of identity from execution authority allows the AI-Gating continuous authorization system 102 to fail safely without unnecessary session termination or account lockout.

1.5 Continuous Authorization Logic and Treatment of Uncertainty

Continuous authorization logic operates by repeatedly evaluating whether execution should continue under current conditions. The AI-Gating continuous authorization system 102 does not require certainty that an action is malicious or erroneous in order to intervene. Instead, increasing uncertainty is treated as a reason to reduce authority.

As uncertainty increases, permission scopes are narrowed rather than expanded. This fail-secure behavior ensures that ambiguous or novel situations result in conservative execution control, preventing unsafe outcomes while allowing safe actions to proceed.

In various embodiments, the authorization determinations, risk evaluations, and execution mediation decisions described herein may be implemented using one or more computational models, including statistical models, rules-based systems, machine learning models, or hybrid combinations thereof. Such models may operate deterministically or probabilistically and may incorporate fixed rules, learned parameters, heuristics, thresholds, or confidence measures derived from historical data, runtime observations, or policy inputs. The AI-Gating continuous authorization system 102 is therefore not limited to any particular form of artificial intelligence or learning technique, and may be implemented using non-learning or partially learning models that nevertheless provides authorization and execution mediation as described.

1.6 AI-Gating Engine Architecture and Training

The AI-Gating authorization engine 108 implements a hybrid neuro-symbolic architecture designed to perform continuous, uncertainty-aware evaluation of execution authority. At its core, a deep reinforcement learning policy network, based on a proximal policy optimization (PPO) variant, optimizes dynamic permission scope adjustments. This component models permission state transitions as actions within a Markov decision process, where the state space incorporates concatenated runtime context embeddings. The reward function is shaped to penalize excessive risk exposure while maximizing successful task completion within predefined safety bounds.

Complementing the reinforcement learning policy is an ensemble of uncertainty-aware Bayesian neural networks, implemented using techniques such as Monte Carlo dropout or variational inference layers. These networks generate calibrated uncertainty estimates for contextual predictions, explicitly decomposing epistemic uncertainty (arising from model ignorance) from aleatoric uncertainty (inherent stochasticity in sensor data, behavioral signals, or environmental noise). A parallel symbolic rule engine, formulated as a constraint satisfaction problem solver, enforces non-negotiable hard limits derived from system integrity policies, medical safety standards, photonic therapeutic dosage caps, or other domain-specific requirements. This symbolic layer can veto or further constrain outputs from the learning components, guaranteeing deterministic fail-safe behavior even under degraded neural confidence.

The hybrid engine operates in a distributed manner: lightweight inference nodes are co-located at execution mediation points to enable low-latency decisions, while a centralized aggregator handles model synchronization and policy updates across heterogeneous environments (cloud, edge, on-premises, or cyber-physical deployments). This architecture balances adaptive, data-driven refinement of permission boundaries with strict deterministic safeguards.

Training follows a multi-stage, simulation-augmented pipeline. It begins with offline pre-training on large-scale synthetic datasets generated from digital twins of target execution environments, including cloud orchestration platforms, autonomous agent workflows, and cyber-physical testbeds that replicate photonic therapeutic delivery hardware. These datasets are built by replaying historical execution traces, augmented with injected anomalies, behavioral drift patterns, and controlled uncertainty escalations (e.g., sensor noise, network latency spikes, physiological response variance). Each trace is labeled with ground-truth permission scopes provided by human safety experts or formal verification tools.

The reinforcement learning policy network is first pretrained via supervised imitation learning on optimal expert trajectories, then refined through proximal policy optimization in a reward-shaped simulator. Episodes simulate complete action lifecycles, with reward signals explicitly balancing task completion success against cumulative risk exposure and uncertainty penalties. Concurrently, the Bayesian neural network ensemble is trained using variational inference on the same labeled traces to learn well-calibrated predictive distributions; additional adversarial training rounds deliberately amplify uncertainty signals to enhance robustness.

The symbolic constraint layer is populated via manual encoding of domain-specific safety policies (e.g., maximum photonic fluence limits or prohibitions on irreversible data exports), with cross-validation against simulation outcomes to ensure correctness.

After deployment, the AI-Gating authorization engine 108 supports continuous online fine-tuning through a federated learning protocol. Local mediation nodes collect anonymized execution outcomes and context snapshots, which are periodically aggregated at the central engine under differential privacy guarantees. Model parameters are updated via policy gradient steps on a replay buffer of recent episodes, with human oversight interfaces supplying occasional corrective labels for high-uncertainty escalations. This lifelong learning loop enables adaptation to evolving deployment contexts while maintaining full auditable traceability of weight updates, policy versions, and calibration records.

This combined architecture and training approach ensures the AI-Gating authorization engine 108 delivers robust, uncertainty-responsive, and continuously adaptive execution governance, as illustrated in the system diagrams (e.g., FIGS. 1-6) showing the engine's integration with runtime context acquisition, permission enforcement, and closed-loop feedback pathways.

1.7 Implementation of Hard Constraints and Fail-Safe Behavior

The AI-Gating continuous authorization system 102 includes constraint enforcement mechanisms that impose non-negotiable limits on execution regardless of AI-Gating confidence or optimization objectives. Such constraints may be derived from safety, security, regulatory, or system-integrity requirements.

Hard constraints may prohibit irreversible actions without staged authorization, cap resource usage, restrict execution domains, or enforce mandatory checkpoints. These constraints ensure that the AI-Gating continuous authorization system 102 fails safely when uncertainty or risk exceeds acceptable thresholds.

1.8 Human and AI-Gating Oversight Models

In one embodiment, the AI-Gating continuous authorization system 102 supports combined human and AI-Gating oversight. AI-Gating may autonomously mediate execution within predefined bounds, while escalating certain decisions to human reviewers when required by policy or regulation.

Human oversight may be invoked for high-consequence actions, ambiguous situations, or persistent risk conditions. Conversely, AI-Gating oversight enables rapid, scalable execution control without continuous human intervention.

1.9 Notification, Auditability, and Breach Handling

The AI-Gating continuous authorization system 102 generates audit records documenting authorization decisions, permission scope changes, execution mediation actions, and constraint enforcement events 212. These records support forensic analysis, compliance review, and regulatory reporting.

Notifications may be issued to designated stakeholders when execution authority is constrained, revoked, or terminated due to elevated risk or suspected breach conditions. Such notifications may be directed to security operations personnel, system administrators, compliance teams, or other governance roles, depending on configuration.

Importantly, notification occurs contemporaneously with execution control, rather than after damage has occurred. These notifications and records are supported by a robust, tamper-resistant logging architecture that ensures comprehensive traceability and forensic utility, as described below.

1.10 Tamper-Resistant Audit Trails and Forensic Reconstruction

The AI-Gating continuous authorization system 102 implements a tamper-resistant audit trail that builds upon the audit records and contemporaneous notifications, ensuring immutable, verifiable documentation of all permission state transitions, uncertainty metrics, mediation actions, and related enforcement events throughout the execution lifecycle.

As illustrated in FIGS. 1, 2, 5, and 6, the AI-Gating continuous authorization system 102 maintains comprehensive, time-ordered audit records generated by the observer/reporter components 116, 204 and stored in tamper-resistant logging facilities 120, 212, 214, 510. These records capture every relevant aspect of the authorization and execution process in a chronological sequence, including specific permission state transitions (e.g., from full authority to reduced scope, constrained execution, suspended operation, or termination), quantitative uncertainty metrics (such as decomposed epistemic uncertainty reflecting model ignorance and aleatoric uncertainty reflecting inherent signal noise at the moment of evaluation), mediation actions executed by the execution mediation subsystem 122 (e.g., rate throttling, checkpoint enforcement, sandboxed execution, privilege narrowing, or selective termination), and associated constraint enforcement events.

Each entry includes precise timestamps, cross-references to the originating action request 104, the contemporaneous runtime context snapshot 112, and the AI-Gating authorization engine's explicit rationale (e.g., justification for authority contraction, revocation, or escalation based on uncertainty thresholds or risk signatures), thereby preserving the exact causal and temporal order of events for subsequent analysis.

To safeguard integrity against alteration, whether from insiders, compromised credentials, external adversaries, or accidental corruption, the audit trail employs a robust tamper-resistant format combining an append-only structure with layered cryptographic protections. Each log entry is individually hashed using a strong cryptographic hash function (such as SHA-256 or, in high-assurance or forward-looking deployments, a post-quantum-resistant alternative like SHA3-512 or a hash-based scheme aligned with emerging standards) and then chained to the preceding entry through inclusion in a Merkle tree or equivalent hash-linked sequence. This creates a verifiable, tamper-evident chain in which any modification, deletion, insertion, or reordering of an earlier record would invalidate the hashes of all subsequent entries and the overall Merkle root, making tampering immediately detectable during verification.

In distributed, cloud-based, or high-security environments, completed log segments may be offloaded to write-once-read-many (WORM) storage, immutable cloud logging services with built-in versioning and access controls, or blockchain-like distributed ledgers that enforce consensus-based immutability and non-repudiation. These mechanisms collectively ensure that once an entry is committed, it cannot be retroactively altered, deleted, or reordered without generating detectable evidence of tampering, thereby satisfying stringent regulatory requirements for chain-of-custody, non-repudiation, and long-term evidentiary integrity in compliance-sensitive domains such as financial services, healthcare, and critical infrastructure.

The resulting tamper-resistant audit trail 120 enables precise forensic reconstruction of security incidents, anomalous behaviors, or operational anomalies. Investigators or auditors can replay the complete, immutable sequence of permission state changes, uncertainty escalations, mediation interventions, and system responses to pinpoint the exact moment and vector of risk introduction (for example, credential compromise occurring after initial authentication, behavioral drift in an autonomous agent, sensor anomalies in a cyber-physical system, or unexpected drift in a photonic therapeutic delivery session).

By tracing the system's corresponding actions, such as authority reduction thresholds crossed, escalations to human oversight, fail-secure overrides enforced, or constrained execution maintained, the full causal chain leading to any constrained, suspended, or terminated outcome can be reconstructed with high fidelity. Correlation with external telemetry (e.g., system state vectors, environmental inputs, or network logs) further supports root-cause identification, effectiveness assessment of AI-Gating controls, attribution of actions to specific users, agents, or processes, and production of defensible, timestamped reports suitable for compliance audits, incident response, regulatory reporting, or legal proceedings.

This forensic capability directly complements the real-time notifications issued upon authority constraints, revocations, or terminations by supplying the detailed, immutable historical context essential for thorough post-event analysis, continuous system refinement, and demonstration of accountable governance across heterogeneous execution environments.

1.11 Cloud, Distributed, and Portable Implementations

The AI-Gating continuous authorization system 102 may be implemented in cloud, hybrid, on-premises, or distributed computing environments. Execution mediation may occur at endpoints, services, orchestration layers, or control planes, and is not limited to any particular deployment model.

The AI-Gating continuous authorization system 102 is portable across environments and may govern actions initiated through APIs, microservices, containerized workloads, serverless functions, and autonomous workflows. AI-Gating may be applied consistently across heterogeneous systems, enabling unified execution control.

1.12 Autonomous Agents and Self-Directed Workflows

Actions initiated by autonomous agents, AI systems, or self-directed workflows are subject to the same authorization and execution mediation as human-initiated actions. Autonomous agents may generate action requests, modify execution plans, or adapt behavior, but execution authority remains bounded by the AI-Gating continuous authorization system 102.

This ensures that autonomous systems do not create unbounded execution authority or rapidly expanding attack surfaces as autonomy increases.

1.13 Summary of Technical Effect

Through continuous authorization, execution mediation, graded and revocable permissions, hard constraint enforcement, and dynamic response to uncertainty, the AI-Gating continuous authorization system 102 transforms authorization from a static access decision into an adaptive execution-control process. This architecture improves safety, security, and reliability across cybersecurity, autonomous systems, and other high-consequence domains.

2.0 Exemplary Institutional Embodiments

The following embodiments illustrate representative deployments of the disclosed AI-Gated execution control system in institutional computing environments characterized by heterogeneous users, long-lived credentials, shared services, and high availability requirements. These embodiments are provided for illustrative purposes only and are not intended to limit the scope of the invention.

2.1 University and Academic Institution Embodiment

In one embodiment, the AI-Gating continuous authorization system 102 is deployed across a university or academic institution's administrative, admissions, financial aid, payroll, and academic records infrastructure. Such environments typically involve a diverse population of users, including faculty, staff, students, contractors, and automated services, many of which require cross-departmental access to sensitive records over extended periods of time.

The AI-Gating execution control plane continuously evaluates execution authority for users and services accessing protected data, including student identifiers, financial information, employment records, and regulatory or tax-related data. As users traverse between systems or initiate actions that aggregate or correlate records across domains, the AI-Gating continuous authorization system 102 dynamically reassesses authorization based on runtime context, scope of requested actions, and uncertainty indicators.

When uncertainty increases, such as through atypical access paths, unexpected data sensitivity, or deviations from historical usage patterns, execution authority is automatically contracted. Bulk data access, export operations, or cross-domain queries may be constrained, throttled, or disabled without terminating the underlying session. This enables routine institutional operations to continue while preventing large-scale exposure of sensitive data, even in scenarios involving compromised credentials or unintended misuse.

2.2 Healthcare and Medical Institution Embodiment

In one embodiment, the AI-Gating continuous authorization system 102 is deployed within healthcare networks managing electronic health records, billing systems, clinical workflows, and research databases. Healthcare environments often require continuous system availability and cannot tolerate frequent session termination without disrupting patient care.

In this embodiment, the AI-Gating layer governs execution rather than access alone. As clinicians, staff, or automated processes interact with sensitive patient data, execution authority is continuously reevaluated and conditionally maintained in light of runtime context, access patterns, and uncertainty. When anomalous behavior is detected, such as unexpected aggregation of patient records, atypical access timing, or cross-departmental queries, the AI-Gating continuous authorization system 102 progressively restricts execution authority.

Sensitive fields, bulk retrieval functions, or data export operations may be selectively disabled while allowing essential clinical workflows to proceed. This approach reduces breach impact and data exposure without interrupting patient care or requiring abrupt termination of authenticated sessions.

2.3 Financial Services and Enterprise Institution Embodiment

In one embodiment, the AI-Gating continuous authorization system 102 is applied to enterprise financial systems, including payroll, accounting, customer financial records, and regulatory reporting platforms. These environments often involve a combination of privileged users and automated services performing high-impact operations.

As actions are initiated within these systems, the AI-Gating layer evaluates execution context, transaction patterns, and permission scope in real time. When uncertainty increases, such as during unusual aggregation of financial records or unexpected export attempts, execution authority is dynamically reduced. The AI-Gating continuous authorization system 102 may permit limited transactional activity while constraining bulk data movement, archival operations, or cross-system transfers.

This embodiment materially reduces financial data exposure risk while preserving continuity of routine financial operations.

3.0 Exemplary Medical and Therapeutic Delivery Embodiments 3.1 Operational Context In one exemplary embodiment, the AI-Gating continuous authorization system 102 is deployed within a medical or therapeutic delivery environment, such as a drug infusion system, neuromodulation device, radiation therapy platform, photonic stimulation system, or other medical apparatus capable of delivering energy, compounds, or biologic agents to a patient. Such systems are characterized by high-consequence actions, continuous operation, and the need to balance therapeutic efficacy with patient safety under conditions of evolving physiological response and uncertainty.

3.2 Scenario A—Conventional Authorization Model in Medical Devices

Under a conventional authorization model, a clinician configures a therapeutic delivery device by authenticating to the system and selecting treatment parameters, such as dosage, intensity, duration, or delivery region. Once the treatment session is initiated, execution proceeds according to the predefined parameters. Authorization to deliver therapy is effectively fixed at initiation, and the system assumes that the originally approved parameters remain appropriate for the duration of the session.

If patient conditions change during therapy, for example, due to unexpected physiological response, sensor drift, patient movement, or environmental interference, the AI-Gating continuous authorization system 102 may continue executing the prescribed treatment until completion or until a manual intervention occurs. While alarms or alerts may be generated, execution authority itself is not dynamically reassessed. As a result, therapeutic delivery may proceed under conditions of increased uncertainty or elevated risk, requiring post-hoc review or corrective action after exposure has already occurred.

3.3 Scenario B—AI-Gated Therapeutic Execution Control

In an AI-Gated embodiment, authentication and initial clinician authorization remain necessary but do not grant unconditional or persistent execution authority. Instead, authorization to deliver therapy is treated as a dynamic state that is continuously evaluated and conditionally maintained throughout execution.

As therapeutic delivery begins, the AI-Gating execution control plane continuously evaluates runtime context, including patient physiological signals, device telemetry, environmental conditions, and uncertainty indicators associated with sensor confidence or model predictions. Execution authority is granted with predefined constraints on scope, intensity, rate, and duration.

If uncertainty increases during therapy, such as through anomalous physiological responses, degraded signal quality, unexpected deviations from expected treatment response, or conflicting sensor inputs, the AI-Gating continuous authorization system 102 dynamically contracts execution authority. Therapeutic output may be throttled, intensity reduced, delivery staged through checkpoints, or execution paused altogether, without requiring termination of the treatment session or clinician reauthentication.

In some embodiments, execution constraints are progressively applied, allowing therapy to continue at a reduced or safer level while uncertainty is resolved. In other embodiments, delivery is safely suspended pending clinician review. Importantly, these interventions occur during execution and prior to irreversible patient exposure, enabling fail-secure behavior under ambiguous conditions.

3.4 Outcome and Technical Effect

In this embodiment, therapeutic delivery remains responsive to evolving patient state and uncertainty without relying solely on static pre-authorization or post-execution alerts. Authentication remains valid, and clinician intent is preserved, but execution authority is dynamically constrained to prevent over-delivery, misdelivery, or unsafe exposure. The AI-Gating continuous authorization system 102 thus improves the functioning of medical devices by transforming therapy authorization from a static configuration into a continuously governed execution process.

3.5 Cross-Domain Alignment

This medical embodiment mirrors the cloud administration use-case in that both involve high-consequence actions initiated by authorized actors, where risk emerges during execution rather than at initiation. In both contexts, AI-Gating interposes on execution pathways, continuously evaluates authorization, and contracts authority in response to uncertainty, thereby preventing harm without disrupting overall system operation.

3.6 Photonic and Laser-Based Medical Systems

In certain embodiments, the AI-Gating continuous authorization system 102 is deployed within photonic or laser-based medical platforms in which controlled optical energy is delivered for therapeutic or procedural purposes. Representative action request 104 may include beam initiation, pulse modulation, wavelength selection, spatial targeting adjustment, or automated emission sequencing. The runtime context may comprise thermal load indicators, beam alignment feedback, reflectivity measurements, tissue interaction signals, environmental stability metrics, and uncertainty indicators associated with targeting precision or exposure estimation.

As in the therapeutic delivery embodiments described above, execution authority is continuously evaluated and conditionally maintained. If uncertainty increases during emission, the AI-Gating continuous authorization system 102 may attenuate energy output, restrict emission envelopes, stage pulse delivery, transition to constrained operating modes, or pause emission prior to irreversible exposure. Deterministic constraint enforcement components may impose non-negotiable exposure thresholds, regulatory emission limits, hardware interlocks, and predefined spatial boundaries to preserve patient safety.

3.7 Ocular Diagnostic and Ophthalmic Imaging Systems

In certain embodiments, the AI-Gating continuous authorization system 102 is deployed within ocular diagnostic and ophthalmic imaging platforms, including but not limited to optical coherence tomography (OCT), OCT angiography (OCTA), fundus imaging systems, Raman spectroscopy devices, ultrasound biometry systems, and other diagnostic instruments in which controlled optical or acoustic emissions are used for image acquisition. Representative action request 104 may include initiation of acquisition sequences, modulation of scan density, wavelength selection, acoustic pulse initiation, or automated feature capture operations. The runtime context may comprise signal-to-noise ratio metrics, motion artifact detection signals, fixation stability indicators, segmentation confidence levels, diagnostic model uncertainty estimates, and hardware alignment feedback.

Where uncertainty increases during acquisition, execution authority may be dynamically contracted through scan envelope restriction, staged acquisition, adaptive parameter modulation, or transition to constrained acquisition modes. Deterministic constraint enforcement components may impose non-negotiable exposure limits, regulatory thresholds, hardware interlocks, and predefined anatomical scan boundaries. Accordingly, ocular diagnostic embodiments operate under the same execution-centric, graded, and revocable authorization framework described for therapeutic delivery systems.

The following table summarizes representative execution medical environments in which the disclosed AI-Gating continuous authorization and execution control architecture may be implemented. These embodiments illustrate application of a unified execution-centric control framework and are not intended to limit the scope of the invention.

TABLE 1

Representative Photonic and Ocular Diagnostic Embodiments within Medical Environments

| Domain | Representative Actions | Runtime Context Signals | Execution Mediation | Deterministic Constraints |
|---|---|---|---|---|
| Photonic/ Laser-Based Medical Systems | Beam emission, pulse modulation, wavelength selection | Thermal load, alignment feedback, tissue interaction signals, targeting confidence | Energy attenuation, emission envelope restriction, staged pulse sequencing | Exposure limits, regulatory thresholds, hardware interlocks |
| Ocular Diagnostic Systems | Image acquisition sequencing, scan density modulation, acoustic pulse initiation | Signal-to-noise ratio, motion artifacts, fixation stability, segmentation confidence | Scan envelope restriction, staged acquisition, adaptive modulation | Exposure safety thresholds, anatomical scan boundaries, hardware interlocks |

Table 1: In each of the representative embodiments summarized above, the same AI-Gating continuous authorization architecture governs execution authority. Regardless of domain, action requests are evaluated based on dynamic runtime context, assigned a graded and revocable execution permission state, and mediated before and during execution through direct interposition on execution pathways. As uncertainty increases or system conditions evolve, execution authority may be narrowed, constrained, staged, or terminated in accordance with deterministic safety limits and predefined integrity requirements. Thus, the AI-Gating continuous authorization system 102 operates as a unified supervisory control plane applicable across digital, cyber-physical, photonic, and diagnostic environments without modification to its underlying execution-centric control principles.

3.8 Technical Operation and Improvement of Computer Systems

The AI-Gating continuous authorization system 102 is a computer-implemented control architecture operating at the execution layer of networked computing systems. The AI-Gating continuous authorization system 102 is not directed to abstract decision-making, organizational policy, or mental processes, but to real-time mediation of computational operations performed by computing devices.

The AI-Gating layer interposes on executable operations, dynamically modifies permission states stored in memory, and controls data access pathways during execution. These operations produce concrete technical effects, including constrained execution scope under uncertainty, reduced data exfiltration, shortened attacker dwell time, and prevention of irreversible system actions during ambiguous conditions.

By replacing static authorization models with continuous, execution-centric control, the AI-Gating continuous authorization system 102 improves the functioning of networked computing systems themselves rather than merely automating preexisting human processes. The AI-Gating continuous authorization system 102 actively governs whether computational operations are permitted to execute, modifies execution parameters during runtime, and enforces fail-secure behavior through inline control of execution pathways.

4.0 Foundational Technical Principles of AI-Gated Execution Control

The AI-Gating continuous authorization system 102 is grounded in a set of foundational technical principles that collectively distinguish it from conventional authentication, authorization, policy enforcement, and monitoring architectures. These principles govern how authority is represented, evaluated, and enforced throughout the lifecycle of an action and apply uniformly across digital, physical, biological, and cyber-physical domains.

4.1 Continuous Authorization as a Dynamic State Variable

In the AI-Gating continuous authorization system 102, authorization is implemented as a continuously evaluated and conditionally maintained state variable rather than a static or binary decision rendered at login, access request, or action initiation. Permission to perform an action is not assumed to persist for the duration of a session or workflow, but is instead repeatedly reassessed throughout execution based on evolving runtime context, system state, behavioral signals, and uncertainty. As a result, authorization may be granted, narrowed, expanded, suspended, or revoked at any point during execution, independent of whether authentication remains valid. This continuous authorization model enables the system to respond proactively to changing conditions and prevents execution authority from persisting beyond what current conditions safely permit.

4.2 Execution Interposition Layers

The AI-Gating continuous authorization system 102 actively interposes on execution pathways rather than operating solely at access control or policy evaluation boundaries. In contrast to architectures that authorize actions only at login or request time, the AI-Gating execution control plane mediates how actions execute by enforcing constraints on scope, rate, duration, sequencing, and execution pathways in real time. Execution authority is therefore governed during execution itself, enabling intervention before irreversible effects occur.

Execution interposition may be implemented at one or more layers of a computing or control stack, depending on deployment context, performance requirements, and system architecture. By way of example and without limitation, execution interposition may occur at an operating system layer, a virtualization or container runtime layer, an application runtime layer, an API gateway or service mesh, a workflow orchestration engine, or a control interface governing cyber-physical or autonomous systems. In each case, the AI-Gating execution control plane interposes between action origination and action execution, regardless of whether the action is initiated by a human user, an automated service, or an autonomous agent.

Execution mediation performed by the AI-Gating execution control plane may include, without limitation, throttling execution rate, sandboxing execution environments, narrowing privilege scope, enforcing checkpoints, pausing execution, staging execution across discrete phases, or terminating execution altogether. These mediation actions may be applied individually or in combination and may be dynamically adjusted as runtime context, risk, or uncertainty evolves.

Importantly, execution interposition is independent of authentication validity and does not require termination of a session or revocation of credentials in order to constrain execution. Authorization to perform an action is instead continuously evaluated and conditionally maintained during execution, with execution authority expanding, contracting, or being revoked in accordance with predefined constraints and real-time conditions. The AI-Gating continuous authorization system 102 does not require classification of an action as malicious in order to constrain execution. By governing execution rather than merely granting access, the AI-Gating continuous authorization system 102 transforms authorization from a static permission decision into an active, runtime control mechanism that directly influences how computing systems behave under changing conditions.

Unlike policy engines or rules engines that evaluate compliance or authorization conditions prior to execution without interposing on runtime behavior, the AI-Gating continuous authorization system 102 mediates execution itself and dynamically constrains, modifies, or revokes execution authority during execution based on runtime context and uncertainty.

4.3 Uncertainty-Driven Authority Contraction

One aspect of the AI-Gating continuous authorization system 102 is that increased uncertainty results in reduced execution authority. Uncertainty may arise from ambiguous sensor inputs, degraded signal quality, anomalous behavior, conflicting contextual indicators, model confidence degradation, or incomplete information regarding potential outcomes. Rather than failing open or maintaining previously granted privileges under such conditions, the AI-Gating continuous authorization system 102 enforces fail-secure behavior by contracting permission scope, tightening constraints, or suspending execution altogether.

Authority contraction may occur gradually or discretely and is bounded by predefined hard constraints that the AI-Gating continuous authorization system 102 is not permitted to exceed. This uncertainty-driven contraction ensures that the AI-Gating continuous authorization system 102 remains conservative under ambiguity and prevents escalation of risk during conditions in which reliable decision-making cannot be assured.

5.0 Configuration of AI-Gating Parameters for Acceptability, Scope, Speed, Duration, and Constraints AI-Gating configures acceptable execution by predefining bounded authorization parameters and continuously modulating scope, speed, duration, and constraints during runtime based on evolving context, uncertainty, and risk, without exceeding human-defined limits.

In the AI-Gating continuous authorization system 102, acceptability of a digital action is not determined solely by a binary authorization decision, but by whether the action may proceed within a predefined execution envelope that specifies permissible ranges of operation. These ranges are established in advance through human-defined configuration, policy, or governance inputs, and represent the outer bounds of execution authority that may ever be granted. The AI-Gating continuous authorization system 102 is constrained to operate strictly within these bounds and is not permitted to create new permissions, exceed defined limits, or authorize actions that violate non-negotiable constraints.

Prior to runtime, acceptable and non-acceptable execution parameters may be defined for classes of actions, resources, or operational contexts. Such parameters may include, by way of example, allowable resource access, maximum execution rates, temporal limits on authority persistence, conditions under which irreversible actions are prohibited, and thresholds for escalation or suspension. These parameters collectively define a bounded authorization space within which execution may be dynamically managed.

During runtime, the AI-Gating continuous authorization system 102 continuously evaluates contextual inputs, including behavioral signals, system state, environmental conditions, and measures of uncertainty or confidence. Based on this evaluation, the AI-Gating continuous authorization system 102 selects and enforces an appropriate authorization state within the predefined bounds. Execution scope may be narrowed or expanded by limiting accessible resources, APIs, or privileges. Execution speed may be modulated by throttling, pacing, or introducing checkpoints. Duration of authority may be shortened, extended, or made conditional upon continued reassessment. Constraints may be applied to prohibit specific operations, enforce sandboxed execution, or prevent irreversible outcomes.

Acceptability of execution is therefore determined not by static permission alone, but by whether execution remains within acceptable parameters as conditions evolve. An action that is initially acceptable may become unacceptable if runtime conditions change, uncertainty increases, or predefined thresholds are exceeded. In such cases, the AI-Gating continuous authorization system 102 enforces proportional responses, which may include progressive restriction of execution authority, temporary suspension pending reevaluation, or termination of execution into a fail-secure state.

Importantly, the AI-Gating continuous authorization system 102 does not autonomously redefine what is permissible in principle. Human-defined limits establish what actions may ever be allowed, while the AI-Gating continuous authorization system 102 determines how conservatively execution should proceed at any given moment within those limits. This separation ensures that execution control remains explainable, auditable, and aligned with governance requirements, while still enabling adaptive, real-time response to dynamic conditions.

By configuring acceptability as a multidimensional, continuously evaluated and validated authorization problem rather than a one-time access decision, the AI-Gating continuous authorization system 102 enables safe execution of human-initiated actions, autonomous processes, and machine-to-machine interactions across diverse application domains. Execution authority is treated as a managed control variable that can be adjusted, constrained, or revoked as conditions warrant, thereby reducing risk, limiting blast radius, and preventing irreversible harm without relying on post-execution detection or manual intervention.

6.0 Dynamic Authorization and Execution Control Mechanisms

The AI-Gating continuous authorization system 102 implements a dynamic authorization framework in which permission to execute actions is continuously evaluated, adjusted, and enforced throughout the lifecycle of execution. The AI-Gating continuous authorization system 102 treats execution authority as a mutable control variable that responds in real time to evolving conditions, uncertainty, and risk. The following subsections describe core execution control mechanisms that operate independently or in combination to mediate execution in a graded, revocable, and fail-secure manner.

6.1 Temporal Modulation of Execution Authority

In certain embodiments, execution authority is modulated as a function of time and evolving runtime context. Rather than granting a fixed level of permission for the duration of an execution session, the AI-Gating continuous authorization system 102 continuously reassesses authorization as execution progresses. See FIG. 8, as the AI-Gating continuous authorization system 102 progresses through the closed-loop AI-Gating process 802. The AI-Gated continuous authorization system 102 may continually monitor and detect risk conditions 804, evaluate and classify threat levels 806, apply graded authority modulation and intervention 808, and log responses and system states 810.

FIG. 14 shows the state diagram 1416. Initial execution authority 1402 may be granted based on favorable contextual conditions, low uncertainty, or compliance with predefined constraints, and may permit full permission (maximum authority) 1406. As execution proceeds, the AI-Gating continuous authorization system 102 evaluates temporal signals, including behavioral drift, accumulation of uncertainty, changes in system state, or environmental variation, and dynamically adjusts the scope of execution authority to a reduced scope permission 1408, a constrained permission 1410 or a suspended permission 1412.

Authority modulation over time may include gradual contraction of permissions, staged restriction of access capabilities, or transition to more constrained execution modes without terminating the action. Conversely, where confidence is restored or risk stabilizes, authority may be partially or fully reinstated. This temporal approach ensures that execution authority is continuously earned and adaptively maintained, rather than statically assumed, thereby reducing blast radius and preventing irreversible actions under deteriorating conditions.

6.2 Mid-Execution Authorization and Intervention

In various embodiments, the AI-Gating continuous authorization system 102 is configured to intervene during execution rather than solely before 206 or after execution. Mid-execution authorization 208 enables the AI-Gating continuous authorization system 102 to mediate actions that are already underway by modifying execution parameters in real time. Such interventions may include throttling execution speed, narrowing permission scope, enforcing checkpoints, redirecting execution to sandboxed environments, pausing execution pending reevaluation, or terminating execution when necessary.

Mid-execution intervention 208 operates independently of session boundaries or identity reauthentication events. The AI-Gating continuous authorization system 102 does not rely on detecting malicious outcomes after completion, but instead actively governs whether and how execution continues at each stage. This capability enables the AI-Gating continuous authorization system 102 to respond to zero-day exploits, insider misuse, compromised credentials, and autonomous process deviation in a manner that prevents damage rather than merely reporting it.

6.3 Graded, Revocable, and Reinstatable Permission States

In certain embodiments, execution authority is represented as a set of graded permission states rather than a binary allowed/denied condition. See FIG. 14. Each permission state corresponds to a defined scope of execution capability, such as full permission (maximum authority) 1406, reduced scope permission 1408, constrained permission 1410, or suspended permission 1412. Transitions between permission states are governed by authorization logic that evaluates runtime context, uncertainty, and risk indicators.

Permission states are revocable and reinstatable. Execution authority may be reduced incrementally as risk increases, and restored when conditions improve, without requiring termination of execution or initiation of a new session. This stateful permission model enables fine-grained control over execution behavior and avoids the rigidity of static role-based or policy-based authorization schemes. By treating permission as a dynamic state variable, the system enforces proportional responses aligned with real-time conditions.

6.4 Uncertainty-Driven Authorization Adjustment

In various embodiments, authorization decisions are influenced not only by detected risk or known threats, but also by measures of uncertainty. Uncertainty may arise from incomplete information, ambiguous signals, model confidence degradation, or novel operating conditions. The AI-Gating continuous authorization system 102 is configured to treat increasing uncertainty as a sufficient basis for authority contraction, even in the absence of an identified malicious event.

When uncertainty exceeds defined thresholds 1208, 1212, the AI-Gating continuous authorization system 102 may proactively reduce execution authority, enforce conservative constraints, or transition execution into safer operating modes. This approach avoids reliance on precise threat attribution or classification and ensures that safety is preserved when confidence in system understanding diminishes. Authorization adjustment based on uncertainty enables fail-secure behavior under ambiguous conditions.

6.5 Human Oversight and Governance Models

In certain embodiments, human oversight is integrated into the AI-Gating continuous authorization system 102 as a governance layer rather than a real-time execution controller. Human operators may define authorization policies, risk thresholds, escalation criteria, and constraint boundaries that govern automated decision-making. During execution, the AI-Gating continuous authorization system 102 operates autonomously within these parameters and may notify human operators when predefined escalation conditions are met.

Human oversight may include review of authorization decisions, audit of execution events, adjustment of policies, or approval for reinstatement of authority following suspension. Importantly, the AI-Gating continuous authorization system 102 does not require continuous human approval for execution, nor does it function solely as an advisory tool. Instead, human oversight complements automated control by providing accountability, governance, and post-event analysis without undermining real-time responsiveness.

6.6 Detectability and Auditability without Disclosure of Control Logic

In various embodiments, the AI-Gating continuous authorization system 102 produces observable control effects that enable auditability and verification without exposing proprietary control logic or decision models. Execution mediation inherently alters timing, permission scope, and enforcement behavior, creating detectable system-level signatures that indicate the presence of active authorization control. These signatures may be recorded through logging, audit trails, or execution metadata 120.

At the same time, the internal criteria, algorithms, and representations used to determine authorization outcomes remain encapsulated and protected. Detectability arises from functional consequences of execution mediation rather than disclosure of internal logic. This separation enables compliance, accountability, and verification of authorized deployment while maintaining resistance to reverse engineering or unauthorized replication.

6.7 Closing Note on Integration

The mechanisms described above operate individually or in combination within the AI-Gating continuous authorization system 102. Together, they establish a continuous, adaptive, and fail-secure authorization framework that governs execution authority across human-initiated actions, autonomous agents, and machine-to-machine interactions, independent of application domain.

7.0 Detectability, Auditability, and Integrity of AI-Gated Execution Control Systems 7.1 Unavoidable Control Signatures Produced by AI-Gated Execution Mediation In Embodiments of the AI-Gating Continuous Authorization System 102, Execution control is effected through direct mediation of how actions proceed within a computing or operational environment. Because such mediation operates at the execution layer rather than solely at the access or policy layer, it necessarily produces observable control effects at the system level. These effects arise from the enforcement of graded execution permission states, dynamic modification of execution timing, constraining or narrowing of privilege during operation, and the introduction of intermediate control checkpoints or staged execution paths.

As a result, a functioning AI-Gating continuous authorization system 102 inherently leaves a control signature that is detectable through system behavior. Execution that is mediated by AI-Gating exhibits measurable characteristics, including but not limited to altered latency patterns, non-binary enforcement behaviors, permission modulation during execution, and the presence of execution mediation artifacts. In addition, authorization transitions and enforcement actions generate structured records that persist as audit-trail evidence. These characteristics cannot be entirely concealed while still providing effective execution control, such that covert or surreptitious deployment of full AI-Gated mediation without leaving observable traces is impractical. The presence of these control signatures enables system operators, auditors, or supervisory systems to distinguish AI-Gated execution control from AI-Ungated or statically governed execution.

7.2 Behavioral Fingerprints Resulting from Continuous and Graded Authority Control Beyond individual control signatures, AI-Gated execution control produces a broader behavioral fingerprint that emerges from the system's continuous and adaptive governance of execution authority. Because AI-Gating dynamically collapses privilege to the minimum required for a given task context, alters execution pathways as conditions evolve, and adjusts response patterns based on runtime context and uncertainty, the resulting system behavior differs in consistent and recognizable ways from systems governed solely by static rules or post-hoc detection mechanisms.

This behavioral fingerprint manifests as characteristic patterns in execution flow, response timing, constraint enforcement, and recovery behavior. Over time, such patterns become recognizable to administrators, operators, and auditors who are familiar with the operational characteristics of the system. Importantly, detectability of AI-Gated behavior does not depend on explicit branding, identifiers, or disclosure of proprietary mechanisms.

Instead, the fingerprint arises from the functional consequences of continuous execution mediation itself. In some embodiments, vendors or deployers may optionally reinforce this detectability by embedding watermarking, provenance markers, or identifiable control semantics; however, even in the absence of such measures, unauthorized or improperly implemented AI-Gating deployments remain detectable through their behavioral effects.

7.3 Self-Attestation and Integrity Mechanisms in Authorized AI-Gating Deployments In certain embodiments, legitimate AI-Gating continuous authorization systems 102 incorporate explicit mechanisms for self-attestation and integrity verification. Such mechanisms may include cryptographic attestation of gating modules, signed authorization policies, provenance records describing the origin and version of gating logic, and runtime integrity checks that verify the authenticity and completeness of the execution mediation components. These measures enable an authorized deployment to affirm that execution control is being performed by a validated and untampered AI-Gating continuous authorization system 102 operating in accordance with intended design parameters.

Self-attestation mechanisms further facilitate differentiation among authorized deployments, misconfigured implementations, and counterfeit or incomplete imitations. For example, an authorized system may demonstrate that its execution mediation module, authorization engine, and policy definitions are cryptographically linked and verified at runtime, whereas an unauthorized clone may exhibit incomplete enforcement, missing provenance records, or inconsistent control behavior. In this manner, integrity and attestation features complement behavioral detectability by providing positive confirmation of legitimacy, rather than relying solely on the absence of anomalies.

7.4 Implications for Safety, Auditability, and Governance

The inherent detectability and attestability of AI-Gating continuous authorization system 102 have important implications for safety, auditability, and governance across domains. Because execution mediation produces unavoidable and verifiable control effects, it supports post-event reconstruction of how and why actions were constrained, modified, or terminated. This capability enhances accountability and explainability in safety-critical, regulated, or autonomous environments. At the same time, the ability to distinguish authorized AI-Gating deployments from unauthorized or counterfeit implementations reduces the risk that execution control mechanisms are silently subverted or misrepresented.

By coupling unavoidable execution-level control signatures with optional self-attestation and integrity verification, the AI-Gating continuous authorization system 102 enables a governance model in which execution authority is not only continuously mediated, but also observable, auditable, and verifiable. This combination supports trust in AI-mediated control without requiring reliance on secrecy of implementation, and it allows oversight entities to assess both the presence and legitimacy of AI-Gated execution control as part of broader safety, compliance, or assurance frameworks.

7.5 Detectability without Compromising Security or Proprietary Implementation

Although AI-Gating continuous authorization systems 102 produce observable control effects and verifiable execution signatures, such detectability does not compromise system security, robustness, or proprietary implementation details. In embodiments consistent with the execution authority reduction described herein, observable effects arise when execution authority is dynamically reduced in response to increasing uncertainty, rather than from disclosure of internal authorization criteria or decision logic.

Changes in execution timing, scope, or constraint enforcement indicate that execution authority has been modified, but do not reveal how uncertainty was quantified, how thresholds were evaluated, or how permission states were computed.

In embodiments that record authorization decisions and execution mediation actions in time-ordered records, the resulting audit data reflects the fact that execution authority transitioned between graded permission states, without exposing the internal models, parameters, or adaptive strategies used by the AI-Gating authorization engine 108. Such records support reconstruction of when and how execution was constrained or modified, while preserving abstraction of the underlying authorization logic. The presence of structured audit trails therefore enhances transparency and accountability without weakening the confidentiality of proprietary control mechanisms.

Because execution authority is reduced as uncertainty increases, rather than being escalated or blindly terminated, the AI-Gating continuous authorization system 102 inherently produces consistent and reproducible control signatures that can be verified by authorized operators or oversight systems. Attempts to imitate or bypass AI-Gated execution control without implementing continuous authorization and execution mediation produce incomplete or inconsistent control behavior. Such deviations generate non-coherent execution signatures that are detectable through audit, monitoring, and runtime verification processes. As a result, detectability of AI-Gated behavior strengthens trust, safety, and governance, while remaining compatible with secure, encapsulated, and proprietary implementations.

7.6 Exemplary Embodiments Integrating AI-Gated Execution Control with Monitoring, Notification, and Oversight Systems In exemplary embodiments, the AI-Gating continuous authorization system 102 is deployed in operational environments that include existing monitoring, notification, supervisory, or compliance systems. Such environments may involve transactional systems, operational control systems, autonomous platforms, or other contexts in which actions are observed, logged, or reviewed by automated or human oversight mechanisms. In these embodiments, the AI-Gating continuous authorization system 102 operates as an execution control layer that governs how actions proceed in real time, while coexisting with monitoring and notification systems that provide visibility, documentation, or downstream reporting.

In one embodiment, an action request 104 may correspond to initiation of a value-bearing transaction, modification of a system state, execution of a control instruction, deployment of a workload, or issuance of a command by a software process or autonomous agent. Upon receipt of the action request, the AI-Gating authorization engine 108 evaluates the runtime context 112 that may include action parameters, historical behavior, execution velocity, environmental conditions, system state, and uncertainty indicators. Based on this evaluation, the AI-Gating continuous authorization system 102 determines an execution permission state 202 that defines whether the action may proceed and, if so, under what scope, limits, or constraints.

The execution mediation subsystem 122 enforces the execution permission state by directly mediating execution of the action before execution and during execution. Unlike conventional monitoring or alerting systems that primarily detect anomalies or generate notifications after execution has occurred, the AI-Gating continuous authorization system 102 governs execution authority itself. For example, execution may be delayed, staged, constrained, throttled, sandboxed, or paused while contextual risk or uncertainty is evaluated, or execution may be terminated when conditions exceed acceptable bounds. Such mediation occurs autonomously and in real time, without requiring acknowledgment, approval, or intervention by a human operator as a prerequisite for enforcement.

In these embodiments, communication and notification systems may receive information regarding execution control decisions as a secondary effect of execution mediation. Notifications may be generated when execution authority is constrained, modified, escalated, or revoked, and may be conveyed through dashboards, messages, application interfaces, logs, or machine-readable event streams. Notifications may be directed to human operators, supervisory systems, compliance platforms, or other automated components. Importantly, the operation of the execution mediation module is decoupled from notification and communication functions, such that execution control is not dependent on receipt, acknowledgment, or response to any alert or message.

In certain embodiments, execution state information generated by the AI-Gating continuous authorization system 102 is consumed by oversight, audit, or compliance systems to support review, investigation, or reporting workflows 212. For example, records of execution permission states, contextual evaluations, constraint enforcement actions, and uncertainty assessments may be logged and correlated with existing governance systems. These records may assist in determining whether further review, reporting, or certification actions are appropriate, without the AI-Gating continuous authorization system 102 itself performing or managing such reporting.

In other embodiments, the AI-Gating continuous authorization system 102 is deployed in non-transactional or non-financial operational environments, including industrial control systems, healthcare and medical device platforms, cloud and data infrastructure, autonomous or robotic systems, transportation systems, energy systems, or other cyber-physical environments. In such contexts, action requests may correspond to physical actuation, control commands, system configuration changes, or autonomous task execution. The AI-Gating continuous authorization system 102 mediates execution in these environments by enforcing graded and revocable authority based on runtime context and uncertainty, thereby enabling adaptive control, bounded autonomy, and fail-safe behavior as conditions evolve.

7.7 Operation of the AI-Gating Authorization Engine

The AI-Gating authorization engine 108 functions as the central supervisory control plane within the AI-Gating continuous authorization system 102, operating as a real-time decision engine that continuously ingests runtime context signals, comprising system state telemetry, observed execution behavior vectors, environmental conditions, and quantitative uncertainty indicators, and produces a graded, revocable execution permission state for each action request 104.

Upon receipt of an action request 104 through the intake interface, the AI-Gating authorization engine 108 first performs a pre-execution evaluation by mapping the incoming request against the current runtime context through a feature extraction pipeline that normalizes signals into a unified representation space. This representation is then processed by the engine's core logic to compute both a binary permission decision (allow, constrain, or terminate) and an associated permission scope vector that encodes constraints such as rate limits, privilege narrowing, checkpoint intervals, sandbox boundaries, or staged execution phases.

During execution, the AI-Gating authorization engine 108 runs in a closed-loop fashion 802, receiving continuous feedback from the monitoring component at defined intervals or on event triggers such as behavioral drift thresholds or uncertainty spikes. Each feedback cycle triggers a state transition evaluation within a formal permission scope state machine, where transitions are governed by deterministic rules overlaid with probabilistic confidence scores; if uncertainty rises above a calibrated threshold, the AI-Gating authorization engine 108 automatically contracts the permission scope by narrowing accessible resources, throttling actuation rates, or forcing a checkpoint pause, all without interrupting the underlying authenticated session.

This dynamic modulation occurs independently of identity verification, ensuring that even fully authenticated actors or autonomous agents operate only within authority that remains continuously earned. When predefined hard constraints (such as irreversible physical operations in a photonic stimulation device) are approached, the AI-Gating authorization engine 108 enforces fail-secure overrides that supersede model outputs, routing the action request 104 into a minimal safe-state envelope while escalating to human oversight if required. All decisions, including rationales derived from feature importance rankings and uncertainty decomposition, are emitted to the audit logging subsystem in a tamper-resistant, time-ordered format, enabling forensic reconstruction and compliance attestation.

Across embodiments, the AI-Gating continuous authorization system 102 operates orthogonally to conventional monitoring, alerting, and oversight mechanisms. While such mechanisms provide observation, notification, and retrospective analysis, the AI-Gating continuous authorization system 102 governs execution itself, enforcing context-aware, graded, and revocable execution authority as actions unfold. This separation enables proactive containment of risk, adaptive response to uncertainty, and preservation of operational continuity across diverse domains without disrupting established monitoring, notification, or governance frameworks.

8.0 Advantages of the AI-Gating Continuous Authorization System

The disclosed systems and methods provide a number of technical advantages over conventional authorization and control approaches.

One advantage of the disclosed technology is the provision of continuous authorization, in which permission to execute an action is not fixed at initiation but is repeatedly evaluated during execution. This enables dynamic modification or revocation of permission when contextual risk changes or uncertainty increases, thereby reducing reliance on static or session-based trust.

Another advantage is the implementation of an execution mediation layer that directly controls how actions execute within a system. By constraining, throttling, staging, sandboxing, pausing, or terminating execution, the disclosed system produces a concrete technical effect on computing resources and system behavior, rather than merely generating alerts or recommendations.

A further advantage is the use of graded permission scopes, which allow partial, conditional, or time-limited execution rather than binary allow-or-deny decisions. This enables finer-grained control of high-consequence actions and reduces the blast radius associated with misuse, compromise, or automation errors.

The disclosed technology also provides an advantage in environments involving autonomous agents, automated workflows, and machine-generated actions, by subjecting such actions to the same continuous authorization and execution mediation as human-initiated actions. This prevents unbounded or self-propagating execution while allowing beneficial automation to proceed under controlled conditions.

In addition, the AI-Gating continuous authorization system 102 incorporates a constraint overlay that enforces non-negotiable limits independent of model confidence or optimization objectives. This ensures fail-secure behavior, such that increased uncertainty results in reduced authority rather than expanded execution capability.

Another advantage is the generation of auditable authorization and execution records, enabling traceability, compliance review, and forensic analysis without requiring disclosure of sensitive internal parameters or decision logic.

The AI-Gating continuous authorization system 102 is designed such that disclosure of architectural elements does not enable circumvention, as authorization decisions depend on real-time system state, behavioral context, uncertainty handling, and adaptive constraint enforcement that cannot be predetermined or statically reverse-engineered.

Collectively, these advantages enable a unified control-plane architecture that improves safety, security, and reliability across cybersecurity, medical, and other safety-critical domains by transforming authorization from a static access decision into a continuous, adaptive execution control process.

TABLE 2

Advantages of Execution Authority Governance in AI-Gated Continuous Authorization

| Control Dimension | Conventional Systems | AI-Gated Continuous Authorization (This Disclosure) |
|---|---|---|
| Point of Control | Access time or policy evaluation prior to execution | Execution itself, before and during execution |
| Authorization Model | Binary (allow/deny) | Graded, revocable execution permission states |
| Temporal Scope of Trust | Static trust until logout, token expiry, or policy refresh | Trust continuously reassessed during execution |
| Execution Authority | Implicit once access is granted | Explicit, dynamic, and actively mediated |
| Executive Authority | Not represented as a controllable system state | Treated as a first-class, continuously governed variable |
| Mid-Execution Intervention | Generally unavailable or manual | Native capability to throttle, constrain, pause, or terminate |

TABLE 2-continued

Advantages of Execution Authority Governance in AI-Gated Continuous Authorization

| Control Dimension | Conventional Systems | AI-Gated Continuous Authorization (This Disclosure) |
|---|---|---|
| Reaction to Uncertainty | Typically escalates alerts or blocks access | Reduces execution authority and enforces fail-safe behavior |
| Dependence on Detection | Requires anomaly detection or rule violation | Does not require classification of malicious behavior |
| Human Oversight Role | Often required for decision or remediation | Optional, non-blocking, invoked contextually |
| Alerting Function | Primary control mechanism | Secondary, derivative of execution mediation |
| Lateral Movement Control | Indirect, policy-based | Direct, via dynamic privilege compression |
| Autonomous Agent Governance | Largely unsupported or policy-only | Explicitly governs machine-generated actions |
| Scope of Applicability | Often domain-specific (e.g., IAM, fraud, SOC) | Domain-agnostic across digital, physical, and cyber-physical systems |
| Fail-Safe Behavior | Binary shutdown or post-incident response | Graduated containment preserving operational continuity |

Table 2 compares AI-Gated continuous authorization with conventional access control, policy enforcement, and detection-based systems, highlighting fundamental differences in how execution authority is governed during execution rather than inferred from access eligibility or post-execution alerts.

The comparative analysis presented in Table 2 illustrates that the AI-Gating continuous authorization system 102 operates at a fundamentally different control layer than conventional security, access management, or monitoring systems. Traditional systems primarily determine whether an entity is permitted to access a resource at a discrete point in time, typically during authentication or policy evaluation. Once access is granted, execution authority is implicitly assumed and persists until revoked by logout, token expiration, or external intervention.

By contrast, the AI-Gating continuous authorization system 102 treats execution authority as an explicit, continuously governed system state. Rather than relying on static trust assumptions, the AI-Gating authorization engine 108 continuously evaluates runtime context and determines a graded execution permission state that defines how an action may proceed, under what constraints, and for what duration. This distinction is critical, as it shifts control from access eligibility to execution mediation, a capability not provided by conventional identity, policy, or alert-based systems.

Conventional approaches typically depend on detection mechanisms to identify suspicious or anomalous behavior and then respond through alerts, logging, or post-execution remediation. Such systems require either predefined rules or successful classification of behavior as malicious before action is taken. In contrast, the AI-Gating continuous authorization system 102 does not require detection or classification of malicious activity. Instead, it proactively constrains execution as uncertainty increases, enforcing fail-safe behavior even in the absence of a confirmed threat. This uncertainty-aware control model enables containment of risk before irreversible effects occur.

Another distinguishing feature is the treatment of executive authority as a first-class control variable. In conventional systems, once an action is permitted, the system does not explicitly govern how that action unfolds. The AI-Gating continuous authorization system 102, however, directly mediates execution before and during execution, enabling mid-execution intervention such as throttling, staging, scope reduction, or termination. This capability is particularly significant in environments involving autonomous agents, distributed workflows, or cyber-physical processes, where actions may evolve dynamically and cannot be safely governed by static policies alone.

Furthermore, the AI-Gating continuous authorization system 102 decouples execution control from human oversight and alerting mechanisms. While conventional systems often rely on human response to alerts to mitigate risk, the AI-Gating continuous authorization system 102 enforces execution constraints autonomously and in real time. Human oversight, notification, or review may be invoked as a secondary or supervisory function, but execution control is not dependent upon acknowledgment or approval. This separation preserves operational continuity while still supporting transparency, auditability, and governance.

Accordingly, the differences summarized in Table 2 demonstrate that the AI-Gating continuous authorization system 102 is not an incremental variation of existing access control, Zero Trust, fraud detection, or monitoring technologies. Rather, it introduces a distinct execution-centric control paradigm in which authority is continuously evaluated, dynamically constrained, and revocable as actions unfold across a wide range of domains.

8.1 Resilience Against Account Compromise Independent of Login Attempt Count

Conventional cybersecurity architectures implicitly assume that the primary security challenge lies in preventing unauthorized access through repeated or failed login attempts. As a result, defensive mechanisms such as rate limiting, lockouts, and anomaly detection are largely focused on the authentication phase. However, in modern computing environments, successful account compromise frequently occurs with few or no failed login attempts, including through credential reuse, phishing-based credential capture, session token hijacking, or other post-authentication compromise mechanisms. In such scenarios, an attacker may obtain a valid authenticated session immediately, rendering login-focused protections ineffective.

The AI-Gating continuous authorization system 102 provides a significant advantage by decoupling security enforcement from the number of authentication attempts required to obtain access. Rather than relying on detection of repeated login failures or post-hoc classification of malicious behavior, the system governs execution authority during runtime. Authorization to perform actions is continuously evaluated and conditionally maintained throughout execution, regardless of whether authentication was successful on the first attempt or whether credentials remain technically valid.

This execution-centric approach enables the AI-Gating continuous authorization system 102 to constrain, throttle, pause, or terminate high-consequence actions even when an authenticated session has already been established. As a result, the AI-Gating continuous authorization system 102 materially reduces the impact of account takeovers that bypass traditional authentication defenses, including compromises that involve zero failed login attempts. Security enforcement is therefore applied at the point of potential harm, execution of consequential actions, rather than solely at the point of entry.

By shifting the locus of control from access attempts to execution behavior, the AI-Gating continuous authorization system 102 provides robust protection against modern attack vectors that exploit persistent session trust. This advantage is particularly significant in environments where credentials are long-lived, automated services operate continuously, or session hijacking is difficult to detect prior to action execution. The result is a security posture that remains effective even when authentication-based defenses are partially or fully circumvented.

8.2 Relationship of AI-Gating to Existing Authentication, Security, and Fraud-Prevention Systems Conventional security, authentication, and fraud-prevention systems deployed in computing and financial environments commonly include alert generation, step-up verification workflows, and multi-factor authentication mechanisms. Such systems are effective at evaluating discrete events, including login attempts and individual transaction requests, and may conditionally allow or deny those events based on risk assessments, rules, or user confirmation.

However, these systems generally operate on an event-based authorization model in which authorization decisions are made at isolated points in time. After a transaction is approved, an alert is resolved, or an authentication challenge is satisfied, the system typically returns to a baseline authorization posture without maintaining an actively governed execution authority across subsequent actions within the same session, workflow, or process.

In contrast, the AI-Gating continuous authorization system 102 implements a continuous authorization architecture in which execution authority is maintained as a dynamic state that evolves across time, actions, and contextual conditions. Rather than evaluating transactions or actions in isolation, the AI-Gating execution control plane continuously determines whether execution should be permitted to continue, be constrained, or be terminated based on updated context, behavioral signals, and uncertainty.

8.3 Integration with Existing Security and Fraud-Prevention Controls

In one embodiment, the AI-Gating continuous authorization system 102 operates in conjunction with existing alerting, fraud detection, and transaction approval mechanisms. When an elevated-risk event is identified by such mechanisms, the AI-Gating continuous authorization system 102 updates the authorization state associated with the session, workflow, actor, or process, thereby constraining subsequent execution authority even if individual transactions or actions might otherwise be eligible for approval under conventional rules.

This approach enables limitation of cumulative risk, prevention of probing or escalation behavior, and reduction of reliance on repeated discrete alerts or challenges, while preserving compatibility with existing security, compliance, and reporting infrastructures.

8.4 Relationship of AI-Gating to Multi-Factor and Two-Factor Authentication

Multi-factor authentication (MFA) and two-factor authentication (2FA) are commonly employed to reduce unauthorized access by requiring additional proof of identity at login or access time. These mechanisms establish identity confidence and eligibility to request actions, but they do not govern execution of actions after authentication has been successfully completed.

Once MFA or 2FA has been satisfied, most systems treat the authenticated session as trusted for a defined duration, subject to expiration or explicit revocation. If execution context changes after authentication, such as through credential compromise, automation misuse, abnormal behavioral patterns, or adversarial control of authenticated processes, existing authentication mechanisms do not dynamically adjust execution authority.

The AI-Gating continuous authorization system 102 operates downstream of authentication, including MFA and 2FA, and is not dependent on re-authentication to manage execution risk. In one embodiment, a user or process may remain authenticated while the AI-Gating continuous authorization system 102 dynamically reduces, constrains, or suspends permission to execute certain actions based on increased uncertainty or contextual deviation.

This separation of identity verification from execution authorization enables fail-secure behavior without unnecessary re-authentication challenges, session termination, or account lockout, and further enables governance of machine-generated or autonomous actions that do not involve interactive authentication events.

Accordingly, authentication mechanisms establish identity and access eligibility, while AI-Gating governs runtime authority over execution, addressing technical limitations inherent in authentication-centric security models.

TABLE 3

Authorization and Execution Control Characteristics

| Characteristic | Login-Based/Alert-Driven Systems | MFA/2FA Systems | AI-Gated Continuous Authorization |
|---|---|---|---|
| Primary control point | Login or transaction event | Login or access event | Runtime execution |
| Authorization timing | Point-in-time | Point-in-time | Continuous |
| Scope of decision | Discrete event | Discrete event | Action lifecycle |
| Post-approval authority | Restored to baseline | Restored to baseline | Dynamically constrained |
| Execution control | Indirect | Indirect | Direct |
| Mid-execution intervention | Not supported | Not supported | Supported |

TABLE 3-continued

| Authorization and Execution Control Characteristics | | | |
|---|---|---|---|
| Characteristic | Login-Based/Alert-Driven Systems | MFA/2FA Systems | AI-Gated Continuous Authorization |
| Response to uncertainty | Event challenge or denial | Re-authentication | Progressive permission reduction |
| Session authority after event | Largely unchanged | Largely unchanged | Updated authorization state |
| Automation/agent governance | Limited | Not applicable | Explicitly governed |
| Failure mode | Post-event remediation | Re-authentication | Fail-secure execution control |

Table 3 compares conventional login-based and multi-factor authentication systems with AI-Gated continuous authorization architectures, highlighting differences in authorization timing, execution control, response to uncertainty, and runtime governance of high-consequence actions.

TABLE 4

| AI-Gated Continuous Authorization for Autonomous Agents and Cyber-Physical Systems | | |
|---|---|---|
| Control Dimension | Conventional Autonomous/ Cyber-Physical Controls | AI-Gated Continuous Authorization |
| Primary Control Assumption | "Correct-by-design" autonomy with static safety rules and prevalidated behaviors | Autonomy is conditional and continuously earned based on runtime context |
| Where Control Occurs | At design time, deployment time, or discrete checkpoints | Before execution and during execution of each agent action or physical actuation |
| Agent Action Governance | Policy or rules restrict allowed action types; limited runtime interpretation | Action semantics and context are evaluated continuously to determine whether and how an action may proceed |
| Authority Representation | Often implicit once an agent is authorized to act | Explicit, graded, and revocable execution permission states governing agent action execution |
| Bounded Autonomy | Hard-coded bounds (geofences, speed caps) with limited adaptability | Dynamic bounds that tighten or relax based on evolving risk, uncertainty, and system state |
| Mid-Execution Intervention | Emergency stop, watchdog timeout, or supervisor takeover after threshold violations | Native runtime mediation including throttling, staging, pausing, rerouting, sandboxing, or termination |
| Uncertainty Handling | Often treated as a sensor fusion problem; may increase conservatism but not authority control | Uncertainty is treated as a control signal that reduces execution authority and triggers fail-safe permission narrowing |
| Drift and Deviation Response | Detect deviation, then alarm or halt; limited graded containment | Gradual containment: progressive scope reduction, reduced actuation envelope, forced checkpoints, or safe-mode transitions |
| Safety Envelope Enforcement | Fixed envelope rules; typically binary violation response | Enforced via non-negotiable constraints plus adaptive graded execution control within the envelope |
| Autonomous Workflow Chaining | Multi-step plans may execute once approved; limited stepwise authorization | Each step is gated and may be modified, delayed, or rejected as context changes during execution |
| Cyber-Physical Command Authorization | Auth is often tied to user/device identity and command validity checks | Authorization is tied to runtime operational context, risk, and uncertainty, independent of identity alone |
| Resilience to Compromised Agents | Compromise may cause valid-looking commands to be executed until detected | Compromised behavior is contained by continuous execution mediation and privilege compression |
| Distributed/Edge Enforcement | Control split across PLCs/ECUs/edge nodes; policies may diverge | Permission states are portable and synchronized; enforcement can occur locally with centralized/federated decision logic |
| Auditability & Forensic Reconstruction | Logs exist but may not capture "why" decisions were allowed | Time-ordered capture of permission transitions, mediation actions, and rationale supports reconstruction and accountability |
| Fail-Safe Behavior | Often "fail-stop" (shutdown) or "fail-open" under latency constraints | Graduated fail-safe modes that preserve bounded operation while reducing authority as uncertainty increases |

Table 4 shows a comparative analysis of autonomous-agent and cyber-physical control approaches, illustrating how AI-Gated continuous authorization governs runtime execution authority with graded, revocable permissions and uncertainty-driven containment rather than relying on static safety rules, discrete checkpoints, or post-violation shutdown.

The elements of Table 4 illustrate that conventional autonomy and cyber-physical control architectures primarily rely on design-time validation, static safety envelopes, discrete checkpoints, and post-violation remediation mechanisms such as emergency stop or supervisory takeover.

In many autonomous and cyber-physical deployments, once an agent or subsystem is authorized to operate, execution authority is implicitly assumed and persists until a fault condition is detected. This model is often sufficient for bounded environments but becomes fragile when operational context changes rapidly, when sensors degrade, when autonomy is chained across multi-step workflows, or when systems operate in adversarial or partially trusted settings.

In the AI-Gating continuous authorization system 102, execution authority is treated as an explicit, continuously governed control state rather than an implicit consequence of initial authorization. Each agent-generated action or cyber-physical actuation request is evaluated in relation to runtime context, including system state, environmental conditions, behavioral deviation, and uncertainty indicators.

The AI-Gating continuous authorization system 102 assigns a graded and revocable execution permission state that determines whether an action may proceed and under what scope, limits, or constraints. This enables bounded autonomy to be enforced dynamically, permitting the AI-Gating continuous authorization system 102 to tighten operational envelopes as uncertainty increases or as behavior deviates from expected trajectories, without requiring classification of the behavior as malicious or waiting for a safety threshold to be violated.

Conventional approaches frequently treat uncertainty as a sensor fusion or estimation problem and may increase conservative control outputs when uncertainty rises. However, such approaches do not typically treat uncertainty as an authorization input that directly governs whether and how actions are allowed to execute.

The AI-Gating continuous authorization system 102 uses uncertainty as a control signal for execution authority itself, thereby enabling fail-safe containment through progressive scope reduction, forced checkpoints, throttled actuation, staged execution, safe-mode transitions, or termination when appropriate. This graduated approach supports continuity of safe operation where feasible, rather than relying exclusively on binary shutdown or post-event response.

Table 4 further illustrates that autonomous workflows and cyber-physical systems increasingly involve distributed execution environments in which enforcement must occur at edge nodes, controllers, or local mediators under latency constraints. In such embodiments, execution mediation can be enforced locally while authorization logic may be centralized or federated, and execution permission states may be portable and synchronized across heterogeneous nodes to maintain consistent control. Additionally, by recording permission transitions, mediation actions, and contextual rationales in time-ordered records, the system supports auditability and forensic reconstruction of why an autonomous action was constrained or allowed, improving governance in safety-critical deployments.

Accordingly, Table 4 demonstrates that the AI-Gating continuous authorization system 102 provides a distinct execution-centric control paradigm for autonomous agents and cyber-physical environments, in which authority is continuously reassessed, dynamically constrained, and revocable as actions unfold, thereby improving safety, resilience, and operational integrity in domains where static rules and discrete checkpoints are insufficient.

9.0 Exemplary Operational Scenarios

These scenarios are representative and non-limiting, and they illustrate the operation of AI-Gated execution control across domains.

9.1 Operational Context

In one exemplary embodiment, a large enterprise operates a cloud-based production environment that supports customer-facing services, data analytics, and automated workflows. System administrators and automated services rely on privileged credentials to manage infrastructure, deploy software updates, modify configurations, and perform maintenance operations. These actions often have high impact, including the ability to modify or delete large numbers of production resources, affect service availability, or trigger cascading system changes.

9.2 Scenario A—Conventional Login-Based Security Architecture 9.2.1 Authentication and Establishment of Trust Under a traditional login-based security model, a senior system administrator authenticates to a cloud management console using valid credentials and multi-factor authentication. Upon successful authentication, a privileged session is established. From this point forward, the system treats the administrator as trusted, granting broad administrative authority for the duration of the session.

9.2.2 Session Persistence and Static Authorization

Once authenticated, the administrator's session may remain active for an extended period of time, during which full administrative privileges are continuously available. Commands may be executed freely, and automated scripts may be launched without additional authorization checks. The system does not reassess whether specific actions remain appropriate as conditions change, operating under the assumption that successful authentication implies continued trust for all actions performed during the session.

9.2.3 Emergence of Risk During Execution

Midway through the session, risk conditions arise. For example, the administrator's workstation may become compromised by malware, the administrator may unknowingly execute a copied script containing a configuration error, or a legitimate automation process may begin behaving abnormally due to a software bug. Despite these changes in risk and context, the privileged session remains valid and execution authority is unchanged.

9.2.4 Execution of a High-Impact Action

A bulk infrastructure command is subsequently issued, resulting in the modification or deletion of hundreds of production resources. Customer-facing services are disrupted, and recovery requires rollback procedures, incident response, and system downtime. Security systems may log the activity, generate alerts, or initiate an investigation after execution completes, but the damage has already occurred because no mechanism exists to constrain or interrupt execution mid-stream.

9.2.5 Outcome Under Login-Based Security

In this scenario, access was legitimate and actions were technically authorized under the existing security model. However, trust persisted longer than conditions warranted, and the system lacked the ability to dynamically reassess or limit execution authority once the session was established.

9.3 Scenario B—AI-Gating with Continuous Authorization 9.3.1 Authentication without Unconditional Authority In an AI-Gated embodiment, the same administrator authenticates using the same credentials and authentication mechanisms. Authentication remains an important prerequisite, but it does not grant unconditional or persistent execution authority. Instead, authentication establishes eligibility for further evaluation by the AI-Gating execution control plane.

9.3.2 Action-Level Authorization and Conditional Permission

As the administrator initiates high-impact actions, each action request is evaluated by the AI-Gating execution control plane. The evaluation considers runtime context, including current behavior relative to historical norms, system state, operational risk, the scope and potential irreversibility of the requested action, and uncertainty associated with execution conditions. Permission is granted conditionally and with predefined constraints governing scope, rate, duration, and allowable execution pathways.

9.3.3 Detection of Rising Risk During Execution

When abnormal conditions arise, such as unusual command sequencing, elevated execution rates, actions outside typical maintenance patterns, or increased uncertainty in system state, the AI-Gating continuous authorization system 102 detects rising risk during execution rather than after completion. Authorization is continuously reassessed and dynamically constrained during execution.

9.3.4 Dynamic Constraint and Intervention

Instead of allowing unrestricted execution, the AI-Gating continuous authorization system 102 responds by narrowing privilege scope, throttling execution speed, enforcing staged checkpoints, or temporarily blocking high-risk commands pending review. In some embodiments, the administrator may be prompted for confirmation or escalation, while in others execution may be safely paused or halted automatically. Importantly, these interventions occur while credentials remain valid and without requiring session termination.

9.3.5 Outcome Under AI-Gated Security

In this scenario, authentication remains intact and credentials continue to be trusted. However, execution authority is dynamically reduced in response to increased risk and uncertainty. As a result, damage is prevented entirely or limited to a small, recoverable scope, avoiding large-scale disruption.

9.4 Comparative Interpretation

From an executive perspective, conventional security determines who is allowed to enter a system, whereas AI-Gating determines what is allowed to happen and whether it may continue happening. Login-based architectures assume safety once authentication succeeds, while AI-Gating assumes that safety must be continuously earned and conditionally maintained.

From an operational and technical perspective, login-based security is session-centric and primarily reactive, with detection and response occurring after execution. AI-Gating is execution-centric and proactive, enabling real-time intervention, constraint, and revocation of authority during execution itself.

10.0 AI-Gating in Cybersecurity

In the context of cybersecurity, AI-Gating is not a detection-first technology. It does not primarily operate by identifying malicious activity after execution has occurred or by classifying events as benign or malicious in isolation. Instead, AI-Gating functions as a continuous authorization layer that governs whether a digital action is permitted to proceed and, if so, at what scope, speed, duration, and under what constraints.

This framing represents a fundamental departure from conventional security controls. Firewalls operate through static rule sets that permit or deny traffic based on predefined criteria. Identity and access management systems grant permissions based on roles and attributes evaluated at login or token issuance. Security operations center tools and anomaly detection systems typically observe activity and generate alerts or responses after execution has already begun. AI-Gating differs in that it operates before execution, during execution, and with the authority to revoke permission at any point. Authorization is not a single decision but a continuously managed state.

TABLE 5

Comparison of conventional cybersecurity mechanisms with AI-Gated continuous authorization

| Security Control Mechanism | Primary Control Focus | Authorization Timing | Execution Control Capability | Limitation Addressed by AI-Gating |
|---|---|---|---|---|
| Firewalls | Network traffic filtering | Static, rule-based | Indirect | Does not adapt authorization based on execution context or action semantics |
| IAM/RBAC | Identity and role assignment | Login or token issuance | Indirect | Permissions persist after authentication regardless of evolving risk |
| SIEM/SOC | Monitoring and analysis | Post-event | None | Detects or responds after execution has occurred |
| Zero Trust | Access to resources | Request-time | Indirect | Governs access boundaries but not execution of actions after access |
| Anomaly Detection | Behavioral deviation | Post-event or near-event | None | Produces alerts without enforcing execution constraints |
| Endpoint Detection and Response (EDR) | Device-level activity | Reactive | Limited | Focused on endpoints rather than system-wide execution authority |

Table 5 is a comparison of conventional cybersecurity mechanisms with AI-Gated continuous authorization, illustrating differences in authorization timing, execution control, and adaptability to changing conditions.

Conventional cybersecurity mechanisms are designed to control access to systems, monitor behavior, or respond to incidents after execution has occurred. Firewalls rely on static rule sets to permit or deny network traffic without evaluating the semantic intent or consequence of individual actions. Identity and access management systems, including role-based access control, grant permissions at login or token issuance and typically maintain those permissions for the duration of a session or credential lifetime.

Security information and event management systems, security operations workflows, anomaly detection tools, and endpoint detection and response platforms primarily operate through observation, alerting, and post-event remediation. While these mechanisms are effective at identifying suspicious activity and supporting incident response, they do not directly govern whether actions are allowed to execute or continue once access has been granted.

Zero Trust architectures improve upon perimeter-based trust models by verifying access at resource boundaries, but they likewise focus on access decisions rather than on continuous control of execution. In each case, authorization is evaluated at discrete points in time, and execution authority is not maintained as a dynamically updated state.

AI-Gating addresses these limitations by introducing a continuous authorization layer that governs execution itself. Rather than replacing existing tools, AI-Gating complements them by providing runtime control over whether actions may proceed, be constrained, or be terminated as conditions evolve.

TABLE 6

Limitations of Conventional Controls in Autonomous Agents and API-Driven Systems

| System Context | Conventional Control Model | Primary Limitation | AI-Gating Capability |
|---|---|---|---|
| Microservices | API keys and service roles | Persistent trust once authenticated | Continuous authorization of API calls based on context and execution behavior |
| Cloud Infrastructure Automation | Service accounts and scripts | Broad privileges across workflows | Dynamic privilege narrowing during execution |
| Machine-to-Machine Communication | Token-based authentication | Lack of behavioral oversight | Runtime evaluation of action semantics and frequency |
| Autonomous Software Agents | Pre-approved permissions | No execution-level supervision | Continuous permission to act, modulate, or halt agent actions |
| AI-Generated Code or Actions | Static policy checks | Limited ability to constrain emergent behavior | Execution mediation with staged or constrained authorization |

Table 6 is a comparison of conventional authorization approaches and AI-Gated continuous authorization in environments involving autonomous agents, APIs, and machine-to-machine interactions.

Modern computing environments increasingly rely on autonomous agents, microservices, and API-driven workflows in which actions are initiated by software rather than by human users. Conventional authorization mechanisms in these environments typically rely on service accounts, API keys, or tokens that grant persistent permissions once authenticated. While these mechanisms establish identity and eligibility, they provide limited oversight of how actions are executed over time.

In such systems, machine-generated actions may scale rapidly, propagate across services, or escalate privileges without continuous supervision. Conventional controls generally lack the ability to reassess execution authority dynamically based on evolving behavior, contextual drift, or uncertainty. As a result, errors, misconfigurations, or compromised services can cause widespread impact before detection or intervention occurs.

AI-Gating introduces continuous authorization into machine-driven environments by governing execution authority at the level of individual actions and workflows. API calls, automated scripts, and autonomous agent actions are subject to ongoing permission evaluation, enabling dynamic constraint, throttling, staging, or termination when conditions change. This execution-level control is particularly important for systems involving artificial intelligence or autonomous decision-making, where behavior may not be fully predictable at design time.

By maintaining execution authority as a continuously updated state, AI-Gating provides a technical mechanism for supervising autonomous and machine-to-machine actions in a manner that is not achievable through static authentication or policy-based access control alone.

11.0 Core Capabilities AI-Gating Enables in Cybersecurity 11.1 Continuous Permission (not Login-Based Trust)

Traditional security architectures are built around a model in which a user or process authenticates successfully and is then trusted for the duration of a session or credential lifetime. In this model, trust is front-loaded, and authorization persists until logout, expiration, or explicit revocation.

AI-Gated security replaces this assumption with a model in which trust must be conditionally sustained. Authorization is not granted indefinitely based on identity alone, but is repeatedly re-evaluated based on live context. As actions are requested and executed, the AI-Gating continuous authorization system 102 assesses evolving behavioral patterns, the semantics of requested commands, the velocity and sequencing of access, the likelihood of lateral movement, the current risk state of the system, and changes in the broader threat environment.

When risk indicators increase or uncertainty rises, the AI-Gating continuous authorization system 102 does not wait for a definitive breach determination. Instead, execution authority is progressively constrained. Access may be throttled, permissions may be narrowed, execution may be sandboxed, or actions may be paused or terminated altogether. This ensures that authorization adapts in real time to conditions, rather than remaining static after authentication.

TABLE 7

Comparison: Login-Based Trust vs. Zero Trust vs. AI-Gating (Continuous Authorization)

| Dimension | Login-Based Trust | Zero Trust | AI-Gating (Continuous Authorization) |
|---|---|---|---|
| Core question answered | "Who are you?" | "Should you access this resource?" | "Should this action be allowed to occur right now?" |
| When trust is evaluated | At login or token issuance | At access request time | Continuously before, during, and across execution |
| Duration of trust | Session- or token-lifetime | Short-lived, per request | Temporary, conditional, revocable at any moment |
| Authorization model | Static/session-based | Policy-driven, request-based | Dynamic, context- and uncertainty-adaptive |
| Granularity | Coarse (roles, groups) | Finer (per resource, per request) | Fine-grained (per action, per execution stage) |
| Action control | Indirect (access implies permission) | Indirect (access implies permission) | Direct (permission governs execution itself) |
| Mid-execution intervention | Not supported | Limited/uncommon | Native (pause, constrain, throttle, terminate) |
| Response to changing risk | Reactive (alerts after activity) | Reactive to semi-proactive (re-auth, deny next request) | Proactive (permission narrows as risk or uncertainty rises) |
| Compromised credentials | Remain powerful until revoked | Reduced blast radius, but valid access can still act | Execution authority collapses despite valid credentials |
| Insider misuse | Hard to distinguish from normal use | Partially mitigated by segmentation | Actively constrained via behavior-aware execution control |
| Effect of uncertainty | Largely ignored | Sometimes triggers re-authentication | Explicitly reduces permission scope |
| Failure mode | Fail-open | Fail-open between requests | Fail-secure (execution constrained or halted) |
| Automation & AI agents | Broad trust once authenticated | Governed at access boundaries | Explicit, continuous permission for machine actions |
| Lateral movement resistance | Low | Moderate (microsegmentation) | High (dynamic privilege narrowing mid-action) |
| Audit focus | Who logged in, what they accessed | Who accessed which resource | Why an action was permitted, constrained, or stopped |
| Regulatory posture | Access-centric compliance | Policy-centric compliance | Safety- and risk-centric execution governance |
| Underlying assumption | "Authenticated = trusted" | "Never trust, always verify (at access)" | "Permission must be continuously earned" |
| Primary strength | Simplicity | Reduced implicit trust | Active control of high-consequence actions |
| Primary limitation | Over-trust after entry | Access ≠ safe execution | Requires execution interposition (by design) |
| Security posture | Detect and respond | Verify and segment | Decide, constrain, and intervene |

Table 7 is a comparison of Login-Based Trust, Zero Trust, and AI-Gating Continuous Authorization Models. This table compares conventional login-based trust architectures, Zero Trust access models, and AI-Gating continuous authorization with respect to how trust, permission, and execution authority are evaluated, enforced, and adapted over time, particularly for high-consequence actions involving dynamic risk and uncertainty.

Traditional security architectures have focused on controlling who is allowed to enter a system rather than what is allowed to happen once access is granted. Login-Based Trust represents the earliest and most common model. In this approach, trust is established at authentication, such as login, single sign-on, or token issuance, and permissions granted at that moment typically persist for the duration of a session or credential lifetime. While simple and efficient, this model assumes that conditions remain safe after entry, even though credentials may be compromised, behavior may change, or risk may increase during execution.

Zero Trust architectures were developed to address some of these limitations by eliminating implicit trust based on network location or prior access. Under Zero Trust, access decisions are evaluated repeatedly at resource boundaries, often using policies, identity signals, and device posture. This reduces lateral movement and limits exposure by ensuring that each access request is verified. However, Zero Trust primarily governs access to resources, not execution of actions. Once access is granted to a resource, the actions performed within that access window are typically not continuously re-authorized or constrained.

AI-Gating introduces a fundamentally different layer of control by shifting the focus from access to execution itself. Rather than asking only whether a user or process may access a system or resource, AI-Gating continuously evaluates whether a specific action should be allowed to occur, continue, or be constrained in real time. Authorization is no longer a single decision made at login or access time; it becomes a dynamic, ongoing process that adapts as context, behavior, system state, or uncertainty changes.

For business executives, the significance of AI-Gating lies in its ability to reduce operational risk without eliminating automation or productivity. High-consequence actions, whether digital, physical, or therapeutic, can proceed under controlled conditions, while the system retains the authority to narrow scope, slow execution, or halt actions if risk increases. This reduces blast radius, improves compliance posture, and provides auditable governance over critical operations.

For technical administrators, AI-Gating functions as an execution-level control plane. It interposes directly in the execution pathway, enabling mid-execution intervention that traditional access-centric models cannot provide. Valid credentials or approved access no longer guarantee unrestricted execution. Instead, permission must be continuously earned, and uncertainty or anomalous behavior results in reduced authority rather than expanded access.

Taken together, the comparison highlights an evolution in authorization models: Login-Based Trust controls entry, Zero Trust controls access to resources, and AI-Gating controls whether actions themselves are permitted to exist and persist at runtime. This progression reflects the growing need for continuous, adaptive control in environments that increasingly rely on automation, autonomous agents, and high-impact digital and physical actions.

11.2 Pre-Execution Command Gating

A defining characteristic of AI-Gating is that it shifts the central security question from retrospective analysis to prospective control. Rather than asking whether a command or action was malicious after it has executed, AI-Gating asks whether the command should be allowed to execute at that moment under current conditions.

This distinction is particularly significant for high-impact operations. Commands that are technically valid but contextually dangerous, such as destructive file operations on production systems during unusual hours, bulk data exports that exceed typical usage patterns, or privilege escalation requests that fall outside established workflows, are evaluated before execution. The AI-Gating continuous authorization system 102 may slow execution, require staged authorization, limit scope, or route the action through a constrained execution pathway.

Because this evaluation occurs prior to execution, AI-Gating is especially effective against classes of risk that evade signature-based or retrospective defenses. These include zero-day exploits that lack known indicators, insider threats that operate within nominal permissions, compromised administrative accounts that appear legitimate, and supply-chain attacks that leverage trusted processes. The AI-Gating continuous authorization system 102 does not need to know that an action is malicious; it only needs to determine that executing it under current conditions is unsafe.

11.3 Dynamic Privilege Narrowing and Anti-Lateral Movement Control

In many security incidents, the most damaging phase is not initial entry into a system but the subsequent lateral movement that allows an attacker to expand access, escalate privileges, and reach high-value assets. Traditional security models often struggle to contain this phase once access has been established.

AI-Gating addresses this problem by dynamically narrowing privilege scope in real time. As behavior diverges from expected patterns or risk increases, the AI-Gating continuous authorization system 102 restricts access to only the resources and capabilities required for the current task context. Nodes, processes, or services that exhibit risk drift may be isolated or constrained without requiring full system shutdown.

This approach replaces a purely reactive "detect and respond" posture with an active containment model. Rather than allowing broad permissions to persist until an alert is triggered and investigated, the AI-Gating continuous authorization system 102 continuously reduces blast radius as behavior evolves, limiting the ability of threats to propagate or escalate.

11.4 AI-Gated APIs and Machine-to-Machine Trust

As modern systems increasingly rely on microservices, cloud infrastructure, and autonomous software components, a growing proportion of critical actions are initiated not by humans but by machines. In these environments, traditional authentication and authorization mechanisms provide limited oversight once machine credentials or service accounts are established.

AI-Gating extends continuous authorization to machine-to-machine interactions by governing how APIs and automated agents are permitted to operate. Execution authority can be modulated based on call frequency, payload semantics, response privileges, and escalation rights. This allows the AI-Gating continuous authorization system 102 to detect and constrain abnormal or unsafe machine behavior even when credentials remain valid.

This capability becomes essential as AI-driven agents and autonomous systems proliferate. Without execution-level gating, machine-generated actions can scale errors or misuse rapidly. AI-Gating provides a mechanism to supervise and constrain such actions dynamically, ensuring that automation remains bounded by real-time safety considerations.

11.5 Self-Healing Security States

Beyond immediate intervention, AI-Gating enables systems to recover gracefully from elevated-risk conditions. When uncertainty decreases or normal behavior resumes, execution authority can be gradually restored rather than abruptly reinstated or permanently revoked. Permissions may be rolled back automatically, compromised credentials may be revoked or constrained, and systems may enter temporary protective states that prioritize safety while investigation or remediation occurs.

This graded recovery model avoids the binary choice between unrestricted operation and full shutdown. It mirrors safety-gating principles long used in biological and medical systems, where exposure or intervention is modulated continuously rather than toggled on or off. In cybersecurity contexts, this results in more resilient systems that can absorb and recover from risk without excessive disruption.

11.6 AI-Gating Platform for Cybersecurity

Taken together, these capabilities illustrate that AI-Gating is not merely an enhancement to existing detection or alerting systems. It represents a shift in how authority is exercised in digital environments, moving from static, identity-based trust to continuous, execution-level permission control. By governing whether actions are allowed to occur and continue in real time, AI-Gating enables safer operation of complex, automated, and high-consequence systems in an increasingly dynamic threat landscape.

TABLE 8

Execution Control Limitations of Conventional Cybersecurity Mechanisms

| Security Mechanism | Primary Control Focus | Authorization Timing | Execution Control Capability | Limitation Addressed by AI-Gating |
|---|---|---|---|---|
| Firewalls | Network traffic filtering | Static, rule-based | Indirect | Does not adapt authorization based on execution context or action semantics |
| IAM/RBAC | Identity and role assignment | Login or token issuance | Indirect | Permissions persist after authentication regardless of evolving risk |
| SIEM/SOC | Monitoring and analysis | Post-event | None | Detects or responds after execution has occurred |
| Zero Trust | Access to resources | Request-time | Indirect | Governs access boundaries but not execution of actions after access |
| Anomaly Detection | Behavioral deviation | Post-event or near-event | None | Produces alerts without enforcing execution constraints |
| Endpoint Detection and Response (EDR) | Device-level activity | Reactive | Limited | Focused on endpoints rather than system-wide execution authority |

Table 8 is a comparison of conventional cybersecurity mechanisms with AI-Gated continuous authorization, illustrating differences in authorization timing, execution control, and adaptability to changing conditions.

Conventional cybersecurity mechanisms are designed to control access to systems, monitor behavior, or respond to incidents after execution has occurred. Firewalls rely on static rule sets to permit or deny network traffic without evaluating the semantic intent or consequence of individual actions. Identity and access management systems, including role-based access control, grant permissions at login or token issuance and typically maintain those permissions for the duration of a session or credential lifetime.

Security information and event management systems, security operations workflows, anomaly detection tools, and endpoint detection and response platforms primarily operate through observation, alerting, and post-event remediation. While these mechanisms are effective at identifying suspicious activity and supporting incident response, they do not directly govern whether actions are allowed to execute or continue once access has been granted.

Zero Trust architectures improve upon perimeter-based trust models by verifying access at resource boundaries, but they likewise focus on access decisions rather than on continuous control of execution. In each case, authorization is evaluated at discrete points in time, and execution authority is not maintained as a dynamically updated state.

AI-Gating addresses these limitations by introducing a continuous authorization layer that governs execution itself. Rather than replacing existing tools, AI-Gating complements them by providing runtime control over whether actions may proceed, be constrained, or be terminated as conditions evolve.

11.7 AI-Gating and Application Programming Interface (API)

As used herein, the term "Application Programming Interface" or "API" refers to a defined interface, protocol, or set of callable operations by which one software component, service, process, or system programmatically communicates with, invokes functionality of, or exchanges data with another software component, service, process, or system.

An API may specify one or more of request formats, response formats, callable functions, commands, parameters, data structures, message schemas, authentication or authorization mechanisms, execution semantics, and communication protocols. An API may be implemented using synchronous or asynchronous communication, may operate over a network or within a local computing environment, and may facilitate machine-to-machine, service-to-service, or application-to-application interactions.

For purposes of the present disclosure, an API may be used to initiate, control, or execute actions, workflows, or operations, and such actions invoked via an API are subject to continuous authorization, execution mediation, and constraint enforcement as described herein. The term API is not limited to any particular programming language, protocol, architectural style, or deployment environment.

TABLE 9

Limitations of Conventional Controls in Autonomous Agents and API-Driven Systems

| System Context | Conventional Control Model | Primary Limitation | AI-Gating Capability |
|---|---|---|---|
| Microservices | API keys and service roles | Persistent trust once authenticated | Continuous authorization of API calls based on context and execution behavior |
| Cloud Infrastructure Automation | Service accounts and scripts | Broad privileges across workflows | Dynamic privilege narrowing during execution |
| Machine-to-Machine Communication | Token-based authentication | Lack of behavioral oversight | Runtime evaluation of action semantics and frequency |
| Autonomous | Pre-approved | No execution-level | Continuous permission to act, |

TABLE 9-continued

Limitations of Conventional Controls in Autonomous Agents and API-Driven Systems

| System Context | Conventional Control Model | Primary Limitation | AI-Gating Capability |
|---|---|---|---|
| Software Agents | permissions | supervision | modulate, or halt agent actions |
| AI-Generated Code or Actions | Static policy checks | Limited ability to constrain emergent behavior | Execution mediation with staged or constrained authorization |

Table 9 shows a comparison of conventional authorization approaches and AI-Gated continuous authorization in environments involving autonomous agents, APIs, and machine-to-machine interactions.

Modern computing environments increasingly rely on autonomous agents, microservices, and API-driven workflows in which actions are initiated by software rather than by human users. Conventional authorization mechanisms in these environments typically rely on service accounts, API keys, or tokens that grant persistent permissions once authenticated. While these mechanisms establish identity and eligibility, they provide limited oversight of how actions are executed over time.

In such systems, machine-generated actions may scale rapidly, propagate across services, or escalate privileges without continuous supervision. Conventional controls generally lack the ability to reassess execution authority dynamically based on evolving behavior, contextual drift, or uncertainty. As a result, errors, misconfigurations, or compromised services can cause widespread impact before detection or intervention occurs.

AI-Gating introduces continuous authorization into machine-driven environments by governing execution authority at the level of individual actions and workflows. API calls, automated scripts, and autonomous agent actions are subject to ongoing permission evaluation, enabling dynamic constraint, throttling, staging, or termination when conditions change. This execution-level control is particularly important for systems involving artificial intelligence or autonomous decision-making, where behavior may not be fully predictable at design time.

By maintaining execution authority as a continuously updated state, AI-Gating provides a technical mechanism for supervising autonomous and machine-to-machine actions in a manner that is not achievable through static authentication or policy-based access control alone.

12.0 AI-Gated Continuous Evaluation and Conditionally Maintained Authorization in Cybersecurity Systems 12.1 Overview of AI-Gating in Cybersecurity In cybersecurity applications, AI-Gating functions as a continuous authorization control layer that governs whether digital actions are permitted to execute, continue, or escalate under prevailing runtime conditions. Unlike detection-oriented security mechanisms that focus on identifying malicious activity after execution, AI-Gating evaluates execution authority prospectively and dynamically. Authorization is treated as a mutable state rather than a fixed decision, enabling permission to be granted, constrained, or revoked before execution, during execution, or across successive actions.

13.0 AI-Gated Control of Digital Actions 13.1 Pre-Execution Gating of High-Risk Actions In one recommended embodiment, AI-Gating is applied prior to execution of high-risk digital actions, such that each action request is evaluated for permission before execution is permitted to begin. This pre-execution 206 gating layer serves as the primary control point for preventing unsafe outcomes, independent of whether the requesting entity has successfully authenticated or holds valid credentials.

High-risk digital actions may include, by way of example and not limitation, privilege escalation requests, system-level or administrative commands, bulk or sensitive data export operations, execution of scripts or executable code, and reconfiguration of infrastructure, services, or security controls. In such cases, the AI-Gating continuous authorization system 102 evaluates whether the requested action should be allowed to execute under current runtime context and uncertainty, rather than relying solely on static permissions or role assignments.

By enforcing authorization prior to execution, the AI-Gating continuous authorization system 102 is capable of preventing exploitation of previously unknown vulnerabilities, neutralizing the misuse of compromised but valid credentials, and avoiding irreversible system damage that would otherwise occur before detection or response mechanisms could intervene. Pre-execution 206 gating thus shifts security control from retrospective analysis to proactive execution governance.

13.2 Mid-Execution Continuous Gating

In addition to pre-execution control 206, authorization in an AI-Gating continuous authorization system 102 is not limited to the moment an action is initiated. Instead, permission persists as a continuously evaluated state throughout execution. This enables the AI-Gating continuous authorization system 102 to reassess whether execution should continue as conditions evolve, rather than assuming that an initially approved action remains safe for its entire duration.

During execution, the AI-Gating continuous authorization system 102 may modulate execution behavior in response to changing context or increased uncertainty. Such modulation may include throttling execution rate, reducing execution scope 1312, enforcing intermediate checkpoints, conditionally allowing continuation of subsequent execution stages 1314, or terminating execution 1216 entirely when risk drift exceeds acceptable bounds. These interventions occur while the action is in progress and before completion, thereby preventing escalation or unintended side effects.

This model represents continuous permission rather than session-based trust. Authorization is maintained only so long as execution remains consistent with acceptable conditions, and it may be withdrawn even when the initiating session or credentials remain valid.

13.3 Privilege Compression and Dynamic Scope Narrowing

In another recommended embodiment, AI-Gating dynamically compresses privilege scope during execution to the minimum authority required for the current task context. Rather than granting broad permissions that persist across unrelated actions, the AI-Gating continuous authorization system 102 continuously narrows access rights as execution proceeds, limiting exposure to only those resources and capabilities necessary at that moment.

This dynamic scope narrowing directly addresses common sources of systemic risk, including lateral movement following initial compromise, misuse of legitimate access by insiders, and overreach by automated or AI-driven processes operating within overly permissive environments. As behavior diverges from expected patterns or uncertainty increases, privilege scope is reduced accordingly, thereby limiting the potential blast radius of misuse or error.

By treating privilege as an adjustable execution parameter rather than a static attribute of identity, AI-Gating enables fine-grained containment without requiring full session termination or system shutdown.

13.4 AI-to-AI and Machine-to-Machine Gating

In environments involving autonomous agents, workflow orchestration engines, and machine-to-machine interactions, AI-Gating is applied explicitly to actions generated or executed by non-human entities. In such systems, conventional authentication and access control mechanisms establish identity but provide limited oversight of how machine-generated actions unfold over time.

AI-Gating governs execution authority for autonomous and machine-initiated actions in the same manner as for human-initiated actions, subjecting them to continuous authorization, execution mediation, and constraint enforcement. This ensures that automated systems, including self-modifying or self-directing processes, operate within bounded execution authority that adapts to runtime conditions.

Without such gating, autonomous systems may create unbounded or rapidly expanding attack surfaces due to scale, speed, or emergent behavior. AI-Gating provides a technical mechanism for supervising and constraining machine-to-machine execution in real time, thereby maintaining system safety as autonomy increases.

Those skilled in the art will appreciate that the exemplary embodiments and descriptions thereof are merely illustrative of the inventions as a whole. Any dimensions used herein are for example, and any dimension may be modified without changing the scope of the claims. While the principles of the inventions have been made clear in the exemplary embodiments, it will be obvious to those skilled in the art that modifications of the structure, arrangement, proportions, elements, and materials may be utilized in the practice of the inventions, which are particularly adapted to specific environments and operative requirements without departing from the principles of the inventions.

LISTING OF DRAWING ELEMENTS

102 AI-Gating continuous authorization system
104 action request
106 policy, metrics, and rules
108 AI-Gating authorization engine
110 user input interface
112 runtime context
114 permission and constraint enforcement
116 observer/reporter components
118 authorization outcomes and reasons
120 logging/audit trails
122 execution mediation subsystem
202 graded, revocable execution authority
204 observer/reporter components
206 pre-execution control
208 mid-execution control
210 transitional permission states
212 alerts/logs/remediation components
214 log graded authorization events
216 continued controlled execution under modified authority
218 execution mediation subsystem
302 evaluates authority and uncertainty
304 human authority
306 AI-oversight
308 cooperative control decisioning
310 human oversight
312 transitional permission states
314 execution outcome
402 evaluate confidence level
404 elevated authority
406 reduced authority
408 permission granted
410 successful execution
412 permission restricted
414 continued execution
416 risk escalation
418 permission escalation
420 permission escalation
502 external threats
504 runtime risks
506 security enforcement
508 cyber-physical system
510 log authorization events
512 permission and execution state
602 continuous monitoring
604 execution failure determined
606 reauthorize execution
608 AI-Gating actions
610 log failure states and AI-Gated responses
612 can authority be revised
702 AI-Gating Actions
802 closed-loop AI-Gating process
804 monitor and detect risk conditions
806 evaluate and classify threat level
808 AI-Gating authority and intervene
810 log responses and system states
902 functional state authority
904 functional state authority
906 administrative control
908 cyber-defense management
1002 control input
1004 constrained execution or rejection
1006 permission grades are sufficient?
1008 constrain command input
1010 pass through and execute
1012 constrained execution
1014 permission grades evaluation
1102 access-time control
1104 static permission state
1106 AI-Gated execution control
1108 graded, revocable execution authority
1110 pre-, mid-, cross-action mediation
1112 post-execution observation
1114 reactive response after execution
1116 binary allow/deny outcome
1202 operation input and evaluation
1204 adaptive AI-Gating constraints
1206 risk factors and system states
1208 AI-Risk threshold surpassed?
1210 constrain command input
1212 AI-Risk threshold surpassed?
1214 security baselines
1302 initial execution request

1304 normal operation
1306 elevated uncertainty
1308 critical risk
1310 full authority
1312 reduced scope
1314 constrained execution
1316 suspended/terminated
1402 initial state
1404 full permission
1406 full permission (maximum authority)
1408 reduced scope permission
1410 constrained permission
1412 suspended permission
1414 critical risk persistent
1416 state diagram
1502 cloud server
1504 federated model update
1506 remote data store
1508 network
1510 processor system
1512 processor
1514 memory
1516 actuation control interface
1518 actuator
1520 inhibition state
1522 model parameters
1524 calibration records
1526 uncertainty metrics
1528 gating outcomes log
1530 measurement buffer

What is claimed is:

1. A system for controlling execution of actions in a computing environment, comprising:

a processor;

an actuator communicatively connected to the processor;

an action intake interface configured to receive an action request;

a runtime context acquisition component, operating on the processor, configured to obtain dynamic context associated with an executing action and output a runtime context, the runtime context comprising at least system state, execution behavior, and uncertainty indicators;

an AI-Gating authorization engine, operating on the processor, configured to continuously evaluate whether execution of the action request is permitted based on the runtime context, wherein authorization is not determined solely at access time;

a permission scope determination component of the AI-Gating authorization engine configured to assign a graded and revocable execution permission state defining how, to what extent, and under what constraints the action request may execute;

an execution mediation module, operating on the processor, configured to enforce the graded and revocable execution permission state by directly mediating execution of the action request before execution and during execution by the actuator; and a feedback and monitoring component configured to provide execution outcomes and updated runtime context to the AI-Gating authorization engine, wherein the graded and revocable execution permission state is continuously reassessed during execution independently of identity authentication.

2. The system of claim 1, wherein the execution mediation module enforces the graded and revocable execution permission state using non-binary execution controls comprising at least one of scope limitation, rate limitation, staged execution, checkpoint enforcement, sandboxed execution, or selective termination.

3. The system of claim 1, wherein the AI-Gating authorization engine continuously updates the graded and revocable execution permission state in response to changes in runtime context occurring during execution of the action request.

4. The system of claim 1, wherein the permission scope determination component dynamically narrows execution authority to a minimum authority required for a current task context.

5. The system of claim 1, wherein the execution mediation module performs mid-execution intervention.

6. The system of claim 1, wherein the feedback and monitoring component detects execution drift by comparing observed execution behavior to expected execution behavior.

7. The system of claim 1, wherein the AI-Gating authorization engine reduces execution authority as uncertainty increases.

8. The system of claim 1, further comprising a constraint enforcement component configured to impose non-negotiable execution limits based on system integrity requirements.

9. The system of claim 1, wherein the action request is generated by an autonomous agent, and wherein execution of the action request is governed by the graded and revocable execution permission state.

10. The system of claim 1, further comprising a human oversight interface configured to receive an escalation when the graded and revocable execution permission state exceeds a predefined uncertainty.

11. The system of claim 10, wherein the execution mediation module maintains constrained execution while awaiting input from the human oversight interface.

12. The system of claim 1, wherein the system is deployed across distributed execution environments, and execution mediation is enforced by local mediation nodes operating under a centralized AI-Gating authorization engine.

13. The system of claim 12, wherein the graded and revocable execution permission state is portable across heterogeneous execution environments and synchronized to maintain consistent enforcement.

14. The system of claim 1, further comprising an audit and logging component configured to record authorization decisions, execution mediation actions, and permission state transitions in a time-ordered record.

15. The system of claim 14, wherein the audit and logging component supports reconstruction of execution control decisions for compliance.

16. The system of claim 1, wherein the action request corresponds to a physical operation.

17. The system of claim 1, wherein the computing environment comprises a cloud platform.

18. The system of claim 1, wherein the graded and revocable execution permission state allows execution by the actuator.

19. The system of claim 1, wherein the graded and revocable execution permission state constrains execution by the actuator.

20. The system of claim 1, wherein the graded and revocable execution permission state terminates execution by the actuator.

21. The system of claim 1, wherein the graded and revocable execution permission state is reduced as uncertainty increases.

22. A method for controlling execution of actions in a computing environment, comprising:

receiving an action request;

obtaining runtime context associated with execution of the action request, the runtime context comprising system state, execution behavior, and uncertainty indicators;

continuously evaluating, using an AI-Gating authorization engine, whether execution of the action request is permitted based on the runtime context, wherein authorization is not determined solely at authentication time;

determining execution authority, a graded and revocable execution permission state defining how, to what extent, and under what constraints the action request may execute; and mediating execution of the action request before execution and during execution in accordance with the graded and revocable execution permission state, wherein execution authority is continuously reassessed independently of identity authentication eligibility.

23. The method of claim 22, further comprising reducing execution authority as uncertainty associated with the runtime context increases.

24. The method of claim 22, wherein the mediating execution comprises enforcing non-binary constraints selected from scope limitation, rate limitation, staged execution, checkpoint enforcement, sandboxed execution, or selective termination.

25. The method of claim 22, wherein the action request is generated by an autonomous system, and mediating execution comprises constraining autonomous behavior to a bounded task context.

26. The method of claim 22, wherein the action request originates from a software process.

27. The method of claim 22, wherein the action request originates from a human user.

28. The method of claim 22, wherein the action request originates from an autonomous agent.

29. A non-transitory computer-readable medium storing instructions that, when executed by one or more processors, cause the one or more processors to perform the method of claim 22.

* * * * *